(12) United States Patent
Chamberlain et al.

(10) Patent No.: US 11,275,594 B2
(45) Date of Patent: *Mar. 15, 2022

(54) INTELLIGENT DATA STORAGE AND PROCESSING USING FPGA DEVICES

(71) Applicant: IP Reservoir, LLC, St. Louis, MO (US)

(72) Inventors: Roger D. Chamberlain, St. Louis, MO (US); Mark Allen Franklin, St. Louis, MO (US); Ronald S. Indeck, St. Louis, MO (US); Ron K. Cytron, St. Louis, MO (US); Sharath R. Cholleti, Saint Paul, MN (US)

(73) Assignee: IP RESERVOIR, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/180,432

(22) Filed: Feb. 19, 2021

(65) Prior Publication Data

US 2021/0200559 A1 Jul. 1, 2021

Related U.S. Application Data

(63) Continuation of application No. 16/933,001, filed on Jul. 20, 2020, now Pat. No. 10,929,152, which is a (Continued)

(51) Int. Cl.
*G06F 16/00* (2019.01)
*G06F 9/445* (2018.01)
(Continued)

(52) U.S. Cl.
CPC ......... *G06F 9/44505* (2013.01); *G06F 3/061* (2013.01); *G06F 3/067* (2013.01);
(Continued)

(58) Field of Classification Search
None
See application file for complete search history.

(56) References Cited

U.S. PATENT DOCUMENTS 2,046,381 A 7/1936 Hicks et al.
3,082,402 A 3/1963 Scantlin
(Continued)

FOREIGN PATENT DOCUMENTS

EP 0573991 12/1993
EP 0880088 11/1996
(Continued)

OTHER PUBLICATIONS

Vector Signal Analysis of Digital Baseband and If Signals Within an FPGA , IEEE, Scott Ferguson (Year: 2005).*
(Continued)

*Primary Examiner* — Jean M Corrielus
(74) *Attorney, Agent, or Firm* — Thompson Coburn LLP

(57) ABSTRACT

A system is disclosed that comprises a field programmable gate array (FPGA), a network interface, and hardware description code, wherein the hardware description code is compilable into a plurality of bit configuration files for loading onto the FPGA, wherein each bit configuration file defines a pipelined processing operation for a hardware template. The FPGA comprises configurable hardware logic, and the FPGA can be accessible over a network via the network interface for commanding the FPGA to load a bit configuration file from among the bit configuration files onto the FPGA to thereby configure hardware logic on the FPGA to perform the pipelined processing operation defined by the loaded bit configuration file, and wherein the FPGA is configured to (1) receive streaming data and (2) process the streaming data through the configured hardware logic to
(Continued)

perform the pipelined processing operation defined by the loaded bit configuration file on the streaming data.

20 Claims, 47 Drawing Sheets

Related U.S. Application Data continuation of application No. 16/503,244, filed on Jul. 3, 2019, now Pat. No. 10,719,334, which is a continuation of application No. 15/882,679, filed on Jan. 29, 2018, now Pat. No. 10,346,181, which is a continuation of application No. 14/929,791, filed on Nov. 2, 2015, now Pat. No. 9,898,312, which is a continuation of application No. 14/315,560, filed on Jun. 26, 2014, now Pat. No. 9,176,775, which is a continuation of application No. 13/344,986, filed on Jan. 6, 2012, now Pat. No. 8,768,888, which is a continuation of application No. 10/550,323, filed as application No. PCT/US2004/016398 on May 21, 2004, now Pat. No. 8,095,508.

(60) Provisional application No. 60/473,077, filed on May 23, 2003.

(51) Int. Cl.
  *G06F 16/2455* (2019.01)
  *G06F 3/06* (2006.01)
  *G06F 21/60* (2013.01)
  *G06F 21/72* (2013.01)
  *G06F 21/76* (2013.01)
  *G06F 21/85* (2013.01)
  *G06Q 40/06* (2012.01)
  *G06F 17/00* (2019.01)
  *G06F 9/48* (2006.01)

(52) U.S. Cl.
  CPC .......... *G06F 3/0655* (2013.01); *G06F 3/0683* (2013.01); *G06F 9/4881* (2013.01); *G06F 16/2455* (2019.01); *G06F 17/00* (2013.01); *G06F 21/602* (2013.01); *G06F 21/72* (2013.01); *G06F 21/76* (2013.01); *G06F 21/85* (2013.01); *G06Q 40/06* (2013.01); *G06F 3/0601* (2013.01); *G06F 3/0673* (2013.01)

(56) References Cited

U.S. PATENT DOCUMENTS

| | | |
|---|---|---|
| 3,296,597 A | 1/1967 | Scantlin et al. |
| 3,573,747 A | 4/1971 | Adams et al. |
| 3,581,072 A | 5/1971 | Nymeyer |
| 3,601,808 A | 8/1971 | Vlack |
| 3,611,314 A | 10/1971 | Pritchard, Jr. et al. |
| 3,729,712 A | 4/1973 | Glassman |
| 3,824,375 A | 7/1974 | Gross et al. |
| 3,848,235 A | 11/1974 | Lewis et al. |
| 3,906,455 A | 9/1975 | Houston et al. |
| 4,081,607 A | 3/1978 | Vitols et al. |
| 4,298,898 A | 11/1981 | Cardot |
| 4,300,193 A | 11/1981 | Bradley et al. |
| 4,314,356 A | 2/1982 | Scarbrough |
| 4,385,393 A | 5/1983 | Chaure et al. |
| 4,412,287 A | 10/1983 | Braddock, III |
| 4,464,718 A | 8/1984 | Dixon et al. |
| 4,550,436 A | 10/1985 | Freeman et al. |
| 4,674,044 A | 6/1987 | Kalmus et al. |
| 4,811,214 A | 3/1989 | Nosenchuck et al. |
| 4,823,306 A | 4/1989 | Barbie et al. |
| 4,868,866 A | 9/1989 | Williams, Jr. |
| 4,903,201 A | 2/1990 | Wagner |
| 4,941,178 A | 7/1990 | Chuang |
| 5,023,910 A | 6/1991 | Thomson |
| 5,038,284 A | 8/1991 | Kramer |
| 5,050,075 A | 9/1991 | Herman et al. |
| 5,063,507 A | 11/1991 | Lindsey et al. |
| 5,077,665 A | 12/1991 | Silverman et al. |
| 5,101,353 A | 3/1992 | Lupien et al. |
| 5,101,424 A | 3/1992 | Clayton et al. |
| 5,126,936 A | 6/1992 | Champion et al. |
| 5,140,692 A | 8/1992 | Morita |
| 5,161,103 A | 11/1992 | Kosaka et al. |
| 5,163,131 A | 11/1992 | Row et al. |
| 5,179,626 A | 1/1993 | Thomson |
| 5,208,491 A | 5/1993 | Ebeling et al. |
| 5,226,165 A | 7/1993 | Martin |
| 5,233,539 A | 8/1993 | Agrawal et al. |
| 5,243,655 A | 9/1993 | Wang |
| 5,249,292 A | 9/1993 | Chiappa |
| 5,255,136 A | 10/1993 | Machado et al. |
| 5,258,908 A | 11/1993 | Hartheimer et al. |
| 5,263,156 A | 11/1993 | Bowen et al. |
| 5,265,065 A | 11/1993 | Turtle |
| 5,267,148 A | 11/1993 | Kosaka et al. |
| 5,270,922 A | 12/1993 | Higgins |
| 5,297,032 A | 3/1994 | Trojan et al. |
| 5,313,560 A | 5/1994 | Maruoka et al. |
| 5,315,634 A | 5/1994 | Tanaka et al. |
| 5,319,776 A | 6/1994 | Hile et al. |
| 5,327,521 A | 7/1994 | Savic et al. |
| 5,339,411 A | 8/1994 | Heaton, Jr. |
| 5,347,634 A | 9/1994 | Herrell et al. |
| 5,361,373 A | 11/1994 | Gilson |
| 5,371,794 A | 12/1994 | Diffie et al. |
| 5,375,055 A | 12/1994 | Togher et al. |
| 5,388,259 A | 2/1995 | Fleischman et al. |
| 5,396,253 A | 3/1995 | Chia |
| 5,404,411 A | 4/1995 | Banton et al. |
| 5,404,488 A | 4/1995 | Kerrigan et al. |
| 5,418,951 A | 5/1995 | Damashek |
| 5,421,028 A | 5/1995 | Swanson |
| 5,432,822 A | 7/1995 | Kaewell, Jr. |
| 5,440,723 A | 8/1995 | Arnold et al. |
| 5,461,712 A | 10/1995 | Chelstowski et al. |
| 5,463,701 A | 10/1995 | Kantner, Jr. et al. |
| 5,465,353 A | 11/1995 | Hull et al. |
| 5,481,735 A | 1/1996 | Mortensen et al. |
| 5,488,725 A | 1/1996 | Turtle et al. |
| 5,497,317 A | 3/1996 | Hawkins et al. |
| 5,497,488 A | 3/1996 | Akizawa et al. |
| 5,500,793 A | 3/1996 | Deming, Jr. et al. |
| 5,517,642 A | 5/1996 | Bezek et al. |
| 5,544,352 A | 8/1996 | Egger |
| 5,546,578 A | 8/1996 | Takada et al. |
| 5,596,569 A | 1/1997 | Madonna et al. |
| 5,619,574 A | 4/1997 | Johnson et al. |
| 5,651,125 A | 7/1997 | Witt et al. |
| 5,680,634 A | 10/1997 | Estes |
| 5,684,980 A | 11/1997 | Casselman |
| 5,687,297 A | 11/1997 | Coonan et al. |
| 5,701,464 A | 12/1997 | Aucsmith |
| 5,704,060 A | 12/1997 | Del Monte |
| 5,712,942 A | 1/1998 | Jennings et al. |
| 5,721,898 A | 2/1998 | Beardsley et al. |
| 5,740,244 A | 4/1998 | Indeck et al. |
| 5,740,466 A | 4/1998 | Geldman et al. |
| 5,774,835 A | 6/1998 | Ozawa et al. |
| 5,774,839 A | 6/1998 | Shlomot |
| 5,781,772 A | 7/1998 | Wilkinson, III et al. |
| 5,781,921 A | 7/1998 | Nichols |
| 5,785,636 A | 7/1998 | Bonander et al. |
| 5,802,290 A | 9/1998 | Casselman |
| 5,805,832 A | 9/1998 | Brown et al. |
| 5,809,483 A | 9/1998 | Broka et al. |
| 5,813,000 A | 9/1998 | Furlani |
| 5,819,273 A | 10/1998 | Vora et al. |
| 5,819,290 A | 10/1998 | Fujita et al. |
| 5,826,075 A | 10/1998 | Bealkowski et al. |

(56) References Cited

U.S. PATENT DOCUMENTS

| | | |
|---|---|---|
| 5,845,266 A | 12/1998 | Lupien et al. |
| 5,857,176 A | 1/1999 | Ginsberg |
| 5,864,738 A | 1/1999 | Kessler et al. |
| 5,870,730 A | 2/1999 | Furuya et al. |
| 5,873,071 A | 2/1999 | Ferstenberg et al. |
| 5,884,286 A | 3/1999 | Daughtery, III |
| 5,886,701 A | 3/1999 | Chauvin et al. |
| 5,892,962 A | 4/1999 | Cloutier |
| 5,905,974 A | 5/1999 | Fraser et al. |
| 5,913,211 A | 6/1999 | Nitta |
| 5,930,753 A | 7/1999 | Potamianos et al. |
| 5,943,421 A | 8/1999 | Grabon |
| 5,943,429 A | 8/1999 | Händel |
| 5,950,006 A | 9/1999 | Crater et al. |
| 5,963,923 A | 10/1999 | Garber |
| 5,978,801 A | 11/1999 | Yuasa |
| 5,987,432 A | 11/1999 | Zusman et al. |
| 5,991,881 A | 11/1999 | Conklin et al. |
| 5,995,963 A | 11/1999 | Nanba et al. |
| 6,006,264 A | 12/1999 | Colby et al. |
| 6,016,483 A | 1/2000 | Rickard et al. |
| 6,023,755 A | 2/2000 | Casselman |
| 6,023,760 A | 2/2000 | Karttunen |
| 6,028,939 A | 2/2000 | Yin |
| 6,034,538 A | 3/2000 | Abramovici |
| 6,044,407 A | 3/2000 | Jones et al. |
| 6,058,391 A | 5/2000 | Gardner |
| 6,061,662 A | 5/2000 | Makivic |
| 6,064,739 A | 5/2000 | Davis |
| 6,067,569 A | 5/2000 | Khaki et al. |
| 6,070,172 A | 5/2000 | Lowe |
| 6,073,160 A | 6/2000 | Grantham et al. |
| 6,084,584 A | 7/2000 | Nahi et al. |
| 6,096,091 A | 8/2000 | Hartmann |
| 6,105,067 A | 8/2000 | Batra |
| 6,134,551 A | 10/2000 | Aucsmith |
| 6,138,176 A | 10/2000 | McDonald et al. |
| 6,147,890 A | 11/2000 | Kawana et al. |
| 6,147,976 A | 11/2000 | Shand et al. |
| 6,169,969 B1 | 1/2001 | Cohen |
| 6,173,270 B1 | 1/2001 | Cristofich et al. |
| 6,173,276 B1 | 1/2001 | Kant et al. |
| 6,175,874 B1 | 1/2001 | Imai et al. |
| 6,175,948 B1 | 1/2001 | Miller et al. |
| 6,178,494 B1 | 1/2001 | Casselman |
| 6,195,024 B1 | 2/2001 | Fallon |
| 6,226,676 B1 | 5/2001 | Crump et al. |
| 6,236,980 B1 | 5/2001 | Reese |
| 6,243,753 B1 | 6/2001 | Machin et al. |
| 6,263,321 B1 | 7/2001 | Daughtery, III |
| 6,272,616 B1 | 8/2001 | Fernando et al. |
| 6,279,113 B1 | 8/2001 | Vaidya |
| 6,279,140 B1 | 8/2001 | Slane |
| 6,289,440 B1 | 9/2001 | Casselman |
| 6,295,530 B1 | 9/2001 | Ritchie et al. |
| 6,304,858 B1 | 10/2001 | Mosler et al. |
| 6,307,936 B1 | 10/2001 | Ober et al. |
| 6,309,424 B1 | 10/2001 | Fallon |
| 6,317,728 B1 | 11/2001 | Kane |
| 6,317,795 B1 | 11/2001 | Malkin et al. |
| 6,321,258 B1 | 11/2001 | Stollfus et al. |
| 6,336,150 B1 | 1/2002 | Ellis et al. |
| 6,339,819 B1 | 1/2002 | Huppenthal et al. |
| 6,370,592 B1 | 4/2002 | Kumpf |
| 6,370,645 B1 | 4/2002 | Lee et al. |
| 6,377,942 B1 | 4/2002 | Hinsley et al. |
| 6,381,242 B1 | 4/2002 | Maher, III et al. |
| 6,389,532 B1 | 5/2002 | Gupta et al. |
| 6,397,259 B1 | 5/2002 | Lincke et al. |
| 6,397,335 B1 | 5/2002 | Franczek et al. |
| 6,412,000 B1 | 6/2002 | Riddle et al. |
| 6,415,269 B1 | 7/2002 | Dinwoodie |
| 6,418,419 B1 | 7/2002 | Nieboer et al. |
| 6,430,272 B1 | 8/2002 | Maruyama et al. |
| 6,456,632 B1 | 9/2002 | Baum et al. |
| 6,456,982 B1 | 9/2002 | Pilipovic |
| 6,463,474 B1 | 10/2002 | Fuh et al. |
| 6,499,107 B1 | 12/2002 | Gleichauf et al. |
| 6,535,868 B1 | 3/2003 | Galeazzi et al. |
| 6,546,375 B1 | 4/2003 | Pang et al. |
| 6,564,263 B1 | 5/2003 | Bergman et al. |
| 6,578,147 B1 | 6/2003 | Shanklin et al. |
| 6,581,098 B1 | 6/2003 | Kumpf |
| 6,584,601 B1 | 6/2003 | Kodosky et al. |
| 6,594,643 B1 | 7/2003 | Freeny, Jr. |
| 6,597,812 B1 | 7/2003 | Fallon et al. |
| 6,601,094 B1 | 7/2003 | Mentze et al. |
| 6,601,104 B1 | 7/2003 | Fallon |
| 6,604,158 B1 | 8/2003 | Fallon |
| 6,608,638 B1 | 8/2003 | Kodosky et al. |
| 6,624,761 B2 | 9/2003 | Fallon |
| 6,625,150 B1 | 9/2003 | Yu |
| 6,691,301 B2 | 2/2004 | Bowen |
| 6,704,816 B1 | 3/2004 | Burke |
| 6,707,973 B2 | 3/2004 | Witt et al. |
| 6,711,558 B1 | 3/2004 | Indeck et al. |
| 6,760,439 B1 | 7/2004 | Windirsch |
| 6,765,918 B1 | 7/2004 | Dixon et al. |
| 6,766,304 B2 | 7/2004 | Kemp, II et al. |
| 6,772,132 B1 | 8/2004 | Kemp, II et al. |
| 6,772,136 B2 | 8/2004 | Kant et al. |
| 6,772,345 B1 | 8/2004 | Shetty |
| 6,778,968 B1 | 8/2004 | Gulati |
| 6,785,677 B1 | 8/2004 | Fritchman |
| 6,804,667 B1 | 10/2004 | Martin |
| 6,807,156 B1 | 10/2004 | Veres et al. |
| 6,820,129 B1 | 11/2004 | Courey, Jr. |
| 6,839,686 B1 | 1/2005 | Galant |
| 6,847,645 B1 | 1/2005 | Potter et al. |
| 6,850,906 B1 | 2/2005 | Chadha et al. |
| 6,870,837 B2 | 3/2005 | Ho et al. |
| 6,870,929 B1 | 3/2005 | Greene |
| 6,877,044 B2 | 4/2005 | Lo et al. |
| 6,886,103 B1 | 4/2005 | Brustoloni et al. |
| 6,901,461 B2 | 5/2005 | Bennett |
| 6,931,408 B2 | 8/2005 | Adams et al. |
| 6,931,545 B1 | 8/2005 | Ta et al. |
| 6,941,312 B2 | 9/2005 | Hoffman et al. |
| 6,944,168 B2 | 9/2005 | Paatela et al. |
| 6,978,223 B2 | 12/2005 | Milliken |
| 6,980,976 B2 | 12/2005 | Alpha et al. |
| 6,981,054 B1 | 12/2005 | Krishna |
| 7,003,488 B2 | 2/2006 | Dunne et al. |
| 7,013,232 B2 * | 3/2006 | Fuller, III .......... G06Q 30/0601 702/123 |
| 7,019,674 B2 | 3/2006 | Cadambi et al. |
| 7,024,384 B2 | 4/2006 | Daughtery, III |
| 7,046,848 B2 | 5/2006 | Olcott |
| 7,065,475 B1 | 6/2006 | Brundobler |
| 7,065,482 B2 | 6/2006 | Shorey et al. |
| 7,089,206 B2 | 8/2006 | Martin |
| 7,093,023 B2 | 8/2006 | Lockwood et al. |
| 7,099,838 B1 | 8/2006 | Gastineau et al. |
| 7,101,188 B1 | 9/2006 | Summers et al. |
| 7,103,569 B1 | 9/2006 | Groveman et al. |
| 7,117,280 B2 | 10/2006 | Vasudevan |
| 7,124,106 B1 | 10/2006 | Stallaert et al. |
| 7,127,424 B2 | 10/2006 | Kemp, II et al. |
| 7,127,510 B2 | 10/2006 | Yoda et al. |
| 7,130,913 B2 | 10/2006 | Fallon |
| 7,139,743 B2 | 11/2006 | Indeck et al. |
| 7,149,715 B2 | 12/2006 | Browne et al. |
| 7,161,506 B2 | 1/2007 | Fallon |
| 7,167,980 B2 | 1/2007 | Chiu |
| 7,177,833 B1 | 2/2007 | Marynowski et al. |
| 7,181,437 B2 | 2/2007 | Indeck et al. |
| 7,181,608 B2 | 2/2007 | Fallon et al. |
| 7,191,233 B2 | 3/2007 | Miller |
| 7,222,114 B1 | 5/2007 | Chan et al. |
| 7,224,185 B2 | 5/2007 | Campbell et al. |
| 7,225,188 B1 | 5/2007 | Gai et al. |
| 7,228,289 B2 | 6/2007 | Brumfield et al. |
| 7,249,118 B2 | 7/2007 | Sandler et al. |
| 7,251,629 B1 | 7/2007 | Marynowski et al. |

(56) References Cited

U.S. PATENT DOCUMENTS

| | | |
|---|---|---|
| 7,257,842 B2 | 8/2007 | Barton et al. |
| 7,277,887 B1 | 10/2007 | Burrows et al. |
| 7,286,564 B2 | 10/2007 | Roberts |
| 7,287,037 B2 | 10/2007 | An et al. |
| 7,305,383 B1 | 12/2007 | Kubesh et al. |
| 7,305,391 B2 | 12/2007 | Wyschogrod et al. |
| 7,321,937 B2 | 1/2008 | Fallon |
| 7,353,267 B1 | 4/2008 | Cunningham et al. |
| 7,356,498 B2 | 4/2008 | Kaminsky et al. |
| 7,362,859 B1 | 4/2008 | Robertson et al. |
| 7,363,277 B1 | 4/2008 | Dutta et al. |
| 7,376,755 B2 | 5/2008 | Pandya |
| 7,378,992 B2 | 5/2008 | Fallon |
| 7,386,046 B2 | 6/2008 | Fallon et al. |
| 7,386,564 B2 | 6/2008 | Abdo et al. |
| 7,406,444 B2 | 7/2008 | Eng et al. |
| 7,408,932 B2 | 8/2008 | Kounavis et al. |
| 7,411,957 B2 | 8/2008 | Stacy et al. |
| 7,415,723 B2 | 8/2008 | Pandya |
| 7,417,568 B2 | 8/2008 | Fallon et al. |
| 7,420,931 B2 | 9/2008 | Nanda et al. |
| 7,444,515 B2 | 10/2008 | Dharmapurikar et al. |
| 7,454,418 B1 | 11/2008 | Wang |
| 7,478,431 B1 | 1/2009 | Nachenberg |
| 7,480,253 B1 | 1/2009 | Allan |
| 7,487,264 B2 | 2/2009 | Pandya |
| 7,496,108 B2 | 2/2009 | Biran et al. |
| 7,512,728 B2 * | 3/2009 | Tseng ............... G06F 13/4291 710/100 |
| 7,536,462 B2 | 5/2009 | Pandya |
| 7,552,107 B2 | 6/2009 | Indeck et al. |
| 7,558,753 B2 | 7/2009 | Neubert et al. |
| 7,558,925 B2 | 7/2009 | Bouchard et al. |
| 7,565,525 B2 | 7/2009 | Vorbach et al. |
| 7,587,476 B2 | 9/2009 | Sato |
| 7,603,303 B1 | 10/2009 | Kraus et al. |
| 7,606,267 B2 | 10/2009 | Ho et al. |
| 7,617,291 B2 | 11/2009 | Fan et al. |
| 7,623,660 B1 | 11/2009 | Cory |
| 7,627,693 B2 | 12/2009 | Pandya |
| 7,631,107 B2 | 12/2009 | Pandya |
| 7,660,761 B2 | 2/2010 | Zhou et al. |
| 7,660,793 B2 | 2/2010 | Indeck et al. |
| 7,680,790 B2 | 3/2010 | Indeck et al. |
| 7,685,121 B2 | 3/2010 | Brown et al. |
| 7,698,338 B2 * | 4/2010 | Hinshaw ............... G06F 16/2455 707/754 |
| 7,714,747 B2 | 5/2010 | Fallon |
| 7,715,436 B1 | 5/2010 | Eiriksson et al. |
| 7,760,733 B1 | 7/2010 | Eiriksson et al. |
| 7,761,459 B1 | 7/2010 | Zhang et al. |
| 7,827,190 B2 | 11/2010 | Pandya |
| 7,831,606 B2 | 11/2010 | Pandya |
| 7,831,607 B2 | 11/2010 | Pandya |
| 7,831,720 B1 | 11/2010 | Noureddine et al. |
| 7,840,482 B2 | 11/2010 | Singla et al. |
| 7,870,217 B2 | 1/2011 | Pandya |
| 7,890,692 B2 | 2/2011 | Pandya |
| 7,899,976 B2 | 3/2011 | Pandya |
| 7,899,977 B2 | 3/2011 | Pandya |
| 7,899,978 B2 | 3/2011 | Pandya |
| 7,908,213 B2 | 3/2011 | Monroe et al. |
| 7,912,808 B2 | 3/2011 | Pandya |
| 7,917,299 B2 | 3/2011 | Buhler et al. |
| 7,921,046 B2 | 4/2011 | Parsons et al. |
| 7,944,920 B2 | 5/2011 | Pandya |
| 7,949,650 B2 | 5/2011 | Indeck et al. |
| 7,953,743 B2 | 5/2011 | Indeck et al. |
| 7,954,114 B2 | 5/2011 | Chamberlain et al. |
| 7,991,667 B2 | 8/2011 | Kraus et al. |
| 7,996,348 B2 | 8/2011 | Pandya |
| 8,005,966 B2 | 8/2011 | Pandya |
| 8,027,893 B1 | 9/2011 | Burrows et al. |
| 8,030,888 B2 | 10/2011 | Pandya et al. |
| 8,046,283 B2 | 10/2011 | Burns et al. |
| 8,051,022 B2 | 11/2011 | Pandya |
| 8,055,601 B2 | 11/2011 | Pandya |
| 8,069,102 B2 | 11/2011 | Indeck et al. |
| 8,095,508 B2 | 1/2012 | Chamberlain et al. |
| 8,131,697 B2 | 3/2012 | Indeck et al. |
| 8,156,101 B2 | 4/2012 | Indeck et al. |
| 8,181,239 B2 | 5/2012 | Pandya |
| 8,200,599 B2 | 6/2012 | Pandya |
| 8,326,819 B2 | 12/2012 | Indeck et al. |
| 8,374,986 B2 | 2/2013 | Indeck et al. |
| 8,379,841 B2 | 2/2013 | Taylor et al. |
| 8,407,122 B2 | 3/2013 | Parsons et al. |
| 8,601,086 B2 | 12/2013 | Pandya |
| 8,620,881 B2 | 12/2013 | Chamberlain et al. |
| 8,762,249 B2 | 6/2014 | Taylor et al. |
| 8,768,805 B2 | 7/2014 | Taylor et al. |
| 8,768,888 B2 | 7/2014 | Chamberlain et al. |
| 8,843,408 B2 | 9/2014 | Singla et al. |
| 8,879,727 B2 | 11/2014 | Taylor et al. |
| 8,880,501 B2 | 11/2014 | Indeck et al. |
| 8,880,551 B2 * | 11/2014 | Hinshaw ............... G06F 16/2455 707/770 |
| 8,983,063 B1 | 3/2015 | Taylor et al. |
| 9,020,928 B2 | 4/2015 | Indeck et al. |
| 9,176,775 B2 | 11/2015 | Chamberlain et al. |
| 10,121,196 B2 | 11/2018 | Parsons et al. |
| 10,650,452 B2 | 5/2020 | Parsons et al. |
| 10,719,334 B2 | 7/2020 | Chamberlain et al. |
| 10,929,152 B2 | 2/2021 | Chamberlain et al. |
| 2001/0003193 A1 | 6/2001 | Woodring et al. |
| 2001/0004354 A1 | 6/2001 | Jolitz |
| 2001/0005314 A1 | 6/2001 | Farooq et al. |
| 2001/0007127 A1 | 7/2001 | Staring |
| 2001/0013048 A1 | 8/2001 | Imbert de Tremiolles et al. |
| 2001/0014093 A1 | 8/2001 | Yoda et al. |
| 2001/0015753 A1 | 8/2001 | Myers |
| 2001/0015919 A1 | 8/2001 | Kean |
| 2001/0025315 A1 | 9/2001 | Jolitz |
| 2001/0033656 A1 | 10/2001 | Gligor et al. |
| 2001/0042040 A1 | 11/2001 | Keith |
| 2001/0047473 A1 | 11/2001 | Fallon |
| 2001/0052038 A1 | 12/2001 | Fallon et al. |
| 2001/0056547 A1 | 12/2001 | Dixon |
| 2002/0006196 A1 | 1/2002 | Shimoyama et al. |
| 2002/0010825 A1 | 1/2002 | Wilson |
| 2002/0016773 A1 | 2/2002 | Ohkuma et al. |
| 2002/0019812 A1 | 2/2002 | Board et al. |
| 2002/0021802 A1 | 2/2002 | Muratani et al. |
| 2002/0023010 A1 | 2/2002 | Rittmaster et al. |
| 2002/0031125 A1 | 3/2002 | Sato |
| 2002/0041685 A1 | 4/2002 | McLoone et al. |
| 2002/0054604 A1 | 5/2002 | Kadambi et al. |
| 2002/0069370 A1 | 6/2002 | Mack |
| 2002/0069375 A1 | 6/2002 | Bowen |
| 2002/0072893 A1 | 6/2002 | Wilson |
| 2002/0080871 A1 | 6/2002 | Fallon et al. |
| 2002/0082967 A1 | 6/2002 | Kaminsky et al. |
| 2002/0095512 A1 | 7/2002 | Rana et al. |
| 2002/0100029 A1 | 7/2002 | Bowen |
| 2002/0101425 A1 | 8/2002 | Hamid |
| 2002/0103663 A1 | 8/2002 | Bankier et al. |
| 2002/0105911 A1 | 8/2002 | Pruthi et al. |
| 2002/0106078 A1 | 8/2002 | Qi et al. |
| 2002/0112167 A1 | 8/2002 | Boneh et al. |
| 2002/0116508 A1 | 8/2002 | Khan et al. |
| 2002/0119803 A1 | 8/2002 | Bitterlich et al. |
| 2002/0129140 A1 | 9/2002 | Peled et al. |
| 2002/0138376 A1 | 9/2002 | Hinkle |
| 2002/0143521 A1 | 10/2002 | Call |
| 2002/0147670 A1 | 10/2002 | Lange |
| 2002/0150248 A1 | 10/2002 | Kovacevic |
| 2002/0156946 A1 | 10/2002 | Masters et al. |
| 2002/0156998 A1 | 10/2002 | Casselman |
| 2002/0159530 A1 | 10/2002 | Olson et al. |
| 2002/0162025 A1 | 10/2002 | Sutton et al. |
| 2002/0166063 A1 | 11/2002 | Lachman et al. |
| 2002/0169873 A1 | 11/2002 | Zodnik |
| 2002/0180742 A1 | 12/2002 | Hamid |
| 2002/0181709 A1 | 12/2002 | Sorimachi et al. |

(56) References Cited

U.S. PATENT DOCUMENTS

| | | |
|---|---|---|
| 2002/0188594 A1 | 12/2002 | Kulp et al. |
| 2002/0191784 A1 | 12/2002 | Yup et al. |
| 2002/0196808 A1 | 12/2002 | Karri et al. |
| 2002/0199173 A1 | 12/2002 | Bowen |
| 2003/0009411 A1 | 1/2003 | Ram et al. |
| 2003/0009693 A1 | 1/2003 | Brock et al. |
| 2003/0014521 A1 | 1/2003 | Elson et al. |
| 2003/0014662 A1 | 1/2003 | Gupta et al. |
| 2003/0018630 A1 | 1/2003 | Indeck et al. |
| 2003/0023653 A1 | 1/2003 | Dunlop et al. |
| 2003/0023876 A1 | 1/2003 | Bardsley et al. |
| 2003/0028408 A1 | 2/2003 | RuDusky |
| 2003/0028690 A1 | 2/2003 | Appleby-Alis et al. |
| 2003/0028864 A1 | 2/2003 | Bowen |
| 2003/0033234 A1 | 2/2003 | RuDusky |
| 2003/0033240 A1 | 2/2003 | Balson et al. |
| 2003/0033450 A1 | 2/2003 | Appleby-Alis |
| 2003/0033514 A1 | 2/2003 | Appleby-Allis et al. |
| 2003/0033588 A1 | 2/2003 | Alexander |
| 2003/0033594 A1 | 2/2003 | Bowen |
| 2003/0035547 A1 | 2/2003 | Newton |
| 2003/0037037 A1 | 2/2003 | Adams et al. |
| 2003/0037321 A1 | 2/2003 | Bowen |
| 2003/0039355 A1 | 2/2003 | McCanny et al. |
| 2003/0041129 A1 | 2/2003 | Appleby-Allis |
| 2003/0043805 A1 | 3/2003 | Graham et al. |
| 2003/0046668 A1 | 3/2003 | Bowen |
| 2003/0051043 A1 | 3/2003 | Wyschogrod et al. |
| 2003/0055658 A1 | 3/2003 | RuDusky |
| 2003/0055769 A1 | 3/2003 | RuDusky |
| 2003/0055770 A1 | 3/2003 | RuDusky |
| 2003/0055771 A1 | 3/2003 | RuDusky |
| 2003/0055777 A1 | 3/2003 | Ginsberg |
| 2003/0059054 A1 | 3/2003 | Hu et al. |
| 2003/0061409 A1 | 3/2003 | RuDusky |
| 2003/0065607 A1 | 4/2003 | Satchwell |
| 2003/0065943 A1 | 4/2003 | Geis et al. |
| 2003/0068036 A1 | 4/2003 | Macchetti et al. |
| 2003/0069723 A1 | 4/2003 | Hegde |
| 2003/0074177 A1 | 4/2003 | Bowen |
| 2003/0074489 A1 | 4/2003 | Steger et al. |
| 2003/0074582 A1 | 4/2003 | Patel et al. |
| 2003/0078865 A1 | 4/2003 | Lee |
| 2003/0079060 A1 | 4/2003 | Dunlop |
| 2003/0086300 A1 | 5/2003 | Noyes et al. |
| 2003/0090397 A1 | 5/2003 | Rasmussen |
| 2003/0093347 A1 | 5/2003 | Gray |
| 2003/0097481 A1 | 5/2003 | Richter |
| 2003/0099254 A1 | 5/2003 | Richter |
| 2003/0099352 A1 | 5/2003 | Lu et al. |
| 2003/0105620 A1 | 6/2003 | Bowen |
| 2003/0105721 A1 | 6/2003 | Ginter et al. |
| 2003/0108195 A1 | 6/2003 | Okada et al. |
| 2003/0110229 A1 | 6/2003 | Kulig et al. |
| 2003/0115485 A1 | 6/2003 | Milliken |
| 2003/0117971 A1 | 6/2003 | Aubury |
| 2003/0120460 A1 | 6/2003 | Aubury |
| 2003/0121010 A1 | 6/2003 | Aubury |
| 2003/0123587 A1 | 7/2003 | Blaum et al. |
| 2003/0126065 A1 | 7/2003 | Eng et al. |
| 2003/0130899 A1 | 7/2003 | Ferguson et al. |
| 2003/0140337 A1 | 7/2003 | Aubury |
| 2003/0149869 A1 | 8/2003 | Gleichauf |
| 2003/0163715 A1 | 8/2003 | Wong |
| 2003/0167348 A1* | 9/2003 | Greenblat ............... H04L 12/42 709/251 |
| 2003/0169877 A1 | 9/2003 | Liu et al. |
| 2003/0172017 A1 | 9/2003 | Feingold et al. |
| 2003/0177253 A1 | 9/2003 | Schuehler et al. |
| 2003/0184593 A1 | 10/2003 | Dunlop |
| 2003/0187662 A1 | 10/2003 | Wilson |
| 2003/0191876 A1 | 10/2003 | Fallon |
| 2003/0198345 A1 | 10/2003 | Van Buer |
| 2003/0208430 A1 | 11/2003 | Gershon |
| 2003/0217306 A1 | 11/2003 | Harthcock et al. |
| 2003/0221013 A1 | 11/2003 | Lockwood et al. |
| 2003/0233302 A1 | 12/2003 | Weber et al. |
| 2004/0006433 A1 | 1/2004 | Robson et al. |
| 2004/0010612 A1 | 1/2004 | Pandya |
| 2004/0015502 A1 | 1/2004 | Alexander et al. |
| 2004/0015633 A1 | 1/2004 | Smith |
| 2004/0019703 A1 | 1/2004 | Burton |
| 2004/0028047 A1 | 2/2004 | Hou et al. |
| 2004/0034587 A1 | 2/2004 | Amberson et al. |
| 2004/0049596 A1 | 3/2004 | Schuehler et al. |
| 2004/0054924 A1 | 3/2004 | Chuah et al. |
| 2004/0059666 A1 | 3/2004 | Waelbroeck et al. |
| 2004/0064737 A1 | 4/2004 | Milliken et al. |
| 2004/0100977 A1 | 5/2004 | Suzuki et al. |
| 2004/0105458 A1 | 6/2004 | Ishizuka |
| 2004/0111632 A1 | 6/2004 | Halperin |
| 2004/0117645 A1 | 6/2004 | Okuda et al. |
| 2004/0123258 A1 | 6/2004 | Butts |
| 2004/0133854 A1 | 7/2004 | Black |
| 2004/0146164 A1 | 7/2004 | Jonas et al. |
| 2004/0162826 A1 | 8/2004 | Wyschogrod et al. |
| 2004/0165721 A1 | 8/2004 | Sano et al. |
| 2004/0177340 A1 | 9/2004 | Hsu et al. |
| 2004/0186804 A1 | 9/2004 | Chakraborty et al. |
| 2004/0186814 A1 | 9/2004 | Chalermkraivuth et al. |
| 2004/0196905 A1 | 10/2004 | Yamane et al. |
| 2004/0199448 A1 | 10/2004 | Chalermkraivuth et al. |
| 2004/0205149 A1 | 10/2004 | Dillon et al. |
| 2004/0208318 A1 | 10/2004 | Henry et al. |
| 2004/0218762 A1 | 11/2004 | Le Saint et al. |
| 2004/0228479 A1 | 11/2004 | Crispin et al. |
| 2004/0255130 A1 | 12/2004 | Henry et al. |
| 2005/0005145 A1 | 1/2005 | Teixeira |
| 2005/0033672 A1 | 2/2005 | Lasry et al. |
| 2005/0044344 A1 | 2/2005 | Stevens |
| 2005/0080649 A1 | 4/2005 | Alvarez et al. |
| 2005/0086520 A1 | 4/2005 | Dharmapurikar et al. |
| 2005/0091142 A1 | 4/2005 | Renton et al. |
| 2005/0097027 A1 | 5/2005 | Kavanaugh |
| 2005/0108518 A1 | 5/2005 | Pandya |
| 2005/0131790 A1 | 6/2005 | Benzschawel et al. |
| 2005/0135608 A1 | 6/2005 | Zheng |
| 2005/0175010 A1 | 8/2005 | Wilson et al. |
| 2005/0175175 A1 | 8/2005 | Leech |
| 2005/0187844 A1 | 8/2005 | Chalermkraivuth et al. |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |
| 2005/0187974 A1 | 8/2005 | Gong |
| 2005/0195832 A1 | 9/2005 | Dharmapurikar et al. |
| 2005/0197938 A1 | 9/2005 | Davie et al. |
| 2005/0197939 A1 | 9/2005 | Davie et al. |
| 2005/0197948 A1 | 9/2005 | Davie et al. |
| 2005/0216384 A1 | 9/2005 | Partlow et al. |
| 2005/0229254 A1 | 10/2005 | Singh et al. |
| 2005/0243824 A1 | 11/2005 | Abbazia et al. |
| 2005/0267836 A1 | 12/2005 | Crosthwaite et al. |
| 2005/0283423 A1 | 12/2005 | Moser et al. |
| 2006/0020536 A1 | 1/2006 | Renton et al. |
| 2006/0020715 A1 | 1/2006 | Jungck |
| 2006/0031154 A1 | 2/2006 | Noviello et al. |
| 2006/0031156 A1 | 2/2006 | Noviello et al. |
| 2006/0031263 A1 | 2/2006 | Arrouye et al. |
| 2006/0036693 A1 | 2/2006 | Hulten et al. |
| 2006/0053295 A1 | 3/2006 | Madhusudan et al. |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0059083 A1 | 3/2006 | Friesen et al. |
| 2006/0059213 A1 | 3/2006 | Evoy |
| 2006/0143099 A1 | 6/2006 | Partlow et al. |
| 2006/0259417 A1 | 11/2006 | Marynowski et al. |
| 2006/0294059 A1 | 12/2006 | Chamberlain et al. |
| 2007/0061594 A1 | 3/2007 | Ginter et al. |

(56) References Cited

U.S. PATENT DOCUMENTS

| | | |
|---|---|---|
| 2007/0067108 A1 | 3/2007 | Buhler et al. |
| 2007/0078837 A1 | 4/2007 | Indeck et al. |
| 2007/0118453 A1 | 5/2007 | Bauerschmidt et al. |
| 2007/0118500 A1 | 5/2007 | Indeck et al. |
| 2007/0156574 A1 | 7/2007 | Marynowski et al. |
| 2007/0174841 A1 | 7/2007 | Chamberlain et al. |
| 2007/0198523 A1 | 8/2007 | Hayim |
| 2007/0237327 A1 | 10/2007 | Taylor et al. |
| 2007/0277036 A1 | 11/2007 | Chamberlain et al. |
| 2007/0294157 A1 | 12/2007 | Singla et al. |
| 2007/0297608 A1 | 12/2007 | Jonas et al. |
| 2008/0086274 A1 | 4/2008 | Chamberlain et al. |
| 2008/0109413 A1 | 5/2008 | Indeck et al. |
| 2008/0114724 A1 | 5/2008 | Indeck et al. |
| 2008/0114725 A1 | 5/2008 | Indeck et al. |
| 2008/0114760 A1 | 5/2008 | Indeck et al. |
| 2008/0126320 A1 | 5/2008 | Indeck et al. |
| 2008/0133453 A1 | 6/2008 | Indeck et al. |
| 2008/0133519 A1 | 6/2008 | Indeck et al. |
| 2008/0243675 A1 | 10/2008 | Parsons et al. |
| 2008/0253395 A1 | 10/2008 | Pandya |
| 2008/0260158 A1 | 10/2008 | Chin et al. |
| 2008/0275805 A1 | 11/2008 | Hecht |
| 2009/0060197 A1 | 3/2009 | Taylor et al. |
| 2009/0182683 A1 | 7/2009 | Taylor et al. |
| 2009/0262741 A1 | 10/2009 | Jungck et al. |
| 2009/0287628 A1 | 11/2009 | Indeck et al. |
| 2010/0005036 A1 | 1/2010 | Kraus et al. |
| 2010/0094858 A1 | 4/2010 | Indeck et al. |
| 2010/0174770 A1 | 7/2010 | Pandya |
| 2010/0257537 A1* | 10/2010 | Hinshaw .............. G06F 16/273 718/105 |
| 2011/0040701 A1 | 2/2011 | Singla et al. |
| 2011/0178911 A1 | 7/2011 | Parsons et al. |
| 2011/0178912 A1 | 7/2011 | Parsons et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179050 A1 | 7/2011 | Parsons et al. |
| 2011/0184844 A1 | 7/2011 | Parsons et al. |
| 2011/0199243 A1 | 8/2011 | Fallon et al. |
| 2011/0231446 A1 | 9/2011 | Buhler et al. |
| 2011/0246353 A1 | 10/2011 | Kraus et al. |
| 2011/0252008 A1 | 10/2011 | Chamberlain et al. |
| 2011/0291615 A1 | 12/2011 | Pandya et al. |
| 2012/0109849 A1 | 5/2012 | Chamberlain et al. |
| 2012/0110316 A1 | 5/2012 | Chamberlain et al. |
| 2012/0116998 A1 | 5/2012 | Indeck et al. |
| 2012/0117610 A1 | 5/2012 | Pandya |
| 2012/0130922 A1 | 5/2012 | Indeck et al. |
| 2012/0215801 A1 | 8/2012 | Indeck et al. |
| 2013/0007000 A1 | 1/2013 | Indeck et al. |
| 2013/0018835 A1 | 1/2013 | Pandya |
| 2013/0151458 A1 | 6/2013 | Indeck et al. |
| 2014/0180903 A1 | 6/2014 | Parsons et al. |
| 2014/0180904 A1 | 6/2014 | Parsons et al. |
| 2014/0180905 A1 | 6/2014 | Parsons et al. |
| 2014/0181133 A1 | 6/2014 | Parsons et al. |
| 2014/0310148 A1 | 10/2014 | Taylor et al. |
| 2014/0310717 A1 | 10/2014 | Chamberlain et al. |
| 2015/0023501 A1 | 1/2015 | Taylor et al. |
| 2015/0052148 A1 | 2/2015 | Indeck et al. |
| 2015/0055776 A1 | 2/2015 | Taylor et al. |
| 2018/0157504 A1 | 6/2018 | Chamberlain et al. |
| 2019/0155831 A1 | 5/2019 | Indeck et al. |
| 2019/0205975 A1 | 7/2019 | Taylor et al. |

FOREIGN PATENT DOCUMENTS

| | | | |
|---|---|---|---|
| EP | 0851358 | A | 7/1998 |
| EP | 0887723 | | 12/1998 |
| EP | 0911738 | A | 4/1999 |
| EP | 0989754 | A2 | 3/2000 |
| JP | 57-137978 | A | 8/1982 |
| JP | 58-102378 | A | 6/1983 |
| JP | 61-107596 | A | 5/1986 |
| JP | 63-143668 | A | 6/1988 |
| JP | 02136900 | A | 5/1990 |
| JP | 03014075 | A | 1/1991 |
| JP | 04-205174 | A | 7/1992 |
| JP | 05-101102 | A | 4/1993 |
| JP | 05-217289 | A | 8/1993 |
| JP | 09-054797 | A | 2/1997 |
| JP | 09145544 | A | 6/1997 |
| JP | 9-269930 | | 10/1997 |
| JP | 10313341 | | 11/1998 |
| JP | 11306268 | A | 11/1999 |
| JP | 11316765 | A | 11/1999 |
| JP | 2000-076270 | A | 3/2000 |
| JP | 2000285134 | A | 10/2000 |
| JP | 2000286715 | A | 10/2000 |
| JP | 2000357176 | | 12/2000 |
| JP | 2001014239 | | 1/2001 |
| JP | 2001217834 | | 8/2001 |
| JP | 2001268071 | A | 9/2001 |
| JP | 2001285283 | A | 10/2001 |
| JP | 2001518724 | | 10/2001 |
| JP | 2001357048 | | 12/2001 |
| JP | 2002101089 | A | 4/2002 |
| JP | 2002108910 | A | 4/2002 |
| JP | 2003122442 | A | 4/2003 |
| WO | 199010910 | | 9/1990 |
| WO | 199409443 | A1 | 4/1994 |
| WO | 199737735 | | 10/1997 |
| WO | 199905814 | | 2/1999 |
| WO | 1999055052 | | 10/1999 |
| WO | 2000041136 | A1 | 7/2000 |
| WO | 2001022425 | A | 3/2001 |
| WO | 2001039577 | | 6/2001 |
| WO | 2001061913 | | 8/2001 |
| WO | 2001080082 | A2 | 10/2001 |
| WO | 2001080558 | | 10/2001 |
| WO | 2002061525 | | 8/2002 |
| WO | 2002082271 | | 10/2002 |
| WO | 2003100650 | | 4/2003 |
| WO | 2003036845 | | 5/2003 |
| WO | 2003100662 | | 12/2003 |
| WO | 2003104943 | A2 | 12/2003 |
| WO | 2004014065 | A2 | 2/2004 |
| WO | 2004017604 | | 2/2004 |
| WO | 2004042560 | A | 5/2004 |
| WO | 2004042561 | A | 5/2004 |
| WO | 2004042562 | | 5/2004 |
| WO | 2004042574 | A | 5/2004 |
| WO | 2005017708 | A | 2/2005 |
| WO | 2005026925 | | 3/2005 |
| WO | 2005048134 | A | 5/2005 |
| WO | 2005081855 | A2 | 9/2005 |
| WO | 2005114339 | A2 | 12/2005 |
| WO | 2006023948 | | 3/2006 |
| WO | 2006060571 | A2 | 6/2006 |
| WO | 2007079095 | A2 | 7/2007 |
| WO | 2008073824 | A1 | 6/2008 |

OTHER PUBLICATIONS

The Flexibility of configurable computing, Villasenor et al., IEEE (Year: 1998).*

Programmable Active Memories: Reconfigurable Systems Come of Age, Vuillemin et al., IEEE (Year: 1996).*

Data Search and Reorganization Using FPGAs: Application to Spatial Pointer-based Data Structures, Diniz et ., IEEE (Year: 2003).*

Lin et al., "Real-Time Image Template Matching Based on Systolic Array Processor", International Journal of Electronics; Dec. 1, 1992; pp. 1165-1176; vol. 73, No. 6; London, Great Britain.

Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.

(56) References Cited

OTHER PUBLICATIONS

Lockwood et al., "Hello, World: A Simple Application for the Field Programmable Port Extender (FPX)", Washington University, Department of Computer Science, Technical Report WUCS-00-12, Jul. 11, 2000.
Lockwood et al., "Parallel FPGA Programming over Backplane Chassis", Washington University, Department of Computer Science, Technical Report WUCS-00-11, Jun. 12, 2000.
Lockwood et al., "Reprogrammable Network Packet Processing on the Field Programmable Port Extender (FPX)", ACM International Symposium on Field Programmable Gate Arrays (FPGA 2001), Monterey, CA, Feb. 2001, pp. 87-93.
Lockwood, "An Open Platform for Development of Network Processing Modules in Reprogrammable Hardware", IEC DesignCon 2001, Santa Clara, CA, Jan. 2001, Paper WB-19.
Lockwood, "Building Networks with Reprogrammable Hardware", Field Programmable Port Extender: Jan. 2002 Gigabit Workshop Tutorial, Washington University, St. Louis, MO, Jan. 3-4, 2002.
Lockwood, "Evolvable Internet Hardware Platforms", NASA/DoD Workshop on Evolvable Hardware (EHW'01), Long Beach, CA, Jul. 12-14, 2001, pp. 271-279.
Lockwood, "Hardware Laboratory Configuration", Field Programmable Port Extender: Jan. 2002 Gigabit Workshop Tutorial, Washington University, St. Louis, MO, Jan. 3-4, 2002.
Lockwood, "Introduction", Field Programmable Port Extender: Jan. 2002 Gigabit Workshop Tutorial, Washington University, St. Louis, MO, Jan. 3-4, 2002.
Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.
Lockwood, "Protocol Processing on the FPX", Field Programmable Port Extender: Jan. 2002 Gigabit Workshop Tutorial, Washington University, St. Louis, MO, Jan. 3-4, 2002.
Lockwood, "Simulation and Synthesis", Field Programmable Port Extender: Jan. 2002 Gigabit Workshop Tutorial, Washington University, St. Louis, MO, Jan. 3-4, 2002.
Lockwood, "Simulation of the Hello World Application for the Field-Programmable Port Extender (FPX)", Washington University, Applied Research Lab, Spring 2001 Gigabits Kits Workshop.
Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.
Madhusudan, "Design of a System for Real-Time Worm Detection", Power Point Presentation in Support of Master's Thesis, Washington Univ., Dept. of Computer Science and Engineering, St. Louis, MO, Aug. 2004.
Mao et al., "Cluster-based Online Monitoring System of Web Traffic", Dept. of Computer Science and Technology, Tsinghua Univ., Bejing, 100084 P.R. China.
Minutes of the Oral Proceedings for EP Patent Application No. 03729000.4 dated Jul. 12, 2010.
Mitra, et al., "An FPGA Implementation of Triangle Mesh Decompression", Proceedings of the 10th Annual Symposium on Field-Programmable Custom Computing Machines, 2002, pp. 1-10.
Mitzenmacher, "Compressed Bloom Filters", IEEE/ACM Transactions on Networking, Oct. 2002 (manuscript received Aug. 1, 2001 and revised Dec. 5, 2001), pp. 604-612, vol. 10, No. 5, U.S.A.
Mosanya et al., "A FPGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.
Moscola et al., "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.
Moscola et al., "FPSed: A Streaming Content Search-and-Replace Module for an Internet Firewall", Proc. of Hot Interconnects, 11th Symposium on High Performance Interconnects, pp. 122-129, Aug. 20, 2003.
Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.
Navarro, "A Guided Tour to Approximate String Matching", ACM Computing Surveys, vol. 33, No. 1, Mar. 2001, pp. 31-88.
Necker et al., "TCP-Stream Reassembly and State Tracking in Hardware", School of Electrical and Computer Engineering, Georgia Institute of Technology, Atlanta, GA.
Niewczas et al., "A Pattern Matching Algorithm for Verification and Analysis of Very Large IC Layouts", ACM, Apr. 1998, pp. 129-134.
Notice of Allowance for U.S. Appl. No. 11/339,892 dated Jan. 20, 2011.
Notice of Allowance for U.S. Appl. No. 11/359,285 dated Dec. 8, 2010.
Notice of Allowance for U.S. Appl. No. 11/561,615 dated Sep. 12, 2011.
Notice of Allowance for U.S. Appl. No. 11/765,306 dated Jan. 25, 2011.
Notice of Allowance for U.S. Appl. No. 11/932,391 dated Jan. 19, 2011.
Notice of Allowance for U.S. Appl. No. 11/932,652 dated Jan. 19, 2011.
Notice of Allowance for U.S. Appl. No. 12/703,388 dated Jan. 3, 2011.
Nunez et al., "The X-MatchLITE FPGA-Based Data Compressor", Euromicro Conference 1999, Proceedings, Italy, Sep. 8-10, 1999, pp. 126-132, Los Alamitos, CA.
Nunez, et al., "Lossless Data Compression Programmable Hardware for High-Speed Data Networks", IEEE International Conference on Field-Programmable Technology, 2002, pp. 290-293, Dept. of Electronic and Electrical Engineering, Loughborough University, Longhborough, UK.
Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.
Office Action for CA Application 2522862 dated May 17, 2011.
Office Action for CA Application 2522862 dated May 3, 2010.
Office Action for CA Application 2523548 dated Aug. 31, 2012.
Office Action for CA Application 2523548 dated Jan. 19, 2012.
Office Action for CA Application 2523548 dated Mar. 31, 2011.
Office Action for CA Application 2759064 dated Oct. 10, 2014.
Office Action for CA Application 2836758 dated Oct. 21, 2015.
Office Action for CA Application 2836758 dated Sep. 18, 2014.
Office Action for EP Application 04753259.3 dated Apr. 15, 2010.
Office Action for EP Application 04753259.3 dated Jun. 25, 2014.
Office Action for EP Application 12165559.1 dated Apr. 28, 2016.
Office Action for EP Application 12165559.1 dated Jul. 7, 2014.
Office Action for JP Application 2006-514919 dated Aug. 24, 2010.
"A Reconfigurable Computing Model for Biological Research Application of Smith-Waterman Analysis to Bacterial Genomes" A White Paper Prepared by Star Bridge Systems, Inc. [retrieved Dec. 12, 2006], Retrieved from the Internet: <URL: http://www.starbridgesystems.com/resources/whitepapers/Smith%20Waterman%20Whitepaper.pdf.
"Lucent Technologies Delivers "PayloadPlus" Network Processors for Programmable, MultiProtocol, OC-48c Processing", Lucent Technologies Press Release, downloaded from http://www.lucent.com/press/1000/0010320.meb.html on Mar. 21, 2002.
"Overview, Field Programmable Port Extender", Jan. 2002 Gigabit Workshop Tutorial, Washington University, St. Louis, MO, Jan. 3-4, 2002, pp. 1-4.
"Payload Plus™ Agere System Interface", Agere Systems Product Brief, Jun. 2001, downloaded from Internet, Jan. 2002, pp. 1-6.
"RFC793: Transmission Control Protocol, Darpa Internet Program, Protocol Specification", Sep. 1981.

(56) References Cited

OTHER PUBLICATIONS

"Technology Overview", Data Search Systems Incorporated, downloaded from the http://www.datasearchsystems.com/tech.htm on Apr. 19, 2004.
"The Field-Programmable Port Extender (FPX)", downloaded from http://www.arl.wustl.edu/arl/ in Mar. 2002.
Altschul et al., "Basic Local Alignment Search Tool", J. Mol. Biol., Oct. 5, 1990, 215, pp. 403-110.
Amanuma et al., "A FPGA Architecture For High Speed Computation", Proceedings of 60th Convention Architecture, Software Science, Engineering, Mar. 14, 2000, pp. 1-163-1-164, Information Processing Society, Japan.
Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.
Anonymous, "Method for Allocating Computer Disk Space to a File of Known Size", IBM Technical Disclosure Bulletin, vol. 27, No. 10B, Mar. 1, 1985, New York.
ANSI X9.52-1998, "Triple Data Encryption Algorithm Modes of Operation", American National Standards Institute, Approved: Jul. 29, 1998.
Arnold et al., "The Splash 2 Processor and Applications", Proceedings 1993 IEEE International Conference on Computer Design: VLSI In Computers and Processors (ICCD '93), Oct. 3, 1993, pp. 482-485, IEEE Computer Society, Cambridge, MA USA.
Artan et al., "Multi-packet Signature Detection using Prefix Bloom Filters", 2005, IEEE, pp. 1811-1816.
Asami et al., "Improvement of DES Key Search on FPGA-Based Parallel Machine "RASH"", Proceedings of Information Processing Society, Aug. 15, 2000, pp. 50-57, vol. 41, No. SIG5 (HPS1), Japan.
Baboescu et al., "Scalable Packet Classification," SIGCOMM'01, Aug. 27-31, 2001, pp. 199-210, San Diego, California, USA; http://www.ecse.rpi.edu/homepages/shivkuma/teaching/sp2001/readings/baboescu-pkt-classification.pdf.
Baer, "Computer Systems Architecture", 1980, pp. 262-265; Computer Science Press, Potomac, Maryland.
Baeza-Yates et al., "New and Faster Filters for Multiple Approximate String Matching", Random Structures and Algorithms (RSA), Jan. 2002, pp. 23-49, vol. 20, No. 1.
Baker et al., "Time and Area Efficient Pattern Matching on FPGAs", ACM, Feb. 22-24, 2004, pp. 223-232.
Barone-Adesi et al., "Efficient Analytic Approximation of American Option Values", Journal of Finance, vol. 42, No. 2 (Jun. 1987), pp. 301-320.
Behrens et al., "BLASTN Redundancy Filter in Reprogrammable Hardware," Final Project Submission, Fall 2003, Department of Computer Science and Engineering, Washington University.
Berk, "JLex: A lexical analyzer generator for Java™ ", downloaded from http://www.cs.princeton.edu/~appel/modern/java/Jlex/ in Jan. 2002, pp. 1-18.
Bianchi et al., "Improved Queueing Analysis of Shared Buffer Switching Networks", ACM, Aug. 1993, pp. 482-490.
Black, "Dictionary of Algorithms and Data Structures", NIST 2004, downloaded from http://www.nist.gov/dads/HTML/fractionalKnapsack.html.
Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.
Braun et al., "Layered Protocol Wrappers for Internet Packet Processing in Reconfigurable Hardware", Proceedings of Hot Interconnects 9 (Hotl-9) Stanford, CA, Aug. 22-24, 2001, pp. 93-98.
Braun et al., "Protocol Wrappers for Layered Network Packet Processing in Reconfigurable Hardware", IEEE Micro, Jan.-Feb. 2002, pp. 66-74.
Cavnar et al., "N-Gram-Based Text Categorization", Proceedings of SDAIR-94, 3rd Annual Symposium on Document Analysis and Information Retrieval, Las Vegas, pp. 161-175, 1994.
Celko, "Joe Celko's Data & Databases: Concepts in Practice", 1999, pp. 72-74, Morgan Kaufmann Publishers.
Chamberlain et al., "The Mercury System: Embedding Computation Into Disk Drives", 7th High Performance Embedded Computing Workshop, Sep. 2003, Boston, MA.
Chamberlain et al., "The Mercury System: Exploiting Truly Fast Hardware for Data Search", Proc. of Workshop on Storage Network Architecture and Parallel I/Os, Sep. 2003, New Orleans, LA.
Chaney et al., "Design of a Gigabit ATM Switch", Washington University, St. Louis.
Chenna et al., "Multiple Sequence Alignment with the Clustal Series of Programs", Nucleic Acids Research, 2003, vol. 31, No. 13, pp. 3497-3500.
Cho et al., "Deep Packet Filter with Dedicated Logic and Read Only Memories", 12th Annual IEEE Symposium on Field-Programmable Custom Computing Machines, Apr. 2004.
Cho, "A Fast Regular Expression Indexing Engine", Proc. of 18th Int'l Conv. on Data Engineering, 2001, pp. 1-12.
Chodowiec et al., "Fast Implementations of Secret-Key Block Ciphers Using Mixed Inter- and Outer-Round Pipelining", Proceedings of International Symposium on FPGAs, pp. 94-102 (Feb. 2001).
Choi et al., "Design of a Flexible Open Platform for High Performance Active Networks", Allerton Conference, 1999, Champaign, IL.
Cholleti, "Storage Allocation in Bounded Time", MS Thesis, Dept. of Computer Science and Engineering, Washington Univeristy, St. Louis, MO (Dec. 2002). Available as Washington University Technical Report WUCSE-2003-2.
Clark et al., "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.
Cloutier et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.
Cole, "Real-Time Computation by n-Dimensional Iterative Arrays of Finite-State Machines", Switching and Automata Theory, IEEE Conference Record of Seventh Annual Symposium, 1996, Digital Object Identifier: 10.1109/SWAT.1966.17, pp. 53-77.
Compton et al., "Configurable Computing: A Survey of Systems and Software", Technical Report, Northwestern University, Dept. of ECE, 1999.
Compton et al., "Reconfigurable Computing: A Survey of Systems and Software", Technical Report, Northwestern University, Dept. of ECE, 1999, presented by Yi-Gang Tai.
Compton et al., "Reconfigurable Computing: A Survey of Systems and Software", University of Washington, ACM Computing Surveys, Jun. 2, 2002, pp. 171-210, vol. 34 No. 2, <http://www.idi.ntnu.no/emner/tdt22/2011/reconfig.pdf>.
Cong et al., "An Optional Technology Mapping Algorithm for Delay Optimization in Lookup-Table Based FPGA Designs", IEEE, 1992, pp. 48-53.
Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.
Denoyer et al., "HMM-based Passage Models for Document Classification and Ranking", Proceedings of ECIR-01, 23rd European Colloquim Information Retrieval Research, Darmstatd, DE, pp. 126-135, 2001.
Dharmapurikar et al., "Deep Packet Inspection Using Parallel Bloom Filters," IEEE Micro, Jan.-Feb. 2004, vol. 24, Issue: 1, pp. 52-61.
Dharmapurikar et al., "Deep Packet Inspection Using Parallel Bloom Filters," Symposium on High Performance Interconnects (Hotl), Stanford, California, 2003, pp. 44-51.
Dharmapurikar et al., "Design and Implementation of a String Matching System for Network Intrusion Detection using FPGA-based Bloom Filters", Proc. of 12th Annual IEEE Symposium on Field Programmable Custom Computing Machines, 2004, pp. 1-10.

(56) References Cited

OTHER PUBLICATIONS

Office Action for JP Application 2006-514919 dated Jan. 20, 2010.
Office Action for JP Application 2006-533393 dated Aug. 24, 2010.
Office Action for JP Application 2006-533393 dated Jan. 26, 2010.
Office Action for U.S. Appl. No. 10/550,323 dated Jan. 3, 2011.
Office Action for U.S. Appl. No. 10/550,323 dated Jun. 24, 2010.
Office Action for U.S. Appl. No. 10/550,326 dated Dec. 23, 2010.
Office Action for U.S. Appl. No. 10/550,326 dated Jun. 3, 2010.
Office Action for U.S. Appl. No. 11/690,034 dated Dec. 14, 2010.
Office Action for U.S. Appl. No. 11/932,596 dated Dec. 3, 2010.
Office Action for U.S. Appl. No. 13/345,011 dated Aug. 28, 2012.
Office Action for U.S. Appl. No. 16/795,016 dated Apr. 29, 2020.
OrCAD unveils strategy for leadership of mainstream programmable logic design market; strategy includes partnerships and a next generation product, OrCAD express for windows: A shrink-wrapped 32-bit windows application that includes VHDL simulation and synthesis. (Jun. 3, 1996). Retrieved Sep. 16, 2020 (Year: 1996).
Partial International Search Report for PCT/US03/15638 dated Feb. 3, 2004.
Patterson, "High Performance DES Encryption in Virtex™ FPGAs using JBits™", IEEE Symposium on Field-Programmable Custom Computing Machines, 2000, pp. 113-121.
Pirsch et al., "VLSI Architectures for Video Compression—A Survey", Proceedings of the IEEE, Feb. 1995, pp. 220-243, vol. 83, No. 2, Institute of Electrical and Electronics Engineers, Washington, DC, USA.
Prakash et al., "OC-3072 Packet Classification Using BDDs and Pipelined SRAMs", Department of Electrical and Computer Engineering, The University of Texas at Austin.
Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.
Prosecution History for U.S. Appl. No. 16/503,244, now U.S. Pat. No. 10,719,334, filed Jul. 3, 2019.
Ramakrishna et al., "A Performance Study of Hashing Functions for Hardware Applications", Int. Conf. on Computing and Information, May 1994, pp. 1621-1636, vol. 1, No. 1.
Ramakrishna et al., "Efficient Hardware Hashing Functions for High Performance Computers", IEEE Transactions on Computers, Dec. 1997, vol. 46, No. 12.
Ramesh et al., "Automatic Selection of Tuning Parameters for Feature Extraction Sequences", IEEE, Jun. 21-23, 1994, pp. 672-677.
Ranganathan et al., "High-Speed VLSI Designs for Lempe-Ziv Based Data Compression", IEEE Transactions on Circuits and Systems-II: Analog and Digital Signal Processing, Feb. 1993, pp. 96-106, vol. 40, No. 2, Institute of Electrical and Electronics Engineers, Washington, DC, USA.
Ratha et al., "Convolution on Splash 2", Proceedings of IEEE Symposium on FPGAS for Custom Computing Machines, Apr. 19, 1995, pp. 204-213, Los Alamitos, California.
Ratha et al., "FPGA-based coprocessor for text string extraction", IEEE, Sep. 11-13, 2000, pp. 217-221.
Roberts, "Internet Still Growing Dramatically Says Internet Founder", Press Release, Caspian Networks, Inc.—Virtual Pressroom.
Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.
Roy, "A bounded search algorithm for segmented channel routing for FPGA's and associated channel architecture issues", IEEE, Nov. 11, 1993, pp. 1695-1705, vol. 12.
Russ, "The Image Processing Handbook", 3rd Edition, 1999, CRC Press, pp. 365-367.
Sachin Tandon, "A Programmable Architecture for Real-Time Derivative Trading", Master's Thesis, University of Edinburgh, 2003.
Schmit, "Incremental Reconfiguration for Pipelined Applications", FPGAs for Custom Computing Machines, Proceedings, The 5th Annual IEEE Symposium, Dept. of ECE, Carnegie Mellon University, Apr. 16-18, 1997, pp. 47-55, Pittsburgh, PA.
Schuehler et al., "Architecture for a Hardware Based, TCP/IP Content Scanning System", IEEE Micro, 24(1):62-69, Jan.-Feb. 2004, USA.
Schuehler et al., "TCP-Splitter: A TCP/IP Flow Monitor in Reconfigurable Hardware", Hot Interconnects 10 (Hotl-10), Stanford, CA, Aug. 21-23, 2002, pp. 127-131.
Search Results from IEEE Xplore for "Deterministic Finite Automaton current states", dated Dec. 28, 2010, 2 pages, citing Cole, "Real-Time Computation by n-Dimensional Iterative Arrays of Finite-State Machines", 1966; Kashyap, "Syntactic Decision Rules for Recognition of Spoken Words and Phrases Using a Stochastic Automaton", 1979; Rouvellou, "Inference of a Probabilistic Finite State Machine from its Output", 1995; and Yi, "A Method of Instance Learning based on Finite-State Automaton and its Application on TCM Medical Cases", 2010, et al.
Seki et al., "High Speed Computation of Shogi With FPGA", Proceedings of 58th Convention Architecture, Software Science, Engineering, Mar. 9, 1999, pp. 1-133-1-134.
Shah, "Understanding Network Processors", Version 1.0, University of California-Berkeley, Sep. 4, 2001.
Shalunov et al., "Bulk TCP Use and Performance on Internet 2", ACM SIGCOMM Internet Measurement Workshop, 2001.
Shirazi et al., "Quantitative Analysis of FPGA-based Database Searching", Journal of VLSI Signal Processing Systems For Signal, Image, and Video Technology, May 2001, pp. 85-96, vol. 28, No. 1/2, Kluwer Academic Publishers, Dordrecht, NL.
Sidhu et al., "Fast Regular Expression Matching Using FPGAs", IEEE Symposium on Field Programmable Custom Computing Machines (FCCM 2001), Apr. 2001.
Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.
Singh et al., "The EarlyBird System for Real-Time Detection on Unknown Worms", Technical report CS2003-0761, Aug. 2003.
Smith, E. (Oct. 10, 1994). QuickLogic QuickWorks guarantees fastest FPGA design cycle. Business Wire Retrieved from https://dialog.proquest.com/professional/docview/447031280?accountid=131444 <https://dialog.proquest.com/professional/docview/447031280?accountid=131444> retrieved Sep. 16, 2020 (Year: 1994).
Sourdis and Pnevmatikatos, "Fast, Large-Scale String Match for a 10Gbps FPGA-based Network Intrusion Detection System", 13th International Conference on Field Programmable Logic and Applications, 2003.
Steinbach et al., "A Comparison of Document Clustering Techniques", KDD Workshop on Text Mining, 2000.
Tau et al., "Transit Note #114: A First Generation DPGA Implementation", Jan. 1995, 9 pages.
Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.
Taylor et al., "Generalized RAD Module Interface Specification of the Field Programmable Port Extender (FPX) Version 2", Washington University, Department of Computer Science, Technical Report, Jul. 5, 2001, pp. 1-10.
Taylor et al., "Modular Design Techniques for the FPX", Field Programmable Port Extender: Jan. 2002 Gigabit Workshop Tutorial, Washington University, St. Louis, MO, Jan. 3-4, 2002.
Taylor et al., "Scalable Packet Classification using Distributed Crossproducting of Field Labels", Proceedings of IEEE Infocom, Mar. 2005, pp. 1-12, vol. 20, No. 1.
Taylor, "Models, Algorithms, and Architectures for Scalable Packet Classification", doctoral thesis, Department of Computer Science and Engineering, Washington University, St. Louis, MO, Aug. 2004, pp. 1-201.
Thompson et al., "The CLUSTAL_X Windows Interface: Flexible Strategies for Multiple Sequence Alignment Aided by Quality Analysis Tools", Nucleic Acids Research, 1997, vol. 25, No. 24, pp. 4876-4882.

(56) References Cited

OTHER PUBLICATIONS

U.S. Appl. No. 61/570,670, filed Dec. 14, 2011 (Taylor et al.).
U.S. Appl. No. 61/421,545, filed Dec. 9, 2010 (Taylor et al.).
Villasenor et al., "Configurable Computing Solutions For Automatic Target Recognition", FPGAS for Custom Computing Machines, 1996, Proceedings, IEEE Symposium on Napa Valley, CA, Apr. 17-19, 1996, pp. 70-79, 1996 IEEE, Napa Valley, CA, Los Alamitos, CA, USA.
Waldvogel et al., "Scalable High-Speed Prefix Matching", ACM Transactions on Computer Systems, Nov. 2001, pp. 440-482, vol. 19, No. 4.
Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurable%20Computing.pdf.
Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.
West et al., "An FPGA-Based Search Engine for Unstructured Database", Proc. of 2nd Workshop on Application Specific Processors, Dec. 2003, San Diego, CA.
Wooster et al., "HTTPDUMP Network HTTP Packet Snooper", Apr. 25, 1996.
Written Opinion for PCT/US2004/016021 dated Aug. 31, 2005.
Written Opinion for PCT/US2004/016398 dated Jun. 9, 2005.
Yamaguchi et al., "An Approach for Homology Search with Reconfigurable Hardware", Google, 2001, pp. 374-375.
Yamaguchi et al., "High Speed Homology Search with FPGAs", Proceedings Pacific Symposium on Biocomputing, Jan. 3-7, 2002, pp. 271-282, vol. 7, Online, Lihue, Hawaii, USA.
Yan et al., "Enhancing Collaborative Spam Detection with Bloom Filters", 2006, IEEE, pp. 414-425.
Yoshitani et al., "Performance Evaluation of Parallel Volume Rendering Machine Re Volver/C40", Study Report of Information Processing Society, Mar. 5, 1999, pp. 79-84, vol. 99, No. 21.
Ziv et al., "A Universal Algorithm for Sequential Data Compression", IEEE Trans. Inform. Theory, IT-23(3): 337-343 (1997).
Ziv et al., "Compression of Individual Sequence via Variable-Rate Coding", IEEE Transactions on Information Theory, Sep. 1978, pp. 530-536, vol. IT-24, No. 5, Institute of Electrical and Electronics Engineers, Washington, DC, USA.
Prosecution History for U.S. Appl. No. 16/933,001, U.S. Pat. No. 10,929,152 filed Jul. 20, 2021 (Chamberlain et al.).
Dharmapurikar et al., "Longest Prefix Matching Using Bloom Filters," SIGCOMM, 2003, pp. 201-212.
Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.
Dharmapurikar, "Fast and Scalable Pattern Matching for Content Filtering", ACM, ANCS 05, 2005, pp. 183-192.
Ebeling et al., "RaPiD—Reconfigurable Pipelined Datapath", University of Washington, Dept. of Computer Science and Engineering, Sep. 23, 1996, Seattle, WA.
Edgar, "MUSCLE: Multiple Sequence Alignment with High Accuracy and High Throughput", Nucleic Acids Research, 2004, vol. 32, No. 5, pp. 1792-1797.
English Translation of Office Action and Claims for JP Application 2006-533393 dated Mar. 15, 2011.
Extended European Search Report for EP Application 12165559.1 dated Oct. 29, 2012.
Extended European Search Report for EP Application 12165819.9 dated Sep. 17, 2012.
Feldmann, "BLT: Bi-Layer Tracing of HTTP and TCP/IP", AT&T Labs-Research, Florham Park, NJ, USA.

Fernandez, "Template Matching of Binary Targets in Grey-Scale Images: A Nonparametric Approach", Pattern Recognition, 1997, pp. 1175-1182, vol. 30, No. 7.
FIPS 197, "Advanced Encryption Standard", National Institute of Standards and Technology (2001).
FIPS 46-2, "Data Encryption Standard", revised version issued as FIPS 46-3, National Institute of Standards Technology, Dec. 30, 1993.
FIPS Pub. 46-3. Data Encryption Standard (DES). Revised version of 46-2. Reaffirmed Oct. 25, 1999.
Forgy, "RETE: A Fast Algorithm for the Many Pattern/Many Object Pattern Matching Problem", Artificial Intelligence, 1982, pp. 17-37, vol. 19.
Franklin et al., "Assisting Network Intrusion Detection with Reconfigurable Hardware", Symposium on Field-Programmable Custom Computing Machines (FCCM 2002), Apr. 2002, NAPA, California.
Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.
Garey et al., "Computers and Intractability: A Guide to the Theory of NP-Completeness", W.H. Freeman & Co., 1979.
Gavrila et al., "Multi-feature Hierarchical Template Matching Using Distance Transforms", IEEE, Aug. 16-20, 1998, vol. 1, pp. 439-444.
Google Search Results Page for "field programmable gate array financial calculation stock market" over dates of Jan. 1, 1990-May 21, 2002, 1 page.
Guerdoux-Jamet et al., "Systolic Filter for Fast DNA Similarity Search", IEEE, 1995, pp. 145-156.
Gunther et al., "Assessing Document Relevance with Run-Time Reconfigurable Machines", IEEE Symposium on FPGAs for Custom Computing Machines, 1996, pp. 10-17, Proceedings, Napa Valley, CA.
Gupta et al., "High-Speed Implementations of Rule-Based Systems," ACM Transactions on Computer Systems, May 1989, pp. 119-146, vol. 7, Issue 2.
Gupta et al., "Packet Classification on Multiple Fields", Computer Systems Laboratory, Stanford University, Stanford, CA.
Gupta et al., "PMM: A Parallel Architecture for Production Systems," Proceedings of the IEEE, Apr. 1992, pp. 693-696, vol. 2.
Gurtov, "Effect of Delays on TCP Performance", Cellular Systems Development, Sonera Corporation, online at http://cs.helsinki.fi/u/gurtov/papers/pwc01.pdf.
Gyang, "NCBI BLASTN Stage 1 in Reconfigurable Hardware," Technical Report WUCSE-2005-30, Aug. 2004, Department of Computer Science and Engineering, Washington University, St. Louis, MO.
Hauck et al., "Software Technologies for Reconfigurable Systems", Northwestern University, Dept. of ECE, Technical Report, 1996.
Hayes, "Computer Architecture and Organization", Second Edition, 1988, pp. 448-459, McGraw-Hill, Inc.
Hezel et al., "FPGA-Based Template Matching Using Distance Transforms", Proceedings of the 10th Annual IEEE Symposium on Field-Programmable Custom Computing Machines, Apr. 22, 2002, pp. 89-97, IEEE Computer Society, USA.
Hoinville, et al. "Spatial Noise Phenomena of Longitudinal Magnetic Recording Media", IEEE Transactions on Magnetics, vol. 28, No. 6, Nov. 1992.
Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.
Hutchings et al., "Assisting Network Intrusion Detection with Reconfigurable Hardware", FCCM 2002: 10th Annual IEEE Symposium on Field-Programmable Custom Computing Machines, 2002.
International Preliminary Report on Patentability (Chapter II) for PCT/US2004/016021 dated Aug. 21, 2007.
International Preliminary Report on Patentability (Chapter II) for PCT/US2004/016398 dated Mar. 13, 2006.
International Search Report for PCT/US2001/011255 dated Jul. 10, 2003.
International Search Report for PCT/US2002/033286 dated Jan. 22, 2003.

(56) References Cited

OTHER PUBLICATIONS

International Search Report for PCT/US2003/015638 dated May 6, 2004.

International Search Report for PCT/US2004/016021 dated Aug. 18, 2005.

International Search Report for PCT/US2004/016398 dated Apr. 12, 2005.

International Search Report for PCT/US2005/030046; dated Sep. 25, 2006.

Jacobson et al., "RFC 1072: TCP Extensions for Long-Delay Paths", Oct. 1988.

Jacobson et al., "tcpdump—dump traffic on a network", Jun. 30, 1997, online at www.cse.cuhk.edu.hk/~cslui/CEG4430/tcpdump.ps.gz.

Jeanmougin et al., "Multiple Sequence Alignment with Clustal X", TIBS, 1998, vol. 23, pp. 403-405.

Johnson et al., "Pattern Matching in Reconfigurable Logic for Packet Classification", College of Computing, Georgia Institute of Technology, Atlanta, GA.

Jones et al., "A Probabilistic Model of Information Retrieval: Development and Status", Information Processing and Management, Aug. 1998, 76 pages.

Jung et al., "Efficient VLSI for Lempel-Ziv Compression in Wireless Data Communication Networks", IEEE Transactions on VLSI Systems, Sep. 1998, pp. 475-483, vol. 6, No. 3, Institute of Electrical and Electronics Engineers, Washington, DC, USA.

Keutzer et al., "A Survey of Programmable Platforms—Network Proc", University of California-Berkeley, pp. 1-29.

Koloniari et al., "Content-Based Routing of Path Queries in Peer-to-Peer Systems", pp. 1-19, E. Bertino et al. (Eds.): EDBT 2004, LNCS 2992, pp. 29-47, 2004, copyright by Springer-Verlag, Germany.

Kulig et al., "System and Method for Controlling Transmission of Data Packets Over an Information Network", pending U.S. Patent Application.

Li et al., "Large-Scale IP Traceback in High-Speed Internet: Practical Techniques and Theoretical Foundation", Proceedings of the 2004 IEEE Symposium on Security and Privacy, 2004, pp. 1-15.

\* cited by examiner

|   | p | q | r | s | x | a | b | c | s | t | v | q | ... |
|---|---|---|---|---|---|---|---|---|---|---|---|---|---|
| s | -1 | -1 | -1 | 2 | 1 | 2 | 1 | 0 | -1 | -1 | -1 | -1 | |
| x | -1 | -2 | -2 | 1 | 4 | 3 | 2 | 1 | 0 | -1 | -2 | -2 | |
| b | -1 | -2 | -3 | 0 | 3 | 2 | 5 | 4 | 3 | 2 | 1 | 0 | |
| a | -1 | -2 | -3 | -1 | 2 | 1 | 4 | 3 | 2 | 1 | 0 | -1 | |
| c | -1 | -2 | -3 | -2 | 1 | 0 | 3 | 6 | 5 | 4 | 3 | 2 | |
| s | -1 | -2 | -3 | -3 | 0 | -1 | 2 | 5 | <u>8</u> | 7 | 6 | 5 | |

Figure 19

Fully pipelined encryption/decryption engine.

Figure 47(a)

| | k | ... | 13 | 12 | 11 | 10 | 9 | 8 | 7 | 6 | 5 | 4 | 3 | 2 | 1 | ← i |
|---|---|---|---|---|---|---|---|---|---|---|---|---|---|---|---|---|
| | $2^k$ | ... | 4096 | 2048 | 1024 | 512 | 256 | 128 | 64 | 32 | 16 | 8 | 4 | 2 | 1 | ← $2^i$ |
| | 0 | ... | 0 | 1 | 0 | 0 | 1 | 1 | 1 | 0 | 0 | 0 | 1 | 0 | 0 | ← Binary representation of file size F = 2500 bytes |
| | No | ... | No | Yes | No | No | Yes | Yes | Yes | No | No | Yes | No | No | No | ← Should a segment size of $2^i$ be requested? |

Minimum Segment Size is $2^m$, wherein m is 10

The segment sizes for a file size of 2500 bytes will be 2048 bytes, 256 bytes, 128 bytes, 64 bytes, and 4 bytes

Figure 47(b)

| | k | ... | 13 | 12 | 11 | 10 | 9 | 8 | 7 | 6 | 5 | 4 | 3 | 2 | 1 | ← i |
|---|---|---|---|---|---|---|---|---|---|---|---|---|---|---|---|---|
| | $2^k$ | ... | 4096 | 2048 | 1024 | 512 | 256 | 128 | 64 | 32 | 16 | 8 | 4 | 2 | 1 | ← $2^i$ |
| | 0 | ... | 0 | 1 | 0 | 0 | 1 | 1 | 1 | 0 | 0 | 0 | 1 | 0 | 0 | ← Binary representation of file size F = 2500 bytes |
| | 0 | ... | 0 | 1 | 0 | 1 | 0 | 0 | 0 | 0 | 0 | 0 | 0 | 0 | 0 | ← R** |
| | No | ... | No | Yes | No | Yes | No | No | No | No | No | No | No | No | No | ← Should a segment size of $2^i$ be requested? |

** Because there is at least one bit $F_i$ in F equal to one, wherein i is less than m, R is selected as a minimum value greater than F for which each bit $N_{m-1}$ through $N_1$ is equal to zero.

The segment sizes for a file size of 2500 bytes will be 2048 bytes and 512 bytes if the minimum segment size is 512 bytes

INTELLIGENT DATA STORAGE AND PROCESSING USING FPGA DEVICES

CROSS REFERENCE AND PRIORITY CLAIM TO RELATED APPLICATIONS

This application is a continuation of patent application Ser. No. 16/933,001, filed Jul. 20, 2020, entitled "Intelligent Data Storage and Processing Using FPGA Devices", now U.S. Pat. No. 10,929,152, which is a continuation of patent application Ser. No. 16/503,244, filed Jul. 3, 2019, entitled "Intelligent Data Storage and Processing Using FPGA Devices", now U.S. Pat. No. 10,719,334, which is a continuation of patent application Ser. No. 15/882,679, filed Jan. 29, 2018, entitled "Intelligent Data Storage and Processing Using FPGA Devices", now U.S. Pat. No. 10,346,181, which is a continuation of patent application Ser. No. 14/929,791, filed Nov. 2, 2015, entitled "Intelligent Data Storage and Processing Using FPGA Devices", now U.S. Pat. No. 9,898,312, which is a continuation of patent application Ser. No. 14/315,560, filed Jun. 26, 2014, entitled "Intelligent Data Storage and Processing Using FPGA Devices", now U.S. Pat. No. 9,176,775, which is a continuation of patent application Ser. No. 13/344,986, filed Jan. 6, 2012, entitled "Intelligent Data Storage and Processing Using FPGA Devices", now U.S. Pat. No. 8,768,888, which is a continuation of patent application Ser. No. 10/550,323, entitled "Intelligent Data Storage and Processing Using FPGA Devices", now U.S. Pat. No. 8,095,508, which is a national stage entry of PCT patent application PCT/US04/16398, entitled "Intelligent Data Storage and Processing Using FPGA Devices", filed May 21, 2004, which claims the benefit of provisional patent application Ser. No. 60/473,077 entitled "Intelligent Data Storage and Processing", filed May 23, 2003, the entire disclosures of each of which are incorporated herein by reference.

This application is related to patent application Ser. No. 13/165,155, now U.S. Pat. No. 8,620,881, and patent application Ser. No. 10/550,326, now abandoned, both entitled "Intelligent Data Storage and Processing Using FPGA Devices", where the Ser. No. 13/165,155 patent application is a divisional of the Ser. No. 10/550,326 patent application and where the Ser. No. 10/550,326 patent application is a national stage entry of PCT patent application PCT/US04/16021, entitled "Intelligent Data Storage and Processing Using FPGA Devices", filed May 21, 2004, which claims the benefit of provisional patent application Ser. No. 60/473,077 entitled "Intelligent Data Storage and Processing", filed May 23, 2003.

This application is also related to patent application Ser. No. 10/153,151 entitled "Associative Database Scanning and Information Retrieval Using FPGA Devices", filed May 21, 2002, now U.S. Pat. No. 7,139,743, which is a continuation-in-part of patent application Ser. No. 09/545,472 entitled "Associative Database Scanning and Information Retrieval", filed Apr. 7, 2000, now U.S. Pat. No. 6,711,558, the entire disclosures of both of which are incorporated herein by reference.

This patent application is also related to patent application Ser. No. 13/345,011, entitled "Intelligent Data Storage and Processing Using FPGA Devices", filed Jan. 6, 2012, now U.S. Pat. No. 8,751,452.

BACKGROUND AND SUMMARY OF THE INVENTION

Indications are that the average database size and associated software support systems are growing at rates that are greater than the increase in processor performance (i.e., more than doubling roughly every 18 months). This is due to a number of factors including without limitation the desire to store more detailed information, to store information over longer periods of time, to merge databases from disparate organizations, and to deal with the large new databases which have arisen from emerging and important applications. For example, two emerging applications having large and rapidly growing databases are those connected with the genetics revolution and those associated with cataloging and accessing information on the Internet. In the case of the Internet, current industry estimates are that in excess of 1.5 million pages are added to the Internet each day. At the physical level this has been made possible by the remarkable growth in disk storage performance where magnetic storage density has been doubling every year or so for the past five years.

Search and retrieval functions are more easily performed on information when it is indexed. For example, with respect to financial information, it can be indexed by company name, stock symbol and price. Oftentimes, however, the information being searched is of a type that is either hard to categorize or index or which falls into multiple categories. As a result, the accuracy of a search for information is only as good as the accuracy and comprehensiveness of the index created therefor. In the case of the Internet, however, the information is not indexed. The bottleneck for indexing is the time taken to develop the reverse index needed to access web pages in reasonable time. For example, while there are search engines available, designing a search which will yield a manageable result is becoming increasingly difficult due to the large number of "hits" generated by less than a very detailed set of search instructions. For this reason, several "intelligent" search engines have been offered on the web, such as Google, which are intended to whittle down the search result using logic to eliminate presumed undesired "hits".

With the next-generation Internet, ever-faster networks, and expansion of the Internet content, this bottleneck is becoming a critical concern. Further, it is becomingly exceedingly difficult to index information on a timely basis. In the case of the Internet, current industry estimates are that in excess of 1.5 million pages are added to the Internet each day. As a result, maintaining and updating a reverse index has become an enormous and continuous task and the bottleneck it causes is becoming a major impediment to the speed and accuracy of existing search and retrieval systems. Given the ever increasing amounts of information available, however, the ability to accurately and quickly search and retrieve desired information has become critical.

Associative memory devices for dealing with large databases are known in the prior art. Generally, these associative memory devices comprise peripheral memories for computers, computer networks, and the like, which operate asynchronously to the computer, network, etc. and provide increased efficiency for specialized searches. Additionally, it is also known in the prior art that these memory devices can include certain limited decision-making logic as an aid to a main CPU in accessing the peripheral memory. An example of such an associative memory device particularly adapted for use with a rotating memory such as a high speed disk or drum can be found in U.S. Pat. No. 3,906,455, the disclosure of which is incorporated herein by reference. This particular device provides a scheme for use with a rotating memory and teaches that two passes over a memory sector is necessary to presort and then sort the memory prior to performing any logical operations thereon. Thus, this device is taught as not being suitable for use with any linear or serial memory such as magnetic tape or the like.

Other examples of prior art devices may also be found in U.S. Pat. Nos. 3,729,712; 4,464,718; 5,050,075; 5,140,692; and 5,721,898; the disclosures of which are incorporated herein by reference.

As an example, in U.S. Pat. No. 4,464,718, Dixon performs fixed comparisons on a fixed number of bytes. They don't have the ability to scan and correlate arbitrarily over the data. They search serially along the tracks in a given disk cylinder but there is no provision for parallel searching across disks. Dixon's comparisons are limited by a fixed rigid number of standard logical operation types. Additionally, the circuitry presented supports only these single logical operations. There is no support for approximate or fuzzy matching.

While these prior art associative memory devices represent an attempt to speed the input and output of information to and from a peripheral memory, which in many cases is a mass storage memory device, all rely on the classic accessing of data stored in digital form by reading and interpreting the digital either address or content of the memory location. In other words, most such devices access data by its address but there are some devices that take advantage of the power of content addressing as is well known in the art. Nevertheless, in all of the prior art known to the inventors, the digital value of the address or data contained in the addressed location must be read and interpreted in its digital form in order to identify the data and then select it for processing. Not only does it take processing time to read and interpret the digital data represented by the address or content, this necessarily requires that the accessing circuit process the memory according to the structure of the data stored. In other words, if the data is stored in octets, then the accessing circuitry must access the data in octets and process it in an incremental manner. This "start and stop" processing serves to increase the input/output time required to access data. As is also well known in the art, this input/output time typically represents the bottleneck and effective limitation of processing power in any computer or computer network.

Furthermore, given the vast amount of information available to be searched, data reduction and classification operations (e.g., the ability to summarize data in some aggregate form) has become critical. Oftentimes, the ability to quickly perform data reduction functions can provide a company with a significant competitive advantage.

Likewise, with the improvements in digital imaging technology, the ability to perform two dimensional matching such as on images has become necessary. For example, the ability to conduct matches on a particular image of an individual, such as his or her face or retina, or on a fingerprint, is becoming critical to law enforcement as it steps up its efforts on security in light of the Sep. 11, 2001 terrorist attacks. Image matching is also of importance to the military in the area of automatic target recognition.

Finally, existing searching devices cannot currently be quickly and easily reconfigured in response to changing application demands.

Accordingly, there is a need for an improved information search and retrieval system and method which overcomes these and other problems in the prior art.

As described in parent application Ser. No. 10/153,151, in order to solve these and other problems in the prior art, inventors herein have succeeded in designing and developing a method and apparatus for an associative memory using Field Programmable Gate Arrays (FPGA) in several embodiments which provide an elegantly simple solution to these prior art limitations as well as dramatically decreased access times for data stored in mass storage memories. As described therein, the invention of the Ser. No. 10/153,151 patent application has several embodiments each of which has its own advantages. Grandparent patent application Ser. No. 09/545,472, now U.S. Pat. No. 6,711,558, discloses and claims the use of programmable logic and circuitry generally without being specific as to any choice between the various kinds of devices available for this part of the invention. In the Ser. No. 10/153,151 application, the inventors disclosed more specifically the use of FPGA's as part of the circuitry for various reasons as their best mode. An important reason amongst others is speed. And, there are two different aspects of operation in which speed plays a part. The first of these is the speed of reconfiguration. It is known in the art that FPGA's may be quickly programmed in the field to optimize the search methodology using a template, the template having been prepared in advance and merely communicated to the FPGA's over a connecting bus. Should it then be desired to search using a different methodology, the FPGA's may then be quickly and conveniently re-programmed with another prepared template in a minimal number of clock cycles and the second search started immediately. Thus, with FPGA's as the re-configurable logic, shifting from one search to another is quite easy and quick, relative to other types of re-programmable logic devices.

A second aspect of speed is the amount of time, once programmed, that a search requires. As FPGA's are hardware devices, searching is done at hardware processing speeds which is orders of magnitude faster than at software processing speeds as would be experienced with a microprocessor, for example. Thus, FPGA's are desirable over other software implementations where speed is a consideration as it most often is.

In considering the use of templates, the Ser. No. 10/153,151 application discloses that at least several "generic" templates can be prepared in advance and made available for use in performing text searching in either an absolute search, an approximate search, or a higher or advanced search mode incorporating a Boolean algebra logic capability, or a graphics search mode. These could then be stored in a CPU memory and be available either on command or loaded in automatically in response to a software queue indicating one of these searches.

Still another factor to consider is cost, and the recent price reductions in FPGA's have made them more feasible for implementation as a preferred embodiment for this application, especially as part of a hard disk drive accelerator as would be targeted for a pc market. It is fully expected that further cost reductions will add to the desirability of these for this implementation, as well as others as discussed in greater detail below.

Generally, the invention of the Ser. No. 10/153,151 application may be described as a technique for data retrieval through approximate matching of a data key with a continuous reading of data as stored on a mass storage medium, using FPGA's to contain the template for the search and do the comparison, all in hardware and at essentially line speed. By utilizing FPGA's, the many advantages and features commonly known are made available. These include the ability to arrange the FPGA's in a "pipeline" orientation, in a "parallel" orientation, or even in an array incorporating a complex web overlay of interconnecting data paths allowing for complex searching algorithms. In its broadest, and perhaps most powerful, embodiment, the data key may be an analog signal and it is matched with an analog signal generated by a typical read/write device as it clews across the mass storage medium. In other words, the steps taught to be required in the prior art of not only reading the analog representation of digital data stored on the mass storage medium but also the conversion of that signal to its digital format prior to being compared are eliminated. Furthermore, there is no requirement that the data be "framed" or compared utilizing the structure or format in which the data has been organized and stored. For an analog signal, all that need be specified is the elapsed time of that signal which is used for comparison with a corresponding and continuously changing selected time portion of the "read" signal. Using any one of many standard correlation techniques as known in the prior art, the data "key" may then be approximately matched to the sliding "window" of data signal to determine a match. Significantly, the same amount of data may be scanned much more quickly and data matching the search request may be determined much more quickly as well. For example, the inventors have found that CPU based approximate searches of 200 megabytes of DNA sequences can take up to 10 seconds on a typical present day "high end" system, assuming the offline processing to index the database has already been completed. In that same 10 seconds, the inventors have found that a 10-gigabyte disk could be searched for approximate matches using the present invention. This represents a 50:1 improvement in performance. Furthermore, in a typical hard disk drive there are four surfaces and corresponding read/write heads, which may be all searched in parallel should each head be equipped with the present invention. As these searches can proceed in parallel, the total increase in speed or improvement represents a 200:1 advantage. Furthermore, additional hard disk drives may be accessed in parallel and scaled to further increase this speed advantage over conventional systems.

By choosing an appropriate correlation or matching technique, and by setting an appropriate threshold, the search may be conducted to exactly match the desired signal, or more importantly and perhaps more powerfully, the threshold may be lowered to provide for approximate matching searches. This is generally considered a more powerful search mode in that databases may be scanned to find "hits" which may be valid even though the data may be only approximately that which is being sought. This allows searching to find data that has been corrupted, incorrectly entered data, data which only generally corresponds to a category, as well as other kinds of data searches that are highly desired in many applications. For example, a library of DNA sequences may be desired to be searched and hits found which represent an approximate match to a desired sequence of residues. This ensures that sequences which are close to the desired sequence are found and not discarded but for the difference in a forgivable number of residue mismatches. Given the ever-increasing volume and type of information desired to be searched, more complex searching techniques are needed. This is especially true in the area of molecular biology, "[O]ne of the most powerful methods for inferring the biological function of a gene (or the protein that it encodes) is by sequence similarity searching on protein and DNA sequence databases." Garfield, "*The Importance of (Sub)sequence Comparison in Molecular Biology,*" pgs. 212-217, the disclosure of which is incorporated herein by reference. Current solutions for sequence matching are only available in software or non-reconfigurable hardware.

Still another application involves Internet searches provided by Internet search engines. In such a search, approximate matching allows for misspelled words, differently spelled words, and other variations to be accommodated without defeating a search or requiring a combinatorial number of specialized searches. This technique permits a search engine to provide a greater number of hits for any given search and ensure that a greater number of relevant web pages are found and cataloged in the search. Although, as mentioned above, this approximate matching casts a wider net which produces a greater number of "hits" which itself creates its own problems.

Still another possible application for this inventive technology is for accessing databases which may be enormous in size or which may be stored as analog representations. For example, our society has seen the implementation of sound recording devices and their use in many forums including judicial proceedings. In recent history, tape recordings made in the President's oval office have risen in importance with respect to impeachment hearings. As can be appreciated, tape recordings made over the years of a presidency can accumulate into a huge database which might require a number of persons to actually listen to them in order to find instances where particular words are spoken that might be of interest. Utilizing this inventive technology, an analog representation of that spoken word can be used as a key and sought to be matched while the database is scanned in a continuous manner and at rapid speed. Thus, the present and parent inventions provide a powerful search tool for massive analog databases as well as massive digital databases.

While text-based searches are accommodated by the present and parent inventions as described above, storage media containing images, sound, and other representations have traditionally been more difficult to search than text. The present and parent inventions allow searching a large data base for the presence of such content or fragments thereof. For example, the key in this case could be a row or quadrant of pixels that represent the image being sought. Approximate matching of the key's signal can then allow identification of matches or near matches to the key. In still another image application, differences in pixels or groups of pixels can be searched and noted as results which can be important for satellite imaging where comparisons between images of the same geographic location are of interest as indicative of movement of equipment or troops.

The present and parent inventions may be embodied in any of several configurations, as is noted more particularly below. However, one important embodiment is perhaps in the form of a disk drive accelerator which would be readily installed in any PC as an interface between the hard disk drive and the system bus. This disk drive accelerator could be provided with a set of standardized templates and would provide a "plug and play" solution for dramatically increasing the speed at which data could be accessed from the drive by the CPU. This would be an after market or retrofit device to be sold to the large installed base of PC's. It could also be provided as part of a new disk drive, packaged within the envelope of the drive case or enclosure for an external drive or provided as an additional plug in pc card as an adapter for an internal drive. Additional templates for various kinds of searches on various kinds of databases could be made available either with the purchase of the accelerator, such as by being encoded on a CD, or even over the Internet for download, as desired.

The present invention extends the novel groundbreaking technology disclosed in the parent application Ser. Nos. 09/545,472 and 10/153,151 such that a programmable logic device (PLD) such as an FPGA performs any of a variety of additional processing operations including but not limited to operations such as encryption, decryption, compression, and decompression. Thus, the technology of the parent applications has been extended such that PLDs perform data manipulation operations. As used herein, the term "manipulating" or "manipulation" refers to the performance of a search operation, a reduction operation, or a classification operation on data in combination with any or all of a compression operation, a decompression operation, an encryption operation, and a decryption operation also performed on the data, or the performance of a compression operation or a decompression operation on data alone or in combination with any or all of a search operation, a reduction operation, a classification operation, an encryption operation, and a decryption operation also performed on the data. Not only can these manipulation operations be performed at very high speeds due to the inventive techniques disclosed herein, but these operations, when implemented on a PLD such as an FPGA as disclosed herein also enhance data security by protecting the unencrypted and/or decompressed data from being accessed or read by any viruses or malware that may be running in the software of the computer system and using the re-configurable logic to process stored data. Among the more powerful applications for the present invention is to perform high speed searches within encrypted data, which can be referred to as crypto-searching. With crypto-searching, the stream of encrypted data is processed to first decrypt the data stream and then perform a search operation within the decrpyted data.

The value of data security to data owners cannot be underestimated and is ever-increasing in importance, and the ability to control who has access to what data and when lies at the heart of data security. Among its many unique applications, the present invention provides flexibility to data owners in controlling who has access to their data, and speed in providing authorized users with access to that data (or targeted access to a portion of that data through scanning capabilities).

Further still, the use of compression and/or decompression as described herein allows data to be stored in a manner that takes up less space in the mass storage medium, while still retaining the ability to search through the data at high speeds.

Preferably, these manipulation operations, when implemented with multiple stages, are implemented in a pipelined manner. In particular, the combination of one or more stages dedicated to encryption/decryption or compression/decompression with one or more stages dedicated to data searching or data reduction synergistically produces an intelligent, flexible, high speed, and secure design technique for data storage and retrieval.

Further still, disclosed herein is a novel and unique technique for storing data on a magnetic medium such as a computer hard disk so that large amounts of data can be read therefrom without being significantly disadvantaged by the disk storage system's "seek" times. In accordance with this feature of the invention, data is stored on the magnetic medium as a plurality of discontiguous arcs positioned on the magnetic medium, preferably in a helical or spiral pattern. When a system employing a PLD for searching and/or additional processing, as described herein, is used in combination with a mass storage medium that employs data stored in a piecewise helical fashion, as described herein, this combination synergistically results in ever greater processing speeds.

Further still, a novel technique for storing data files in memory is disclosed herein, wherein a data file is stored using a sum of powers of 2 technique. The combination of data file storage using this sum of powers of 2 technique with the data processing capabilities of the re-configurable logic platform described herein also synergistically results in enhanced processing speeds.

While the principal advantages and features of the present invention have been briefly explained above, a more thorough understanding of the invention may be attained by referring to the drawings and description of the preferred embodiment which follow.

BRIEF DESCRIPTION OF THE DRAWINGS

FIG. 19 is the table of FIG. 15 representing a particular sequence matching example;

FIGS. 47(a) and (b) illustrate two embodiments of a sum of powers of 2 file system;

DETAILED DESCRIPTION OF THE PREFERRED EMBODIMENT

Figure 1:
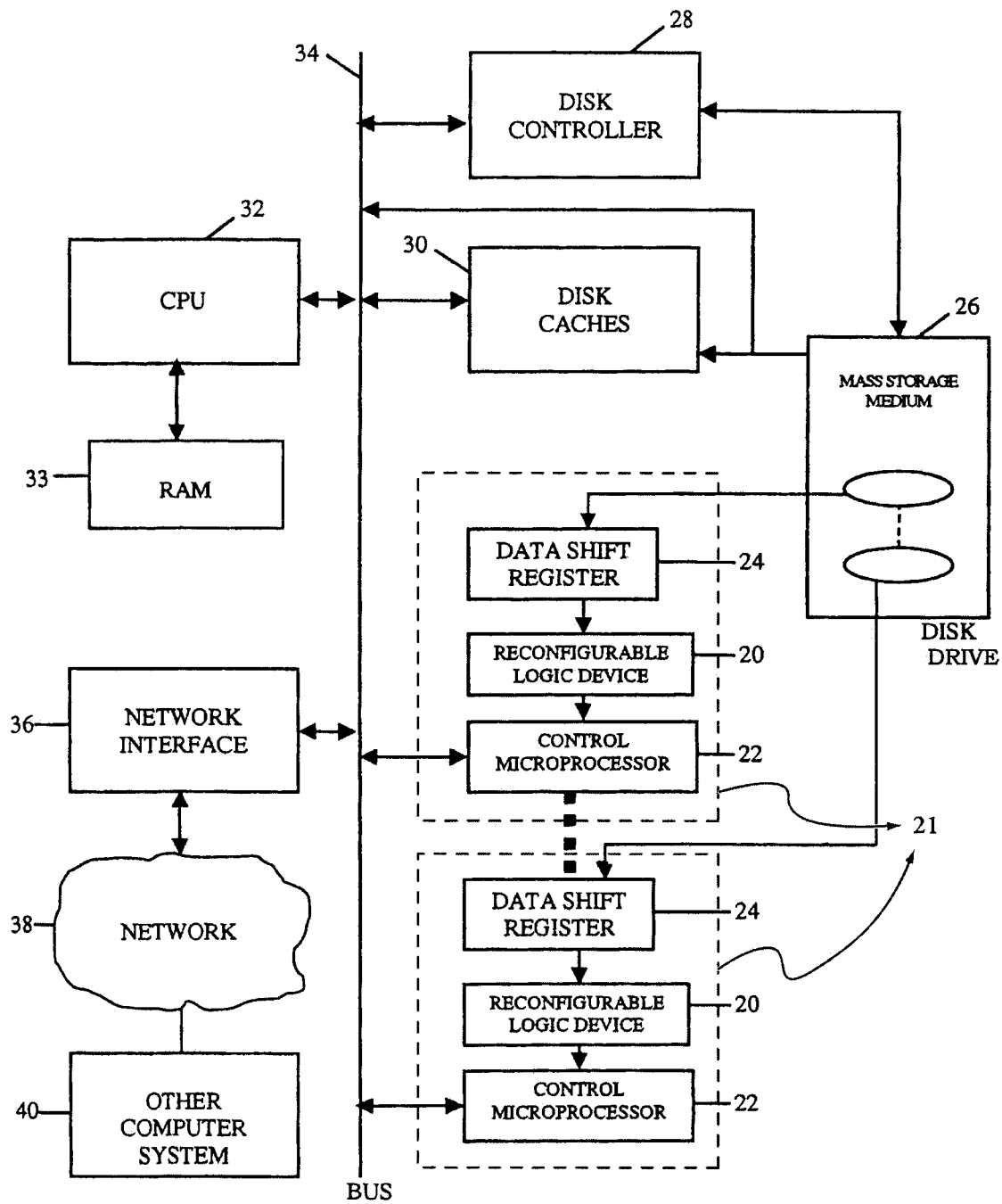
FIG. 1 is a block diagram illustrating an information search and retrieval system in accordance with one embodiment.

As shown in FIG. 1, the present invention is readily implemented in a stand-alone computer or computer system. In broad terms, the invention is comprised of at least one re-configurable logic device 21 coupled to at least one magnetic mass storage medium 26, with that re-configurable logic device being an FPGA. As depicted in FIG. 1, the re-configurable logic device 21 may itself include a plurality of functional logic elements including a data shift register and possibly a microprocessor, or they could be on separate chips, or the individual logic elements could be configured in a pipeline or parallel orientation as shown in some of the other figures herein. In any event, re-configurable logic refers to any logic technology whose form and function can be significantly altered (i.e., reconfigured) in the field post-manufacture. Examples of re-configurable logic devices include without limitation programmable logic devices (PLDs). A PLD is an umbrella term for a variety of chips that are programmable. There are generally three physical structures for a PLD. The first is the permanent fuse type which blows apart lines or fuses them together by electrically melting an aluminum trace or insulator. This was the first type of PLD, known as a "programmable array logic" or PAL. The second type of PLD uses EEPROM or flash memory, and causes a transistor to open or close depending on the contents of its associated memory cell. The third type of PLD is RAM-based (which makes it dynamic and volatile), and its contents are loaded each time it starts up. An FPGA is an integrated circuit (IC) that contains an array of logic units that can be interconnected in an arbitrary manner. These logic units are referred to as CLB's or configurable logic blocks by one vendor (Xilinx). Both the specific function of each logic unit and the interconnections between logic units can be programmed in the field after manufacture of the IC. FPGAs are one of the most common PLD chips. FPGAs are available in all three structures. The box labeled in FIG. 1 for reconfigurable logic device 21 is meant to convey that not only can the task performed by reconfigurable logic device 20 be implemented in reconfigurable hardware logic, but the tasks of the data shift register 24 and/or control microprocessor 22 may also optionally be implemented in the reconfigurable hardware logic of reconfigurable logic device 21. In the preferred embodiment of the present invention, re-configurable logic device 21 is constructed using Xilinx FPGA technology, and its configuration is developed using the Mentor synthesis tools or Synplicity synthesis tools and the Xilinx place-and-route tools, all of which are presently commercially available as known to those of skill in the art.

The re-configurable logic device 21 interfaces with the system or input/output bus 34 and, in one configuration, also interfaces with any disk caches 30 which may be present. It receives and processes search requests or inquires from the CPU 32 or network interface 36. Additionally, the device may aid in passing the results of the inquiries to either or both the disk cache 30 and/or the CPU 32 (by way of the bus 34).

The mass storage medium 26 provides the medium for storing large amounts of information which will hereafter be referred to as target data. The term "mass storage medium" should be understood as meaning any device used to store large amounts of data, and which is typically designated for use in a computer or computer network. Examples include without limitation hard disk drives, optical storage media, or sub-units such as a single disk surface, and these systems may be rotating, linear, serial, parallel, or various combinations of each. For example, a rack of hard disk drive units could be connected in parallel and their parallel output provided at the transducer level to one or more re-configurable logic devices 21. Similarly, a bank of magnetic tape drives could be used, and their serial outputs each provided in parallel to one or more re-configurable logic devices 21. The data stored on the medium may be in analog or in digital form. For example, the data could be voice recordings. The invention is thus scalable, permitting an increase in the amount of data stored by increasing the number of parallel mass storage media, while preserving the performance by increasing the number of parallel re-configurable logic devices or replicating the re-configurable logic device.

In the prior art as shown in the upper portion of FIG. 1, typically a disk controller 28 and/or a disk cache 30 may be used in the traditional sense for access by a CPU 32 over its system or input/output bus 34. The re-configurable logic device 21 accesses target data in the mass storage medium 26 via one or more data shift registers 24 and presents it for use at the system bus 34 without moving large blocks of memory from the mass storage medium 26 over the system bus 34 and into the working memory 33 of CPU 32 for sorting and accessing. In other words, as is explained in greater detail below, the CPU 32 may send a search request or inquiry to the re-configurable logic device 21 which then asynchronously accesses and sorts target data in the mass storage medium 26 and presents it for use either in a disk cache 30 as is known in the prior art or directly onto the system bus 34 without further processing being required by CPU 32 or use of its working memory 33. The CPU 32 is thus free to perform other tasks while the searching and matching activity is being performed by the invention. Alternately, the control microprocessor may provide the search inquiry and template or programming instructions for the FPGA 21, and then perform the search and present the data on system bus 34 for access and use by CPU 32.

Figure 2:
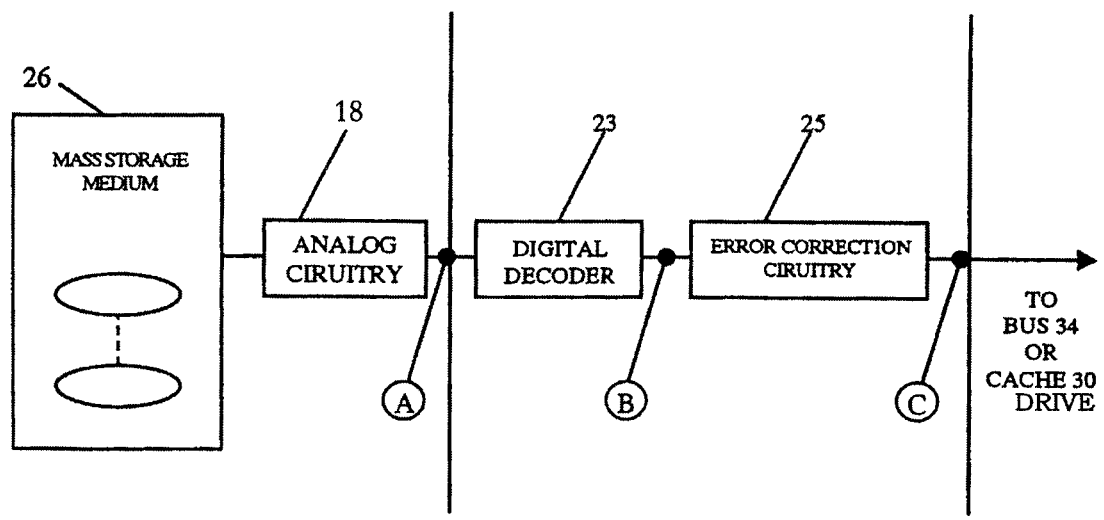
FIG. 2 is a schematic of a conventional rigid disk drive system illustrating different insertion points for connection of the inventive system.

As has been explained above, the invention may be used to perform a variety of different types of matching or data reduction operations on the target data. Each one of these operations will now be discussed in detail below. For all operations, however, it will be assumed that the target data is written onto the magnetic mass storage medium 26 with sufficient formatting information attached so that the logical structure of the target data can be extracted. Exact and approximate string matching will be described with reference to FIGS. 2-5. It can be appreciated, however, that the invention is not limited to single string matches and is equally suitable for compound query matching (i.e., queries involving a plurality of text strings having a certain logical relationship therebetween or which use Boolean algebra logic). When performing an exact match with the re-configurable logic device 21 in the analog domain, shown as Point A in FIG. 2, where matching is done using analog comparators and correlation techniques, an exact match corresponds to setting a sufficiently high threshold value for matching the data key with analog target data on the mass storage medium 26. Approximate matching in the analog domain corresponds to setting appropriate (lesser) threshold values. The success of an approximate match may be determined by the correlation value set in the re-configurable logic device 21 or by using one of a number of matching-performance metrics stored therein such as the number of bits within a data key that are equal to the corresponding bits in the scanned target data.

More particularly, a conventional rigid disk drive may have a plurality of rotating disks with multiple transducers accessing each disk. Each of these transducers typically has its output feeding analog signal circuitry 18, such as amplifiers. This is represented at point A. As further shown in FIG. 2, typically the outputs of the analog circuitry are selectively provided to a single digital decoder 23 which then processes one such output. This is represented at point B. This digital output is typically then sent through error correction circuitry (ECC) 25 and at its output C is then passed on to the bus 34 or disk cache 30. For purposes of the invention, it may be desirable to provide multiple parallel paths for target data by providing multiple digital decoders and ECC's. Exact matching in the digital domain could be performed at Point B or Point C, which corresponds to the pre- and post-error-corrected digital signal, respectively.

The results may be sent to a control microprocessor 22, which may or may not be configured as part of an FPGA, to execute logic associated with a compound or complex search inquiry. In the most general case, a compound search inquiry 40 will go through the transformation process illustrated in FIG. 3. In particular, the software system (not shown) that resides on the CPU 32 generates the search inquiry 40. This inquiry proceeds through a compiler 42, also located on the CPU 32, that is responsible for analyzing the search inquiry. There are three main results from this analysis: (1) determining the data key that will reside in the compare registers within the re-configurable logic device 21; (2) determining the combining logic that must be implemented in the control microprocessor 22; and (3) producing hardware description 44 in a standard hardware description language (HDL) format (or if possible retrieving one from a library) that will be used to generate synthesis commands 46 to the re-configurable logic device 21. Any commercially available HDL and associated compiler and synthesis tools may be used. The resulting logic functions may correspond to exact or inexact matches or wildcard operations and simple word level logic operations such as "and" and "or." This synthesis information is sent to the control microprocessor 22 which acts to set up the re-configurable logic device 21, or FPGA. In the case of complex logic operations, a high-level language 48 such as C or C++ is used in conjunction with a compiler 50 to generate the appropriate synthesis commands to the microprocessor 22.

Figure 3:
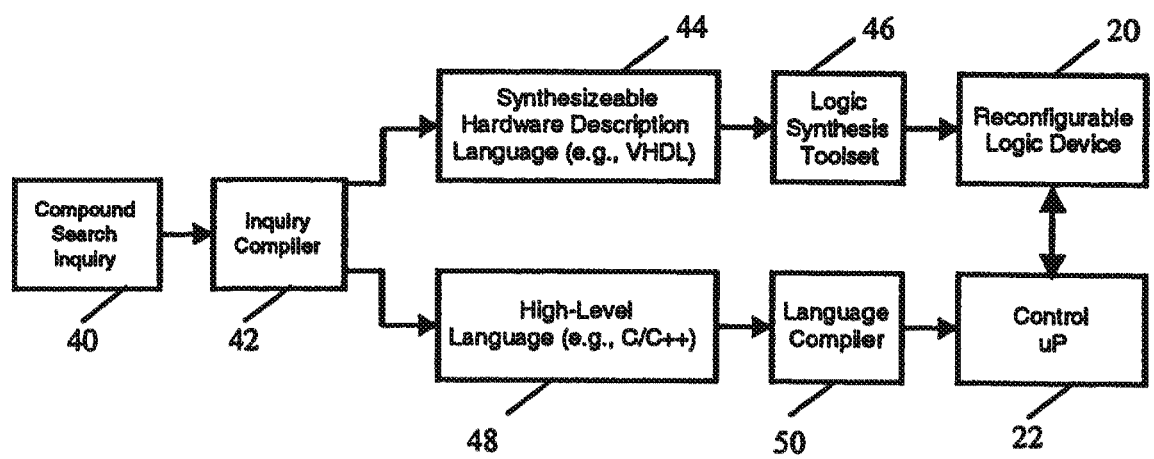
FIG. 3 is a block diagram of one embodiment of the transformation of a search inquiry processed by the system of FIG. 1.

While the path shown in FIG. 3 is able to handle a wide range of potential search inquiries, it has the drawback that the latency introduced into the search process might be too long. If the time required for a search inquiry to flow through the transformations represented in FIG. 3 is of the same order as the time required to perform a search, the compilation process might become the performance bottleneck rather than the search itself. This issue can be addressed for a wide range of likely search inquiries by maintaining a set of precompiled hardware templates that handle the most common cases. These templates may be provided and maintained either in CPU 32 memory, made available through an off-line storage medium such as a CD, or even kept in the mass storage medium 26 itself. Still further, such templates may be communicated to CPU 32 such as over a network or the Internet.

Figure 4:
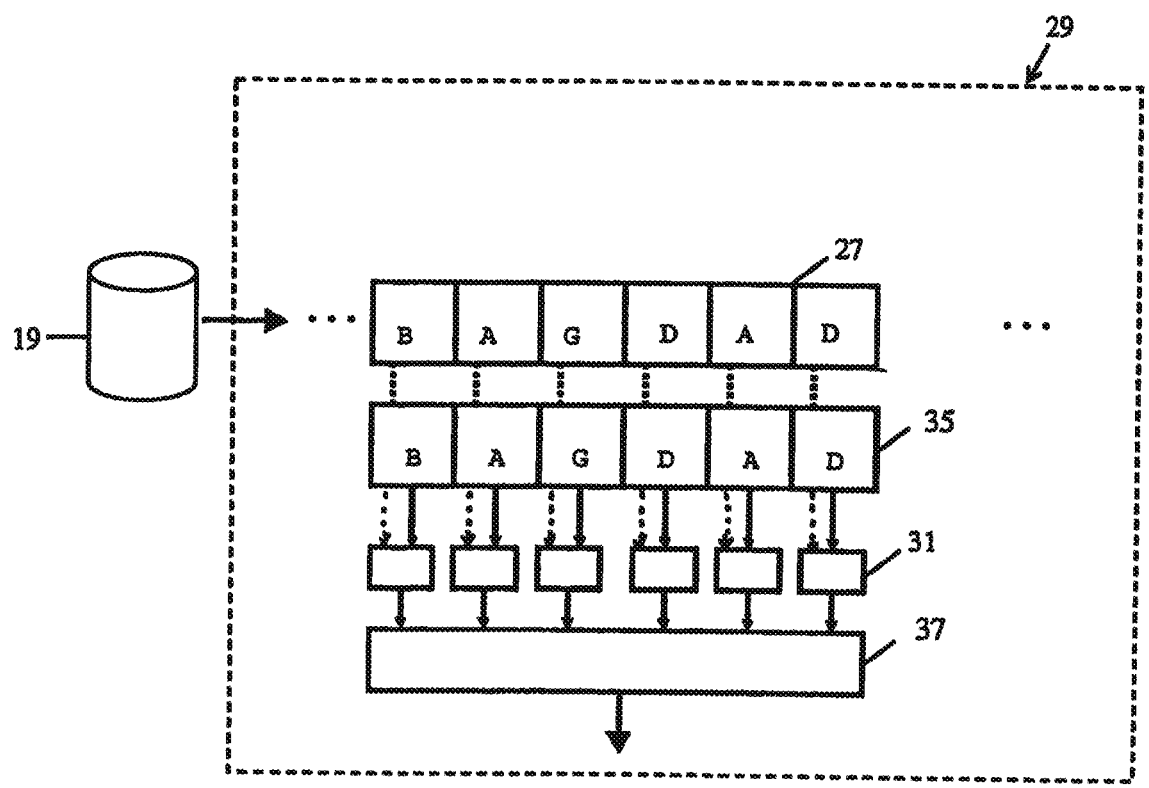
FIG. 4 is a block diagram of one embodiment of a hardware implementation used to conduct an exact match search in a digital domain.

One embodiment of such a hardware template 29 is illustrated in FIG. 4. In particular, the data shift register 27 contains target data streaming off the head (not shown) of one or more disks 19. A compare register stores the data key for which the user wishes to match. In the example shown, the data key is "Bagdad." Fine-grained comparison logic device 31 performs element by element comparisons between the elements of the data shift register 27 and the compare register 35. The fine-grained comparison logic device 31 can be configured to be either case sensitive or case insensitive. Word-level comparison logic 37 is responsible for determining whether or not a match at the world-level occurs. In the case of a compound search inquiry, the word-level match signals are delivered to the control microprocessor 22 for evaluation thereof. A match to the compound search inquiry is then reported to the CPU 32 for further processing.

Figure 5:
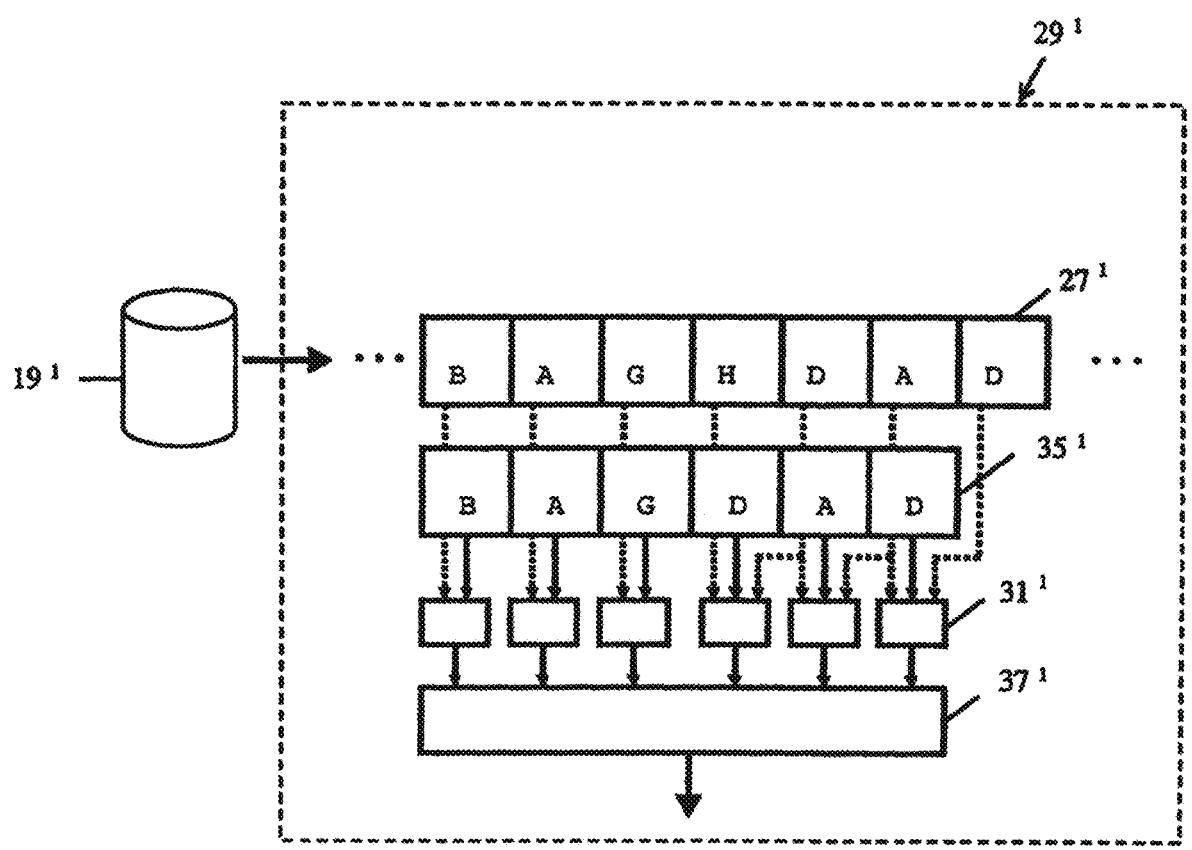
FIG. 5 is a block diagram of one embodiment of a hardware implementation used to conduct an approximate match search in a digital domain.

One embodiment of a hardware template for conducting approximate matching is illustrated in FIG. 5. In particular, the data shift register 27' contains target data streaming off the head (not shown) of one or more disks 19'. A compare register 35' stores the data key for which the user wishes to match. In the example shown, the data key is again "Bagdad." Fine-grained comparison logic 31' performs element by element comparisons between the elements of the data shift register 27' and the compare register 21'. Again, the fine-grained comparison logic device 31' can be configured to be either case sensitive or case insensitive. The template 29' provides for alternate routing of elements in data shift register 27' to individual cells of the fine-grained comparison logic device 21'. Specifically, each cell of the fine-grained comparison logic device 31' can match more than one position in the data shift register 27' such that the compare register 21' can match both the commonly used spelling of "Baghdad" as well as the alternate "Bagdad" in shared hardware. Word-level comparison logic 37' is responsible for determining whether or not a match at the word level occurs. In the case of a compound search inquiry, the word-level match signals are delivered to the control microprocessor 22 for evaluation thereof. A match to the compound search inquiry is then reported to the CPU 32 for further processing.

The actual configuration of the hardware template will of course vary with the search inquiry type. By providing a small amount of flexibility in the hardware templates (e.g., the target data stored in the compare registers, the routing of signals from the data shift registers and compare register elements to the cells of the fine-grained comparison logic device, and the width of the word-level comparison logic), such a template can support a wide range of word matches. As a result, this diminishes the frequency with which the full search inquiry transformation represented in FIG. 3 must take place, which in turn, increases the speed of the search.

It should be noted that the data entries identified in an "approximate" match search will include the "exact" hits that would result from an "exact" search. For clarity, when the word "match" is used, it should be understood that it includes a search or a data result found through either of an approximate search or an exact search. When the phrase "approximate match" or even just "approximate" is used, it should be understood that it could be either of the two searches described above as approximate searches, or for that matter any other kind of "fuzzy" search that has a big enough net to gather target data that are loosely related to the search inquiry or in particular, data key. Of course, an exact match is just that, and does not include any result other than an exact match of the search inquiry with a high degree of correlation.

Also shown in FIG. 1 is a network interface 36 interconnecting the present invention to a network 38 which may be a LAN, WAN, Internet, etc. and to which other computer systems 40 may be connected. With this arrangement, other computer systems 40 may conveniently also access the data stored on the mass storage medium 26 through the present invention 21. More specific examples are given below. Still further as shown in FIG. 1, the elements 20-24 may themselves be packaged together and form a disk drive accelerator that may be separately provided as a retrofit device for adapting existing pc's having their own disk drives with the advantages of the invention. Alternately, the disk drive accelerator may also be offered as an option on a hard drive and packaged in the same enclosure for an external drive or provided as a separate pc board with connector interface for an internal drive. Still further alternatively, the disk drive accelerator may be offered as an option by pc suppliers as part of a pc ordered by a consumer, business or other end user. Still another embodiment could be that of being offered as part of a larger magnetic mass storage medium, or as an upgrade or retrofit kit for those applications or existing installations where the increased data handling capability could be used to good advantage.

Figure 6:
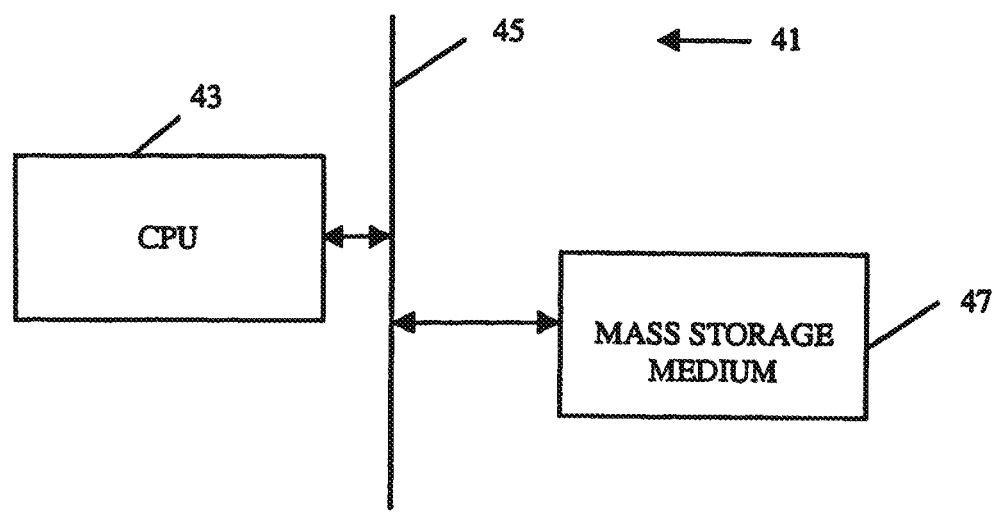
FIG. 6 is a block diagram depicting the implementation of the inventive system in a stand-alone configuration.
Figure 7:
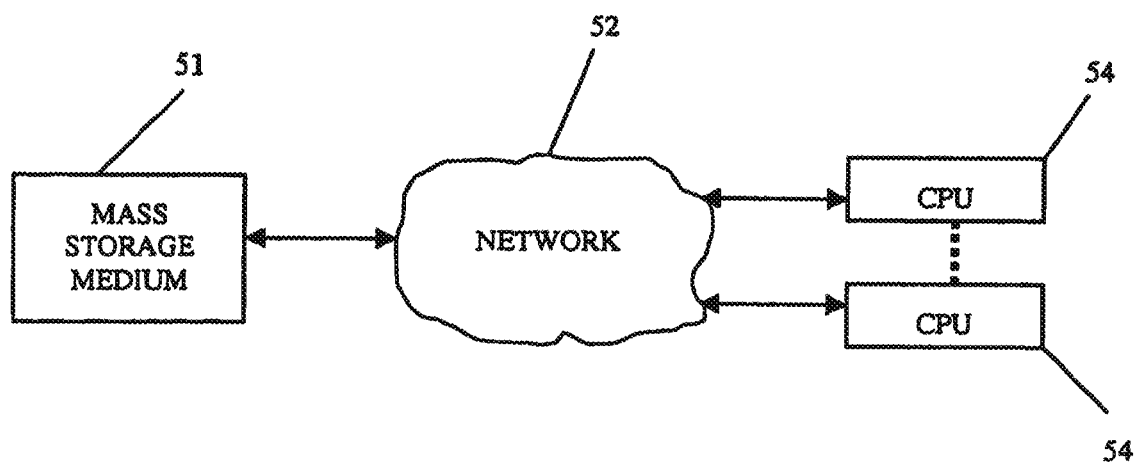
FIG. 7 is a block diagram depicting an inventive implementation as a shared remote mass storage device across a network.
Figure 8:
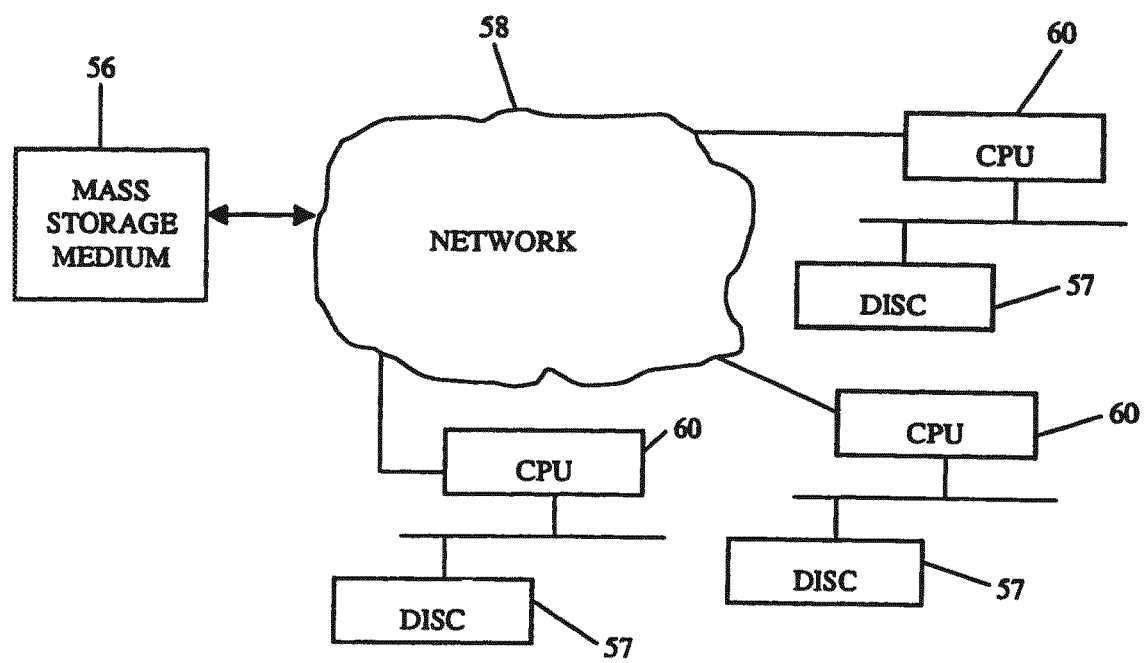
FIG. 8 is a block diagram depicting an inventive implementation as a network attached storage device (NASD)

As shown in FIGS. 6-8, the invention may be implemented in a variety of computer and network configurations. As shown in FIG. 6, the invention may be provided as part of a stand-alone computer system 41 comprising a CPU 43 connected to a system bus 45 which then accesses a mass storage medium 47 having the invention as disclosed herein.

As shown in FIG. 7, the mass storage medium 51 coupled with the invention may be itself connected directly to a network 52 over which a plurality of independent computers or CPU's 54 may then access the mass storage medium 51. The mass storage medium 51 may itself be comprised of a bank of hard disk drives comprising a RAID, disk farm, or some other massively parallel memory device configuration to provide access and approximate matching capabilities to enormous amounts of data at significantly reduced access times.

As shown in FIG. 8, a mass storage medium 56 coupled with the invention may be connected to a network 58 as a network attached storage device (NASD) such that over the network 58 a plurality of stand-alone computers 60 may have access thereto. With such a configuration, it is contemplated that each mass storage medium, represented for illustrative purposes only as a disk 57, would be accessible from any processor connected to the network. One such configuration would include assigning a unique IP address or other network address to each mass storage medium.

The configurations as exemplified by those shown in FIGS. 1 and 6-8 represent only examples of the various computer and network configurations with which the invention would be compatible and highly useful. Others would be apparent to those having skill in the art and the present invention is not intended to be limited through the examples as shown herein which are meant to be instead illustrative of the versatility of the present invention.

Figure 9:
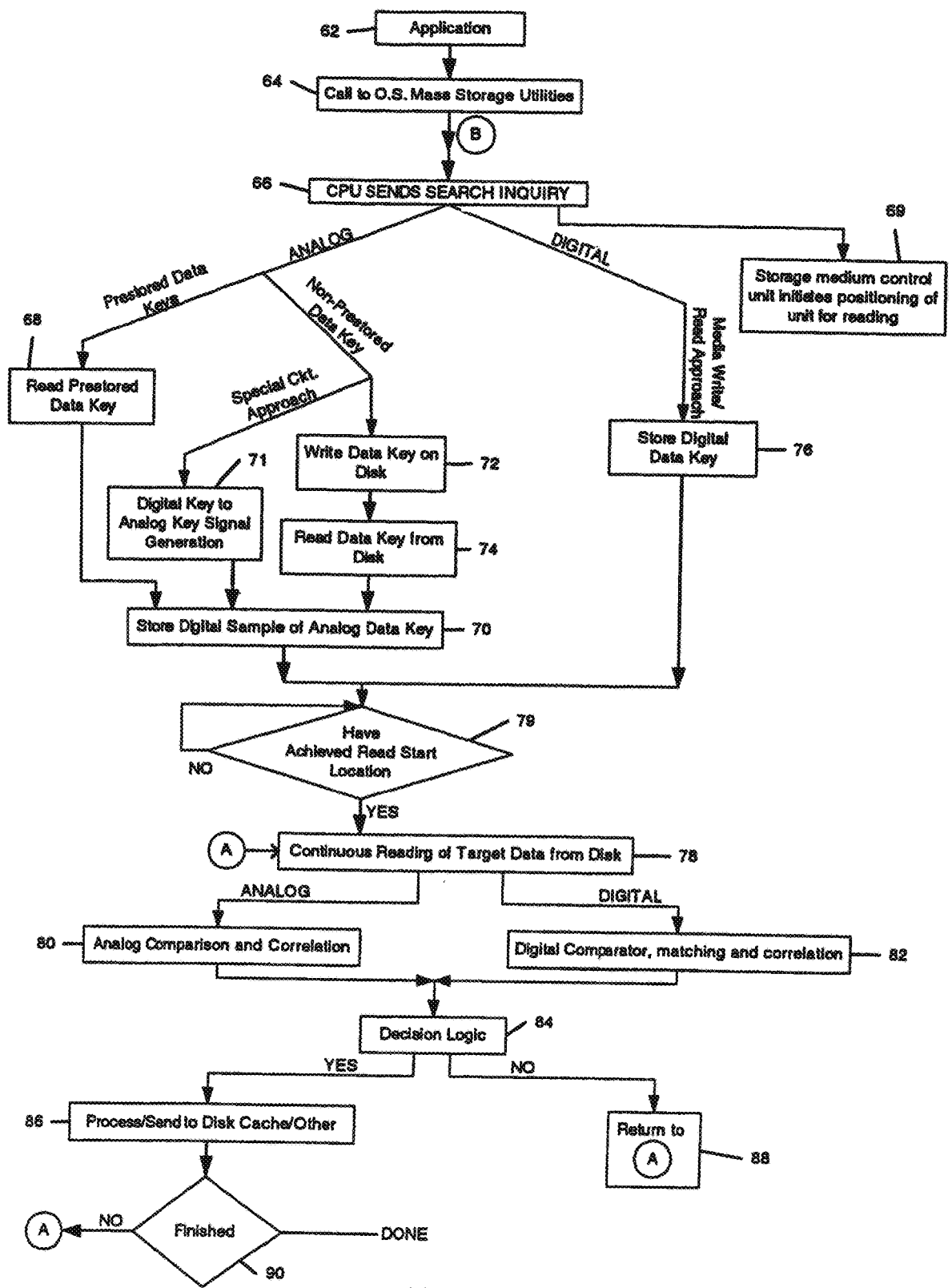
FIG. 9 is a flowchart detailing the logical steps for searching and retrieving data from a magnetic storage medium.

As shown in FIG. 9, the method of the invention for use in exact or approximate matching is described alternatively with respect to whether an analog or digital data domain is being searched. However, beginning at the start of the method, a CPU performs certain functions during which it may choose to access target data stored in a mass storage medium. Typically, the CPU runs a search inquiry application 62 which may be representative of a DNA search, an Internet search, an analog voice search, a fingerprint search, an image search, or some other such search during which an exact or approximate match to target data is desired. The search inquiry contains directives specifying various parameters which the disk control unit 28 and the re-configurable logic device 20 must have to properly obtain the data key from the mass storage medium 26. Examples of parameters include but are not limited to the following: the starting location for scanning the storage device; the final location after which (if there is not match) scanning is terminated; the data key to be used in the scanning; a specification of the approximate nature of the matching; and what information should be returned when a match occurs. The sort of information that can be returned includes the address of the information where the match was found, or a sector, record, portion of record or other data aggregate which contains the matched information. The data aggregate may also be dynamically specified in that the data returned on a match may be specified to be between bounding data specifiers with the matched data contained within the bounding field. As the example in FIG. 5 shows, looking for the word "bagdad" in a string of text might find the approximate match, due to misspelling, of the word "Baghdad", and return a data field which is defined by the surrounding sentence. Another query parameter would indicate whether the returned information should be sent to the system or input/output bus 34, or the disk cache 30.

Referring back to FIG. 9, the search inquiry will typically result in the execution of one or more operating system utilities. As an example of a higher level utility command, for the UNIX operating system, this could be modified versions of glimpse, find, grep, apropos, etc. These functions cause the CPU to send commands 66 such as search, approximate search, etc., to the re-configurable logic device 21 with relevant portions of these commands also being sent to the disk controller 28 to, for example, initiate any mass storage medium positioning activity 69 that is later required for properly reading target data from the mass storage medium.

At this point, depending upon the particular methodology desired to be implemented in the particular embodiment of the invention, it would be necessary that an analog or digital data key is determined. This data key, which can be either exact or approximate for a text search, corresponds to the data being searched for. For an analog data key, it may either be pre-stored such as in the mass storage medium, developed using dedicated circuitry, or required to be generated. Should the analog data key be pre-stored, a send pre-stored data key step 68 would be performed by the microprocessor 22 (see FIG. 1) which would transmit the data key in digital and sampled format to the re-configurable logic device 20 as shown in step 70. Alternatively, should the analog data key not be pre-stored, it can be developed using one of a number of mechanisms, two of which are shown in FIG. 9. In one, the microprocessor 22 would write the data key on the magnetic mass storage medium as at step 72 and then next read the data key as at step 74 in order to generate an analog signal representation of the data key. In another, as at step 71, the digital version of the data key received from the CPU would be converted using appropriate digital to analog circuitry to an analog signal representation which would in turn be appropriately sampled. The data key would then next be stored as a digital sample thereof as in step 70. Should a digital data key be used, it is only necessary that the microprocessor 22 store the digital data key as at step 76 in the compare register of the re-configurable logic device. It should be understood that depending upon the particular structures desired to be included for each re-configurable logic device, the data key may reside in either or all of these components, it merely being preferable to ultimately get the appropriate digital format for the data key into the re-configurable logic device 21 for comparison and correlation.

Next, after the mass storage medium 26 reaches its starting location as at 79, the target data stored on the mass storage medium is continuously read as at step 78 to generate a continuous stream signal representative of the target data. Should an analog data key have been used, this analog data key may then be correlated with an analog read of the target data from the mass storage medium 26 as at step 80.

While the inventors contemplate that any of many prior art comparators and correlation circuitry could be used, for present purposes the inventors suggest that a digital sampling of the analog signal and data key could be quite useful for performing such comparison and calculating the correlation coefficient, as explained below. It is noted that this analog signal generated from reading the target data from mass storage medium 26 may be conveniently generated by devices in the prior art from the reading of either analog or digital data, it not being necessary that a digital data key be used to match digital target data as stored in mass storage medium 26. Alternatively, a correlation step 82 may be performed by matching the digital data key with a stream of digital target data as read from the mass storage medium 26. It should be noted that the data key may reflect the inclusion of approximate information or the re-configurable logic device 21 may be programmed to allow for same. Thus, correlating this with target data read from the mass storage medium enables approximate matching capabilities.

Referring back to FIG. 9, decision logic 84 next makes an intelligent decision as to whether a portion of the target data approximately matches or does not approximately match the data key. Should a match be found, then the target data is processed as at step 86 and the key data requested by the search inquiry is sent to a disk cache 30, directly onto system bus 34, or otherwise buffered or made available to a CPU 32, network interface 36, or otherwise as shown in FIGS. 1, and 6-8. A logical step 88 is preferably included for returning to the continuous reading of target data from the mass storage medium 26, indicating something like a "do" loop. However, it should be understood that this is a continuous process and that target data is processed from the mass storage medium 26 as a stream and not in individualized chunks, frames, bytes, or other predetermined portions of data. While this is not precluded, the present invention preferably allows a data key to be in essence "slid" over a continuously varying target data read signal such that there is no hesitation in reading target data from the mass storage medium 26. There is no requirement to synchronize reading to the start or end of any multi-bit data structure, or any other intermediate steps required to be performed as the target data is compared continuously "on the fly" as it is read from the mass storage medium 26. Eventually, the data access is completed as at step 90 and the process completed.

Figure 10:
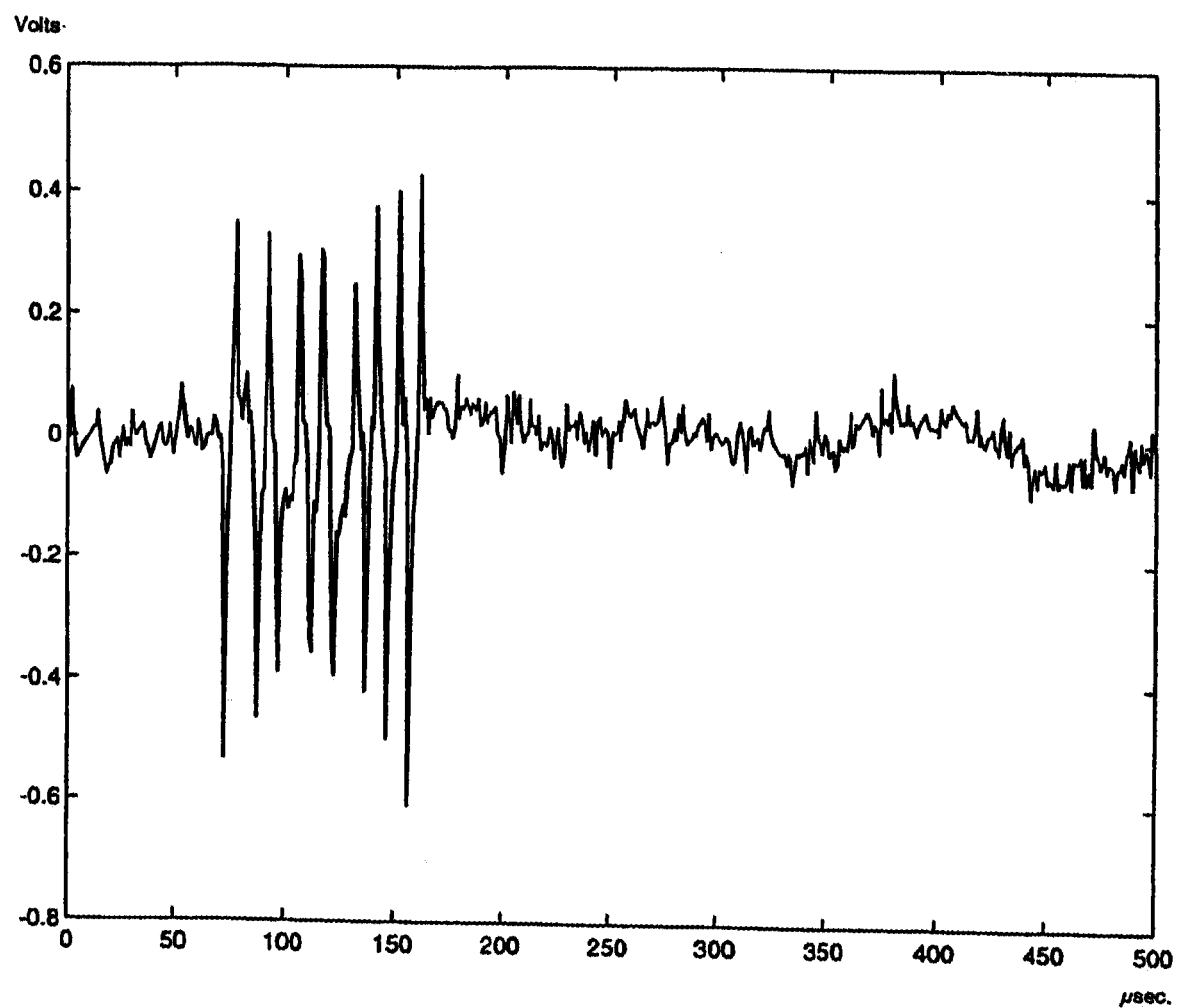
FIG. 10 is a graphical representation of an analog signal as might be used as a data key.
Figure 11:
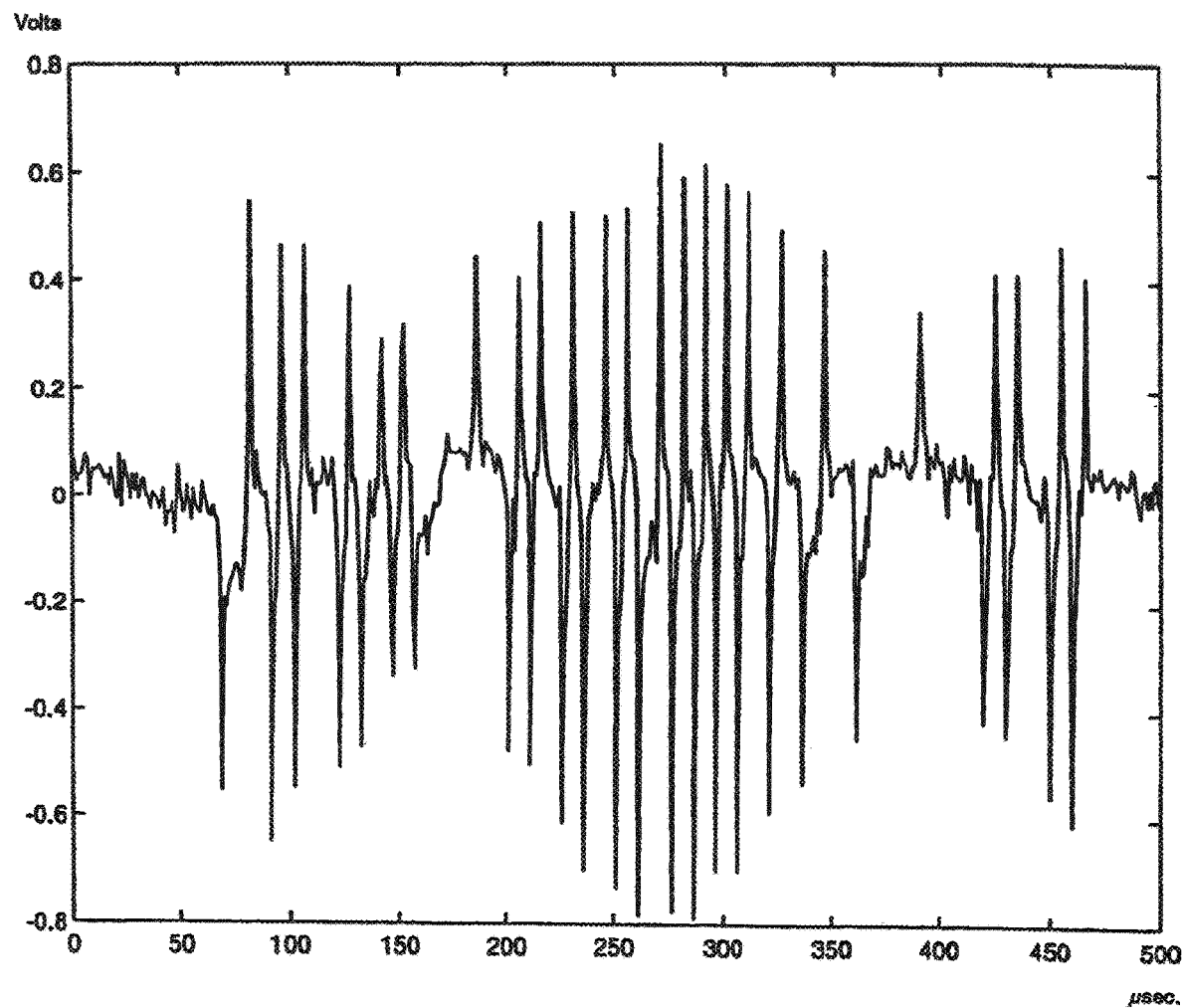
FIG. 11 is a graphical representation of an analog signal representing the continuous reading of data from a magnetic storage medium in which the data key is present.

The inventors herein have preliminarily tested the present invention in the analog domain and have generated preliminary data demonstrate its operability and effectiveness. In particular, FIG. 10 is a graphical representation of a measured analog signal output from a read/write head as the read/write head reads a magnetic medium on which is stored a 10-bit digital data key. As shown therein, there are peaks in the analog signal which, as known in the art, represents the true analog signal generated by a read/write head as target data is read from a magnetic medium such as a hard disk. The scales shown in FIG. 10 are volts along the vertical axis and tenths of microseconds along the horizontal axis. As shown in FIG. 11, an analog signal is generated, again by a read/write head, as target data is read from a pseudo-random binary sequence stored in a test portion of a magnetic medium. The read signal does not provide an ideal square wave output when examined at this level.

Figure 12:
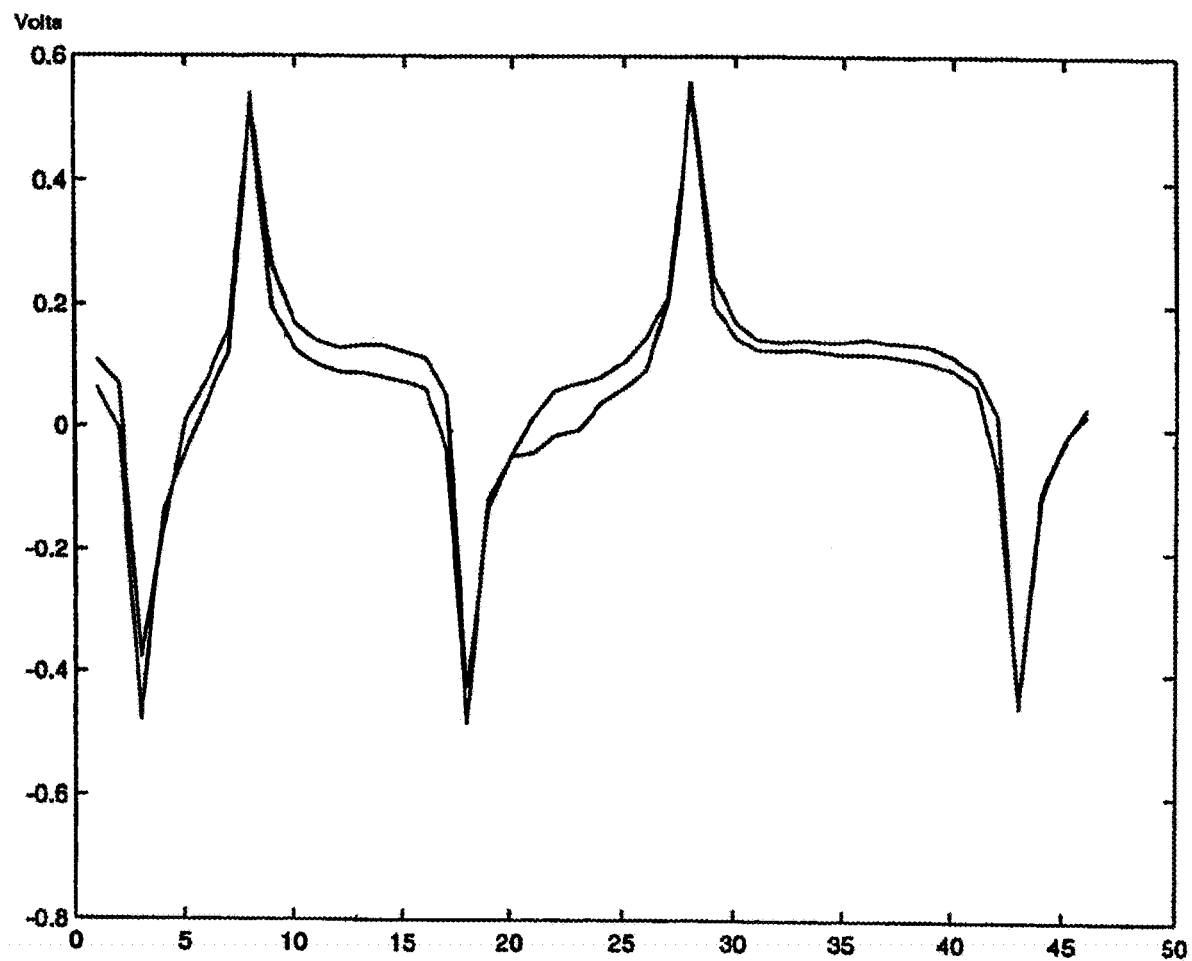
FIG. 12 is a graphical representation of the signal of FIG. 10 overlying and matched to the signal of FIG. 11.

FIG. 12 is a graphical representation, with the horizontal scale expanded, to more specifically illustrate the overlap between approximately two bits of the 8-bit data key and the corresponding two bits of target data found in the pseudo-random binary sequence encoded at a different location on the disk or magnetic medium.

Figure 13:
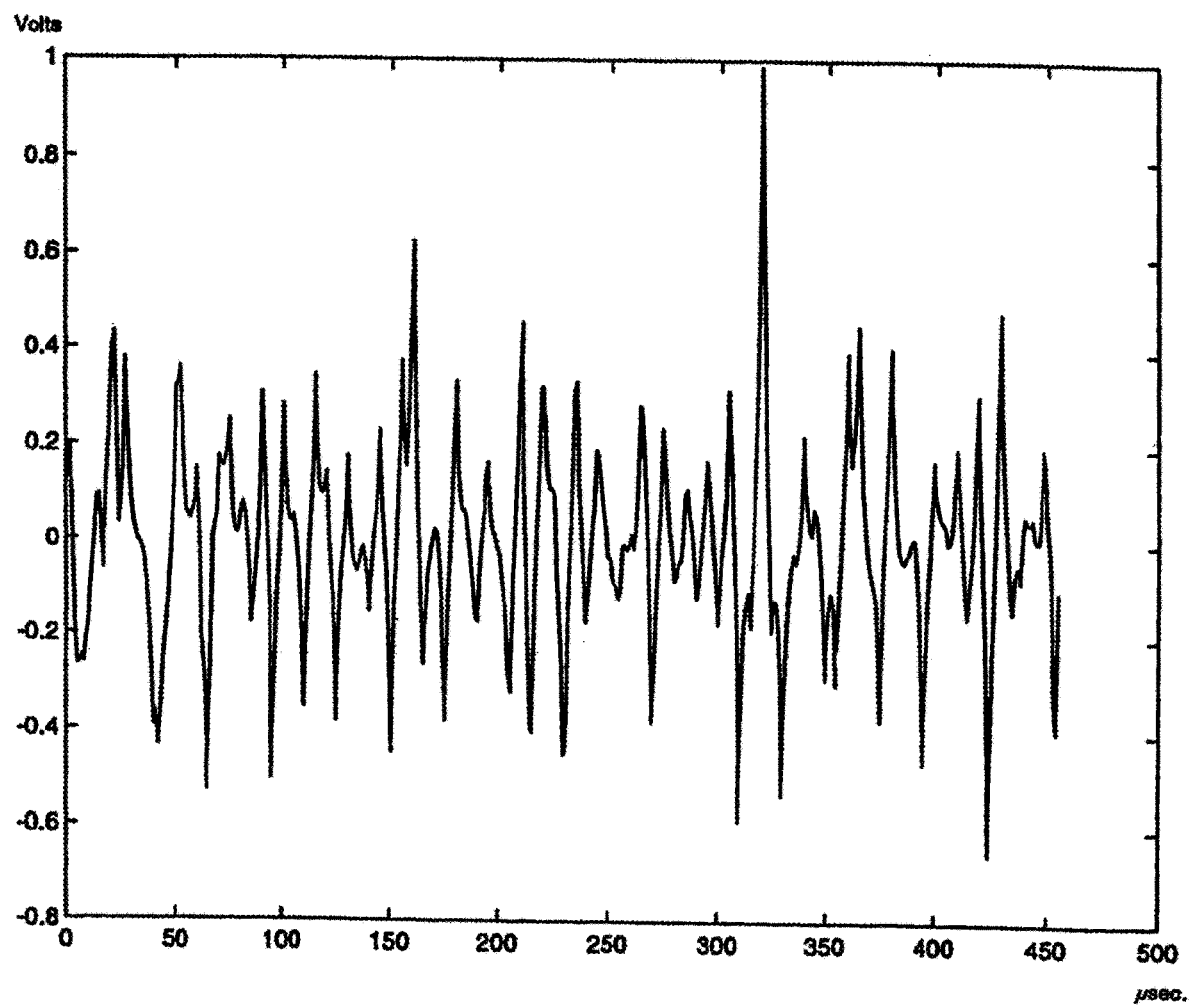
FIG. 13 is a graphical representation of a correlation function calculated continuously as the target data in the magnetic storage medium is scanned and compared with the data key.

FIG. 13 is a graphical representation of a correlation coefficient calculated continuously as the comparison is made between the data key and the continuous reading of target data from the hard disk. This correlation coefficient is calculated by sampling the analog signals at a high rate and using prior art signal processing correlation techniques. One such example may be found in Spatial Noise Phenomena of Longitudinal Magnetic Recording Media by Hoinville, Indeck and Muller, IEEE Transactions on Magnetics, Volume 28, no. 6, November 1992, the disclosure of which is incorporated herein by reference. A prior example of a reading, comparison, and coefficient calculation method and apparatus may be found in one or more of one of the co-inventor's prior patents, such as U.S. Pat. No. 5,740,244, the disclosure of which is incorporated herein by reference. The foregoing represent examples of devices and methods which may be used to implement the present invention, however, as mentioned elsewhere herein, other similar devices and methods may be likewise used and the purposes of the invention fulfilled.

As shown in FIG. 13, at approximately the point labeled 325, a distinct peak is noted at approximately 200 microseconds which approaches 1 Volt, indicating a very close match between the data key and the target data. FIG. 10 is also illustrative of the opportunity for approximate matching which is believed to be a powerful aspect of the invention. Looking closely at FIG. 13, it is noted that there are other lesser peaks that appear in the correlation coefficient. Thus, if a threshold of 0.4 Volts were established as a decision point, then not only the peak occurring which approaches 1 would indicate a match or "hit" but also another five peaks would be indicative of a "hit". In this manner, a desired coefficient value may be adjusted or predetermined as desired to suit particular search parameters. For example, when searching for a particular word in a large body of text, lower correlation values may indicate the word is present but misspelled.

Figure 14:
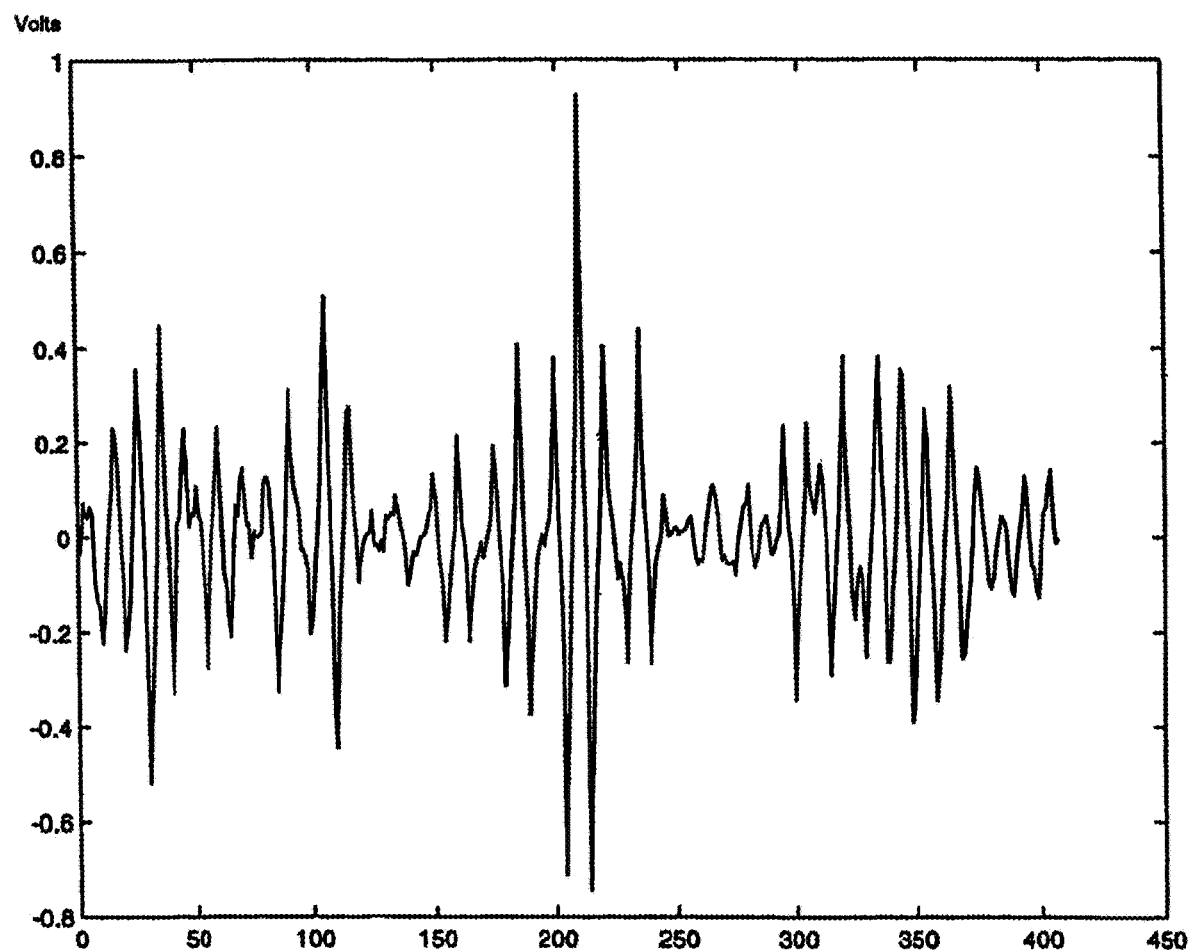
FIG. 14 is a graphical representation of a correlation function as the data key is continuously compared with a signal taken from reading a different set of target data from the magnetic storage medium but which also contains the data key.

FIG. 14 depicts the continuous calculation of a correlation coefficient between the same 8-bit data key but with a different target data set. Again, a single match is picked up at approximately 200 microseconds where the peak approaches 1 Volt. It is also noted that should a lower threshold be established additional hits would also be located in the target data.

Figure 15:
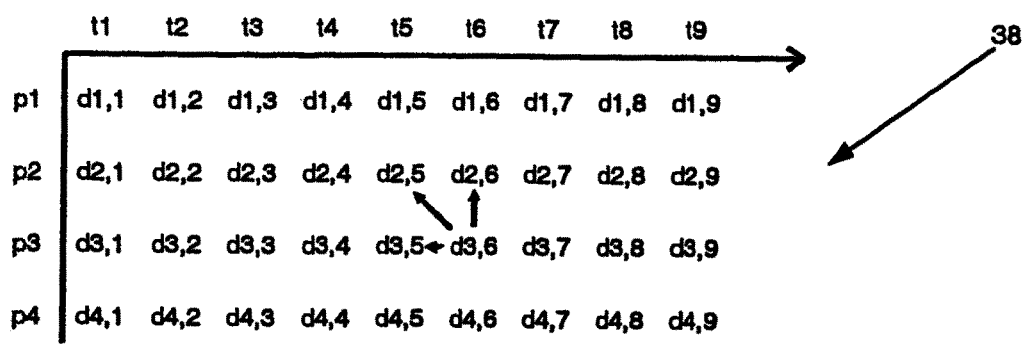
FIG. 15 is one embodiment of a table generated by the present invention for use in performing sequence matching operations.

As previously mentioned, the invention is also capable of performing sequence matching searches. With reference to FIG. 15, a table 38 is generated by the re-configurable logic device 20 to conduct such a search. Specifically, $p_1$ $p_2$ $p_3$ $p_4$ represents the data key, p, or desired sequence to be searched. While the data key of FIG. 15 only shows four characters, this is for illustrative purposes only and it should be appreciated that a typical data key size for sequence searching is on the order of 500-1000, or even higher. The symbols $t_1$, $t_2$, $t_3$ ... $t_9$ represent the target data, t, streaming off of the mass storage medium 26. Again, while only nine (9) characters of such data are shown, it should be appreciated that the typical size of the mass storage medium 26 and thus the target data streaming off of it can typically be in the range of several billion characters. The symbols $d_{i,j}$ represent the edit distance at position i in the data key and position j in the target data. It is assumed that the data key is shorter relative to the target data, although it is not required to be so. There may be a set of known (constant) values for an additional row (d0,j) and column (di,0) not shown in FIG. 15.

The values for di,j are computed by the re-configurable logic device 20 using the fact that di,j is only a function of the following characters: (1) pi, (2) tj, (3) di−1, j−1, (4) di−1,j, and (5) di,j−1. This is illustrated in FIG. 15 with respect to the position d3,6 by showing its dependency on the values of d2,5 and d2,6 and d3,5 as well as p3 and t6. In one embodiment, the values for di,j are computed as follows:

$$d\ i,j=\max[di,j-1+A;di-1,j+A;di-1,j-1+Bi,j],$$

where A is a constant and Bi,j is a tabular function of pi and tj. The form of the function, however, can be quite arbitrary. In the biological literature, B is referred to as the scoring function. In the popular database searching program BLAST, scores are only a function of whether or not pi=tj. In other contexts, such as for amino acid sequences, the value of B is dependent upon the specific characters in p and t.

Figure 16:
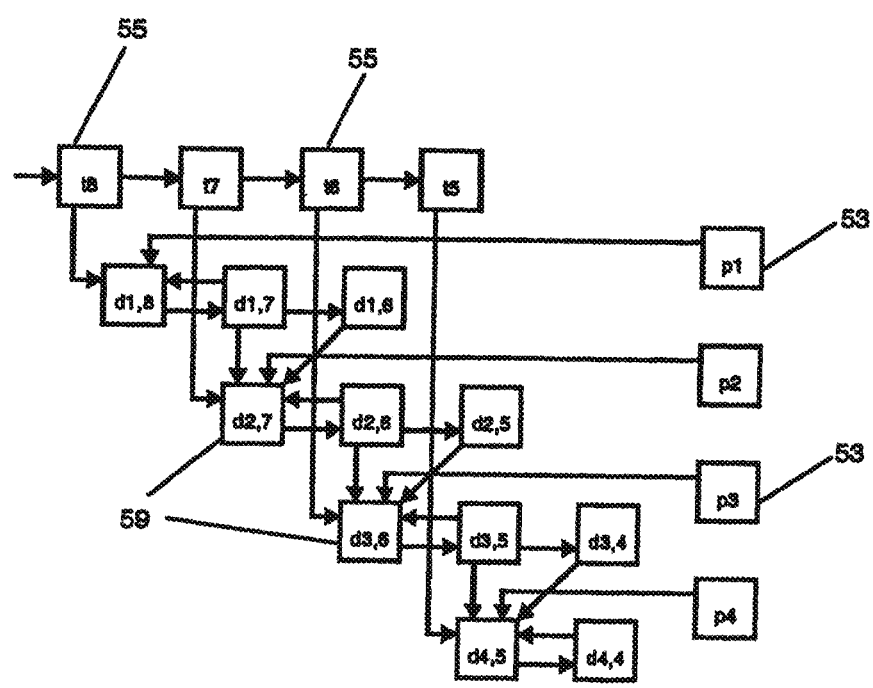
FIG. 16 is a block diagram of one embodiment of a systolic array architecture that can be used by the inventive system to compute the values of the table of FIG. 15.

FIG. 16 shows one embodiment of a systolic array architecture used by the invention to compute the values in the table 38 of FIG. 15. The characters of the data key are stored in the column of data registers 53, while the characters of the target data streaming off of the mass storage medium 26 are stored in the data shift registers 55. The values of di,j are stored in the systolic cells 59 which themselves are preferably FPGA's.

Figure 17:
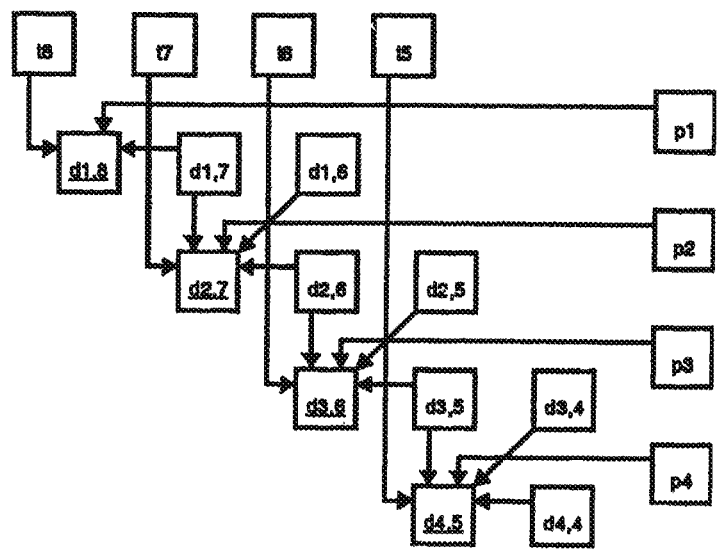
FIGS. 17 and 18 are block diagrams of the systolic array architecture of FIG. 15 in operation during the combinatorial and latch part of the clock cycle, respectively, of the system of FIG. 1.
Figure 18:
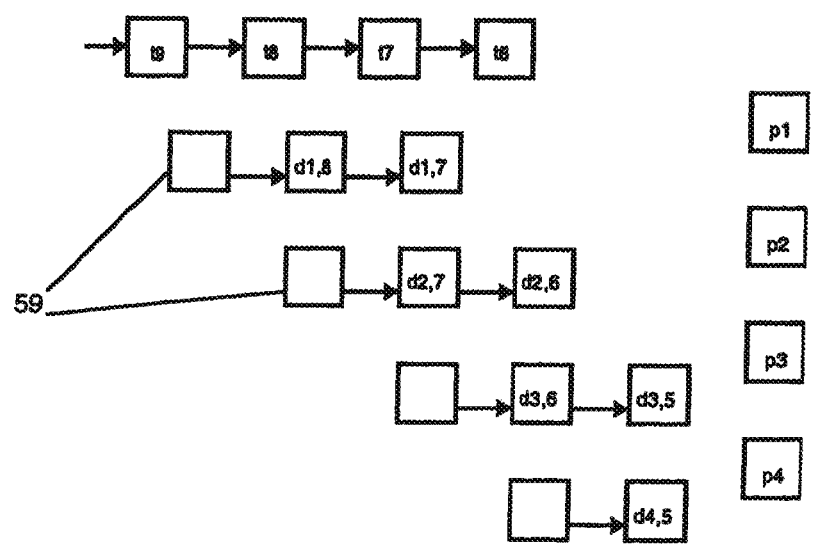

The operation of the array of FIG. 16 will now be illustrated using FIGS. 17 and 18. As shown in FIG. 17, in the first (i.e., combinational) part of the clock cycle of the system, the four underlined values are computed. For example, the new value d3,6 is shown to depend upon the same five values illustrated earlier in FIG. 15. As shown in FIG. 18, in the second (i.e., latch) part of the clock cycle, all the characters in di,j and tj are shifted one position to the right. A comparator 61 is positioned at each diagonal cell of the d array and determines when the threshold has been exceeded.

The sequence matching operation will now be described with reference to FIGS. 19-22 with respect to the following example:
key=axbacs
target data=pqraxabcstvq
A=1
B=2, if i=j
B=−2 if i≠j From these variables, the table of FIG. 19 is generated by the re-configurable logic device 20. Assuming a pre-determined threshold of "8", the re-configurable logic device 20 will recognize a match at d6,9.

Figure 20:
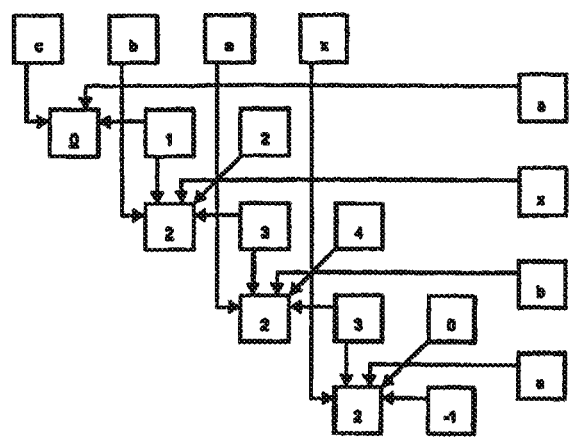
FIG. 20 is a block diagram of the systolic array architecture of FIG. 16 for the example of FIG. 19.
Figure 21:
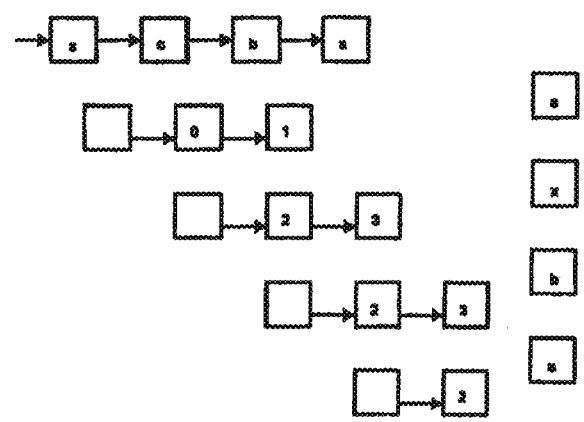
FIGS. 21 and 22 are block diagrams of the systolic array architecture of FIG. 20 in operation during the combinatorial and latch part of the clock cycle, respectively, of the system of FIG. 1.
Figure 22:
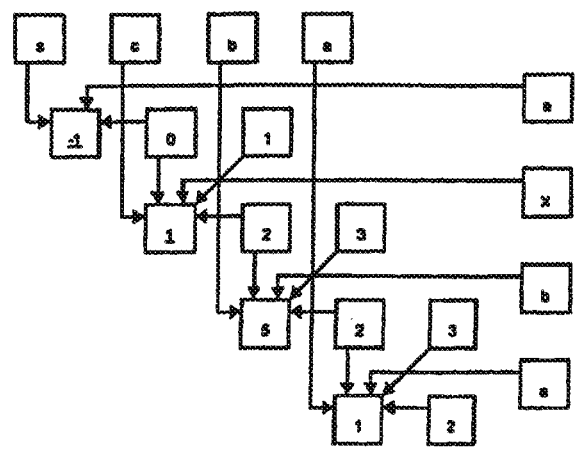

A portion of the synthesis arrays representing the values present in FIGS. 16-18 for this example are shown in FIGS. 20-22, respectively. A match is identified by the re-configurable logic device 20 when the value on any row exceeds a predetermined threshold. The threshold is set based on the desired degree of similarity desired between the data key and the target data stored in mass memory device 26. For example, in the case of an exact match search, the data key and target data must be identical. The match is then examined by the CPU 32 via a traceback operation with the table of FIG. 19. Specifically a "snapshot" of the table is sent to the CPU 32 at a predetermined time interval to assist in traceback operations once a match is identified. The interval is preferably not too often to overburden the CPU 32, but not so infrequent that it takes a lot of time and processing to recreate the table. To enable the CPU 32 to perform the traceback operation, it must be able to recreate the d array in the area surrounding the entry in the table that exceeded the threshold. To support this requirement, the systolic array can periodically output the values of a complete column of d ("a snapshot") to the CPU 32. This will enable the CPU 32 to recreate any required portion of d greater than the index j of the snapshot.

Figure 23:
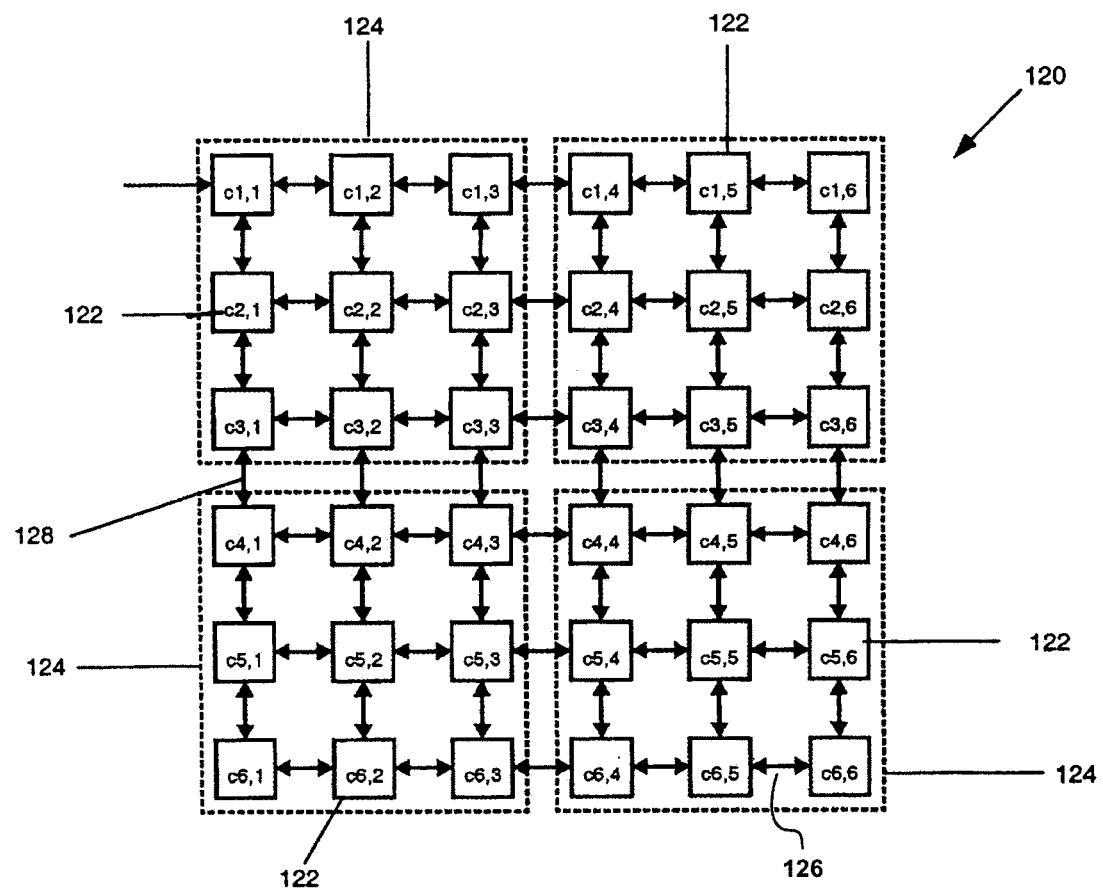
FIG. 23 is a block diagram of one embodiment of a systolic array architecture that can be used by the inventive system in performing image matching operations.

Many matching applications operate on data representing a two dimensional entity, such as an image. FIG. 23 illustrates a systolic array 120 of re-configurable logic devices 20 (see re-configurable logic chips 124 in FIG. 23), preferably FPGA's, which enables matches on two dimensional data. The individual cells 122 each hold one pixel of the image for which the user is desiring to match (the image key) and one pixel of the image being searched (the target image). For images of sufficiently large size, it is likely they will not all fit into one re-configurable logic chip 124. In such cases, a candidate partitioning of cells to chips is shown with the dashed lines, placing a rectangular subarray of cells in each chip 124. The number of chip-to-chip connections can be minimized by using a subarray that is square (i.e., same number of cells in the vertical and horizontal dimension). Other more complicated arrangements are shown below.

Figure 24:
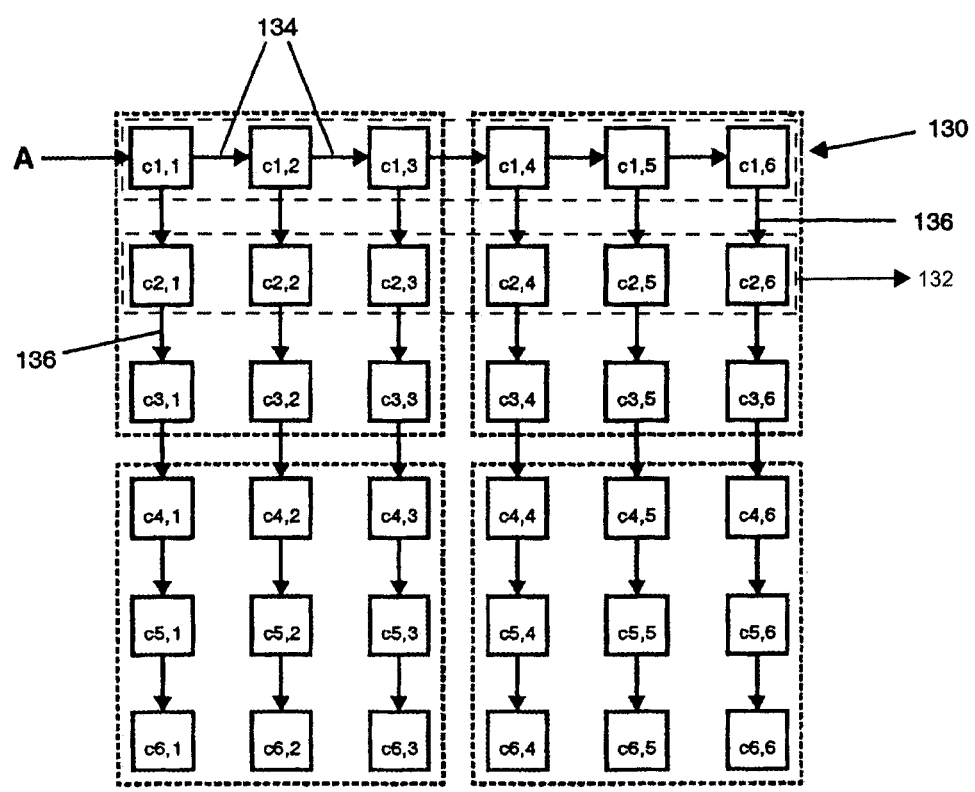
FIG. 24 is a block diagram of another arrangement for the systolic array architecture in performing image matching operations.

Loading of the target image into the array 120 is explained using FIG. 24. Individual rows of each target image streaming off the mass magnetic medium 26, shown generally as point A, into the top row 130 of the array via the horizontal links 134 connecting each cell. With such a configuration, the top row 130 operates as a data shift register. When the entire row 130 is loaded, the row is shifted down to the next row 132 via the vertical links 136 shown in each column. Once the entire image is loaded into the array, a comparison operation is performed, which might require arbitrary communication between neighboring cells. This is supported by both the horizontal and vertical bi-directional links 126 and 128, respectively, shown in FIG. 23.

Figure 28:
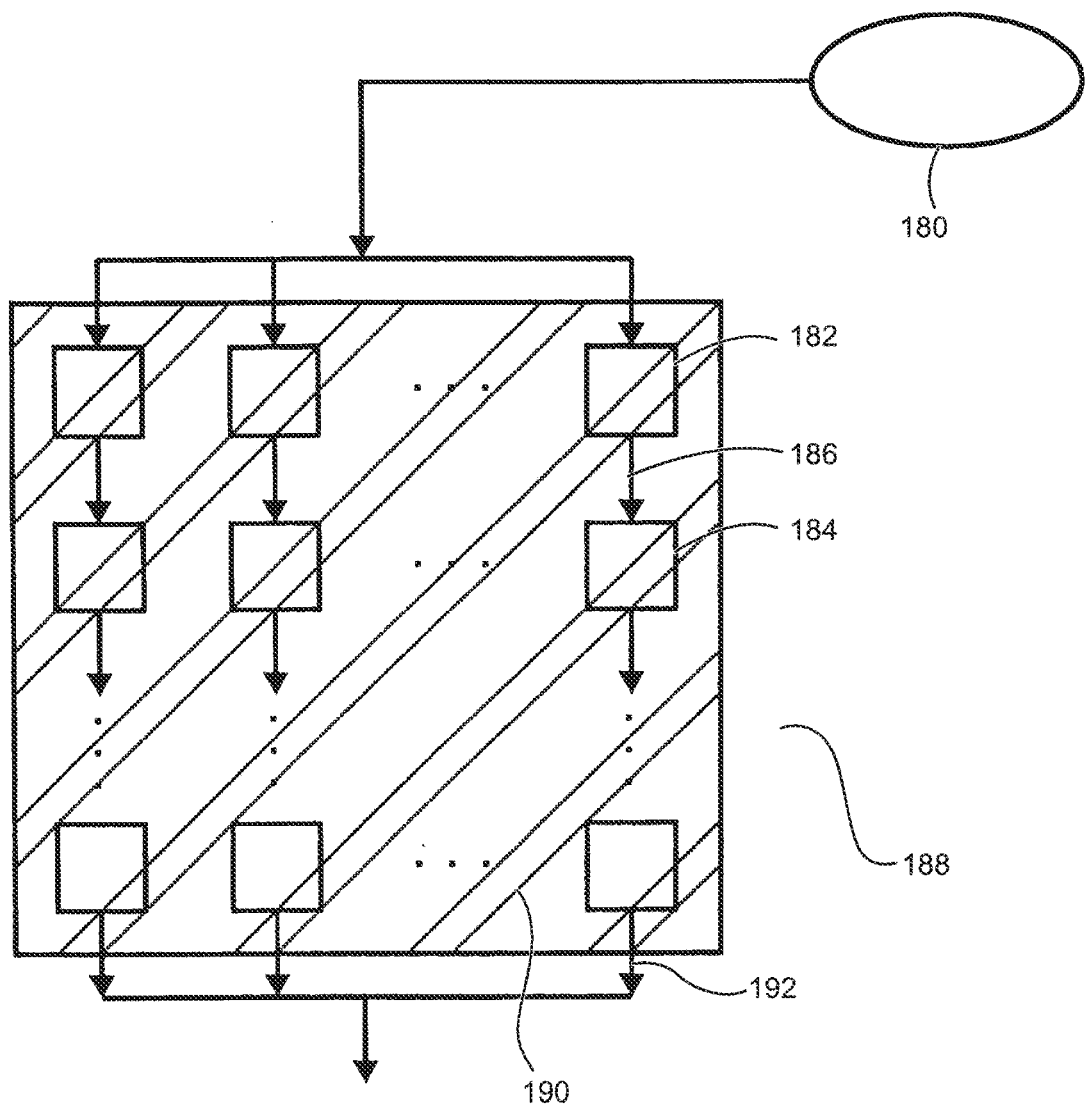
FIG. 28 is a block diagram showing a more complex arrangement of FPGA's.

Although for simplicity purposes the individual bi-directional links 126 and 128 are shown simply in FIGS. 23 and 24, FIG. 28 shows the flexibility for implementing a much more complex set of bi-directional links. As shown in FIG. 28, data may be communicated from a mass storage medium 180 and be input to a first row of a plurality of cells 182, with each cell of the first row having a direct link to the corresponding cell 184 below it in a second row of cells with a simple link 186, and so on throughout the array 188 of cells. Overlying the array 188 of cells is a connector web 190 which provides direct connectivity between any two cells within the array without the need for transmission through any intervening cell. The output of the array 188 is represented by the sum of the exit links 192 at the bottom of the array 188. It should be understood that each cell in the array may be comprised of an FPGA, each one of which preferably has a re-configurable logic element corresponding to element 20 in FIG. 1, or any one of which may have a re-configurable logic element 20 as well as a data shift register 24, or any one of which may have the entirety of re-configurable logic device 21.

Figure 25:
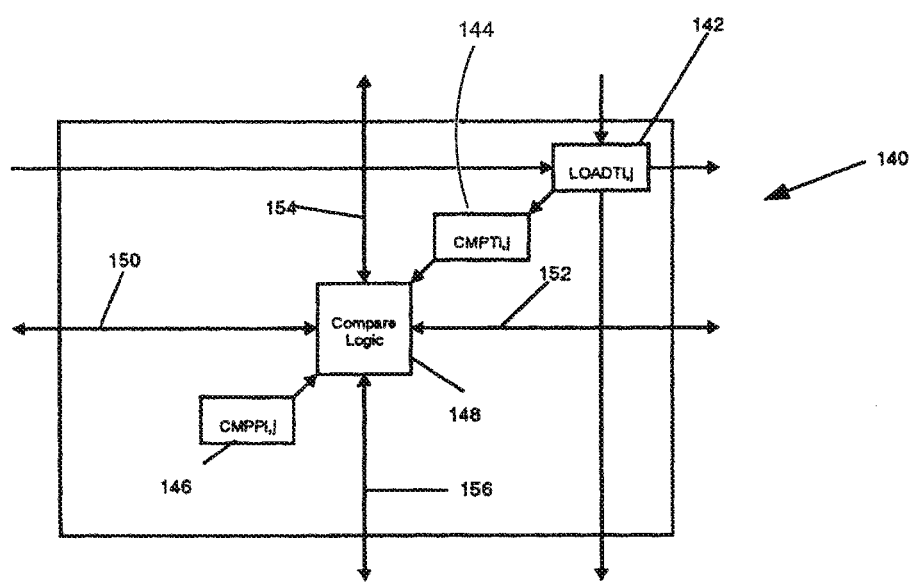
FIG. 25 is a block diagram of one embodiment of an individual cell of the systolic array shown in FIG. 23.

One embodiment for the individual cells of array 120 is illustrated in FIG. 25. The cell 140 includes a pixel register 142, LOADTi,j, which contains the pixels of the target image currently being loaded into the array. A register, 144 CMPTi,j, contains a copy of the pixel register 142 once the complete target image has been loaded. This configuration enables the last target image loaded to be compared in parallel with the next target image being loaded, essentially establishing a pipelined sequence of load, compare, load, compare, etc. A register 146, CMPPi,j, contains the pixels of the image key to be used for comparison purposes, and the compare logic 148 performs the matching operation between register 144 and register 146. The compare logic 148 may include the ability to communicate with the neighboring cells to the left, right, up, and down shown generally as 150, 152, 154, and 156, respectively, to allow for complex matching functions.

Figure 26:
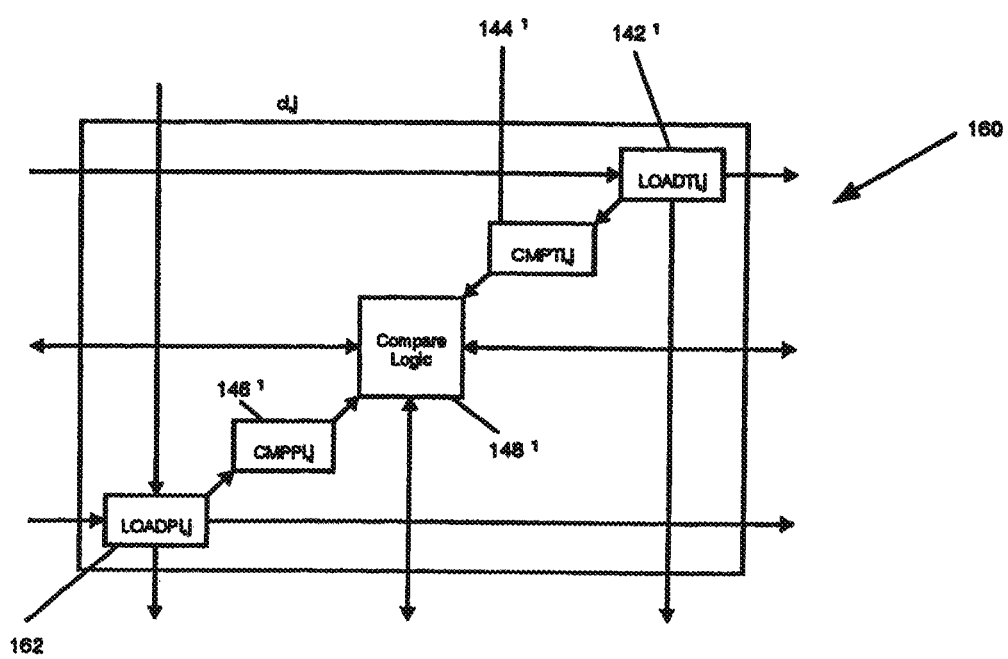
FIG. 26 is a block diagram of another embodiment of an individual cell of the systolic array shown in FIG. 23.

Another embodiment for the individual cells of array 120 of FIG. 23 is illustrated in FIG. 26. The cell 140 of FIG. 25 has been augmented as shown by FIG. 26 to support simultaneous loading of the image key and the target image. In particular, the cell 160 shown by FIG. 26 includes the same components of the cell 140 shown by FIG. 25 (see $142^1$, $144^1$, $146^1$, and $148^1$), but adds a new register 162, LOADPi,j, which is used to load the image key, and is operated in the same manner as register 142 discussed above in connection with FIG. 25. With such a configuration, if one disk read head of the mass storage medium 26 is positioned above the image key, and a second disk read head is positioned above the target image, they can both flow off the disk in parallel and be concurrently loaded into the array 160.

The operation performed within the compare logic block can be any function that provides a judgment as to whether or not there are significant differences between the target image and the image key. An example includes cross-correlations across the entire image or sub-regions of the image as described in John C. Russ, *The Image Processing Handbook*, $3^{rd}$ edition, CRC Press 1999, which is incorporated herein by reference.

The invention is also capable of performing data reduction searching. Such searching involves matching as previously described herein, but includes summarizing the matched data in some aggregate form. For example, in the financial industry, one might want to search financial information to identify a minimum, maximum, and latest price of a stock. A re-configurable logic device for computing such aggregate data reductions is illustrated as 100 in FIG. 27. Here, a data shift register 102 reads target data from a mass storage medium containing stock price information. In the example shown, three data reduction searches are shown, namely calculating the minimum price, the maximum price, and the latest price. As target data is fed into the data shift register 102, decision logic computes the desired data reduction operation. In particular, the stock price is fed to a minimum price comparator 110 and maximum price comparator 112 and stored therein. Each time a stock price is fed to comparator 110, it compares the last stored stock price to the stock price currently being fed to it and whichever is lower is stored in data register 104. Likewise, each time a stock price is fed to comparator 112, it compares the last stored stock price to the stock price currently being fed to it and whichever is higher is stored in data register 106. In order to compute the latest price, the stock price is fed into a data register 108 and the current time is fed into a comparator 114. Each time a time value is fed into comparator 114, it compares the last stored time with the current time and which ever is greater is stored in data register 116. Then, at the end of the desired time interval for which a calculation is being made, the latest price is determined.

Figure 27:
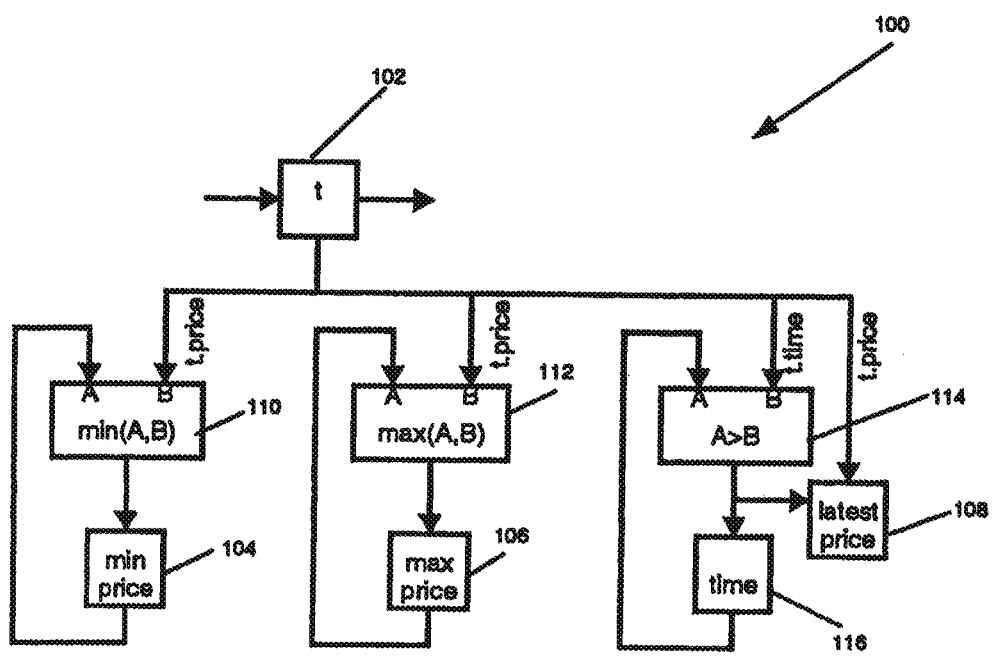
FIG. 27 is a block diagram showing an example using the inventive system for performing data reduction operations.

While data reduction searching has been described with respect to the very simple financial example shown in FIG. 27, it can be appreciated that the invention can perform data reduction searching for a variety of different applications of varying complexity requiring such functionality. The re-configurable logic device need simply be configured with the hardware and/or software to perform the necessary functions.

The ability to perform data reduction searching at disk rotational speeds cannot be under-estimated. One of the most valuable aspects of information is its timeliness. People are growing to expect things at Internet speed. Companies that can quickly compute aggregate data reductions will clearly have a competitive advantage over those that cannot.

Additionally, data processing operations other than searching and reduction may also be implemented on the re-configurable logic device 21. As mentioned above, these operations are referred to herein as data manipulation operations. Examples of data manipulation operations or suboperations thereof that can be performed on a PLD 20 include encryption, decryption, compression, and decompression operations. The preferred PLD 20 is an FPGA, even more preferably, a Xilinx FPGA. Further, still, any of these additional operations can be combined with searching and/or reduction operations in virtually any manner to form a multi-stage data processing pipeline that provides additional speed, flexibility, and security. The complexity of each operation is also virtually limitless, bounded only by the resources of the re-configurable logic device 21 and the performance requirements of a practitioner of the invention. Each processing operation can be implemented in a single stage or in multiple stages, as may be necessary.

Figure 29:
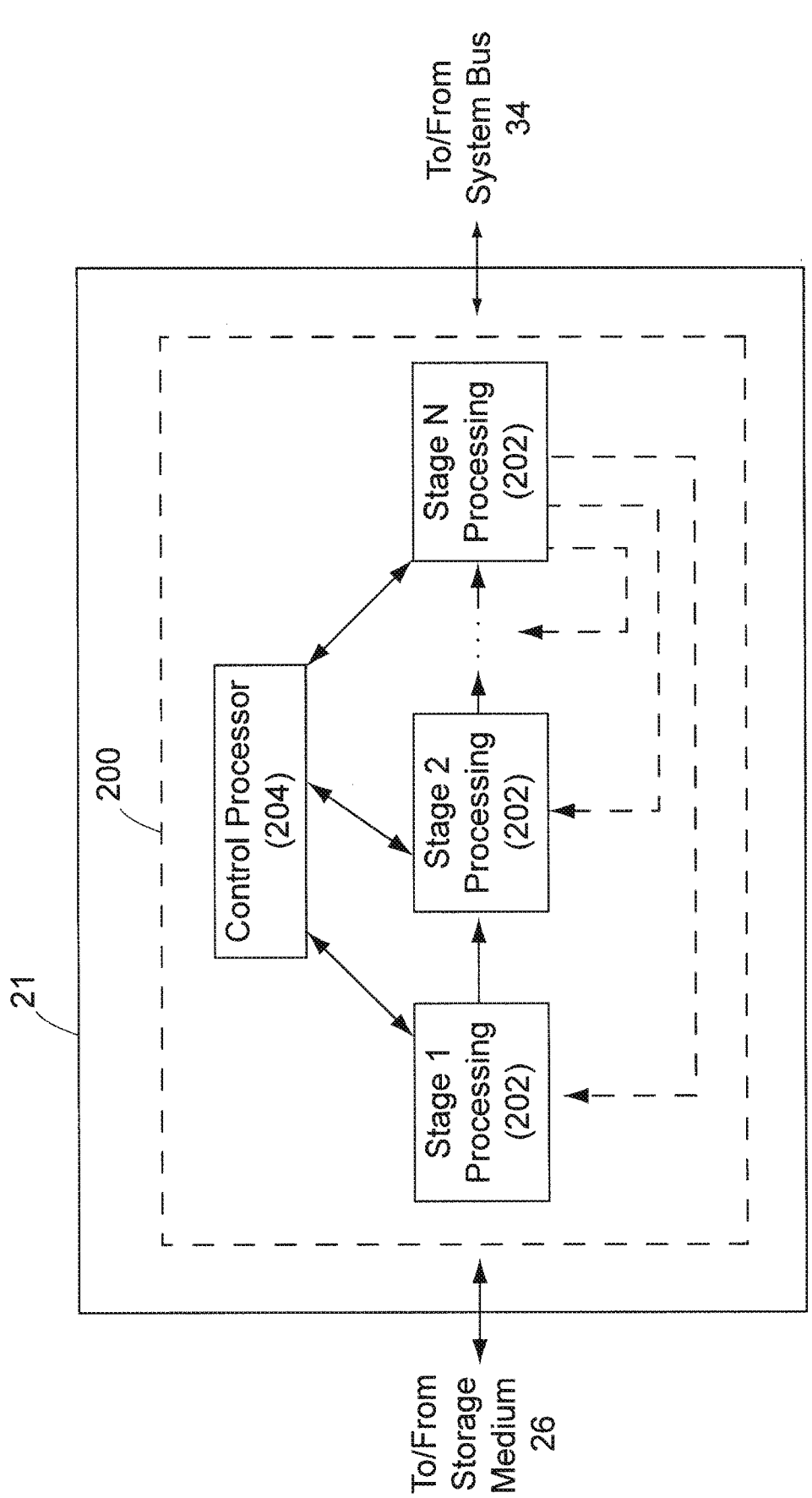
FIGS. 29 and 30 illustrate exemplary embodiments for multi-stage processing pipelines implemented on a re-configurable logic device.

FIG. 29 illustrates a multi-stage data processing pipeline 200 implemented within a re-configurable logic device 21 for a system as shown in FIG. 1. At least one stage in the pipeline 200 is implemented on a PLD. Each stage 202 of the pipeline 200 is configured to process the data it receives according to its intended functionality (e.g., compression, decompression, encryption, decryption, etc.), and thereafter pass the processed data either to the next stage in the pipeline, back to a prior stage, or to the control processor 204. For example, the first stage 202 in the pipeline 200 operates on data streaming from a mass storage medium 26 and processes that data according to its functionality. The data processed by stage 1 is thereafter passed to stage 2 for further processing, and so on, until stage N is reached. After the data has passed through all appropriate stages 202, the result(s) of that processing can be forwarded to the control processor 204 and/or the computer over system bus 34.

This exemplary pipeline 200 of FIG. 29 can also be replicated so that a separate pipeline 200 is associated with each head on a disk system of the mass storage medium 26. Such a design would improve performance associated with performing parallel processing operations on multiple data streams as those streams are read out from the disk. If there are no other performance bottlenecks in the system, it is expected that throughput will increase linearly with the number of pipelines 200 employed.

It should be noted that each stage need not necessarily be implemented on a PLD 20 within the re-configurable logic device 21. For example, some stages may be implemented in software on a processor (not shown) or dedicated hardware (not shown) accessible to the PLD 20. The exact design of each stage and the decision to implement each stage on a PLD 20, in software, or in dedicated hardware such as an ASIC, will be dependent upon the associated cost, performance, and resources constraints applicable to each practitioner's plans. However, by employing pipelining entirely within a PLD 20 such as an FPGA, the processing throughput can be greatly increased. Thus, for a balanced pipeline (i.e., a pipeline where each stage has the same execution time) having no feedback paths, the increase in data throughput is directly proportional to the number of stages. Assuming no other bottlenecks, as mentioned above, then with N stages, one can expect a throughput increase of N. However, it should be noted that the multi-stage pipeline may also utilize feedback between stages, which may be desirable for certain operations (e.g., some encryption operations) to reduce implementation cost or increase efficiency.

Figure 30:
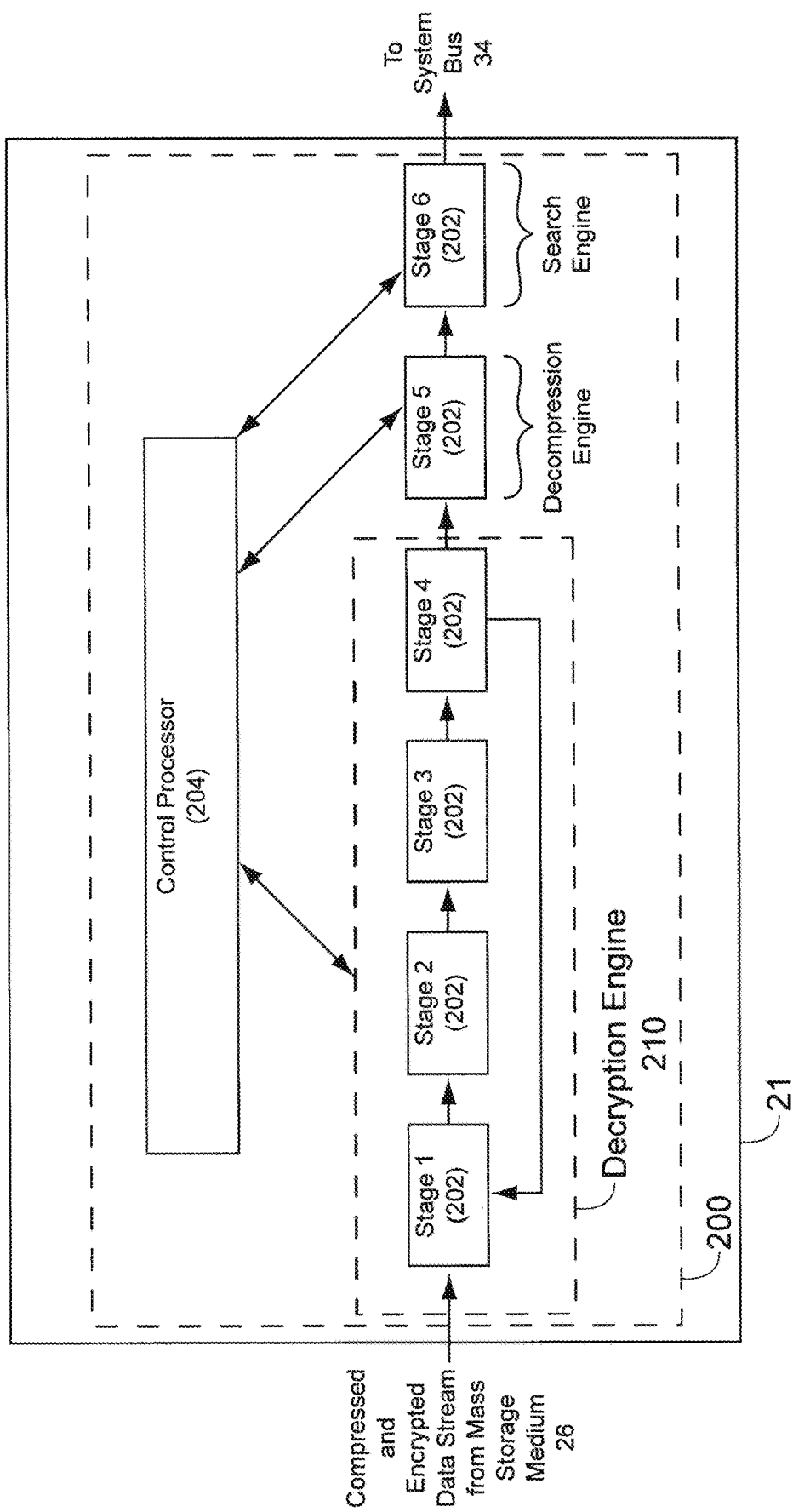

FIG. 30 illustrates an exemplary multistage pipeline 200 wherein the first four stages 202 comprise a decryption engine 210. The decryption engine 210 in this example operates to receive encrypted and compressed data streaming from the mass storage medium 26. The fifth stage 202 serves as a decompression engine to decompress the decrypted compressed data exiting the decryption engine 210. The output of the decompression engine is thus a stream of decrypted and decompressed data that is ready to be processed by the stage 6 search engine. Control processor 204 controls each stage to ensure proper flow therethrough. The control processor 204 preferably sets up parameters associated with each pipeline stage (including, if appropriate, parameters for stages implemented in software).

Figure 31:
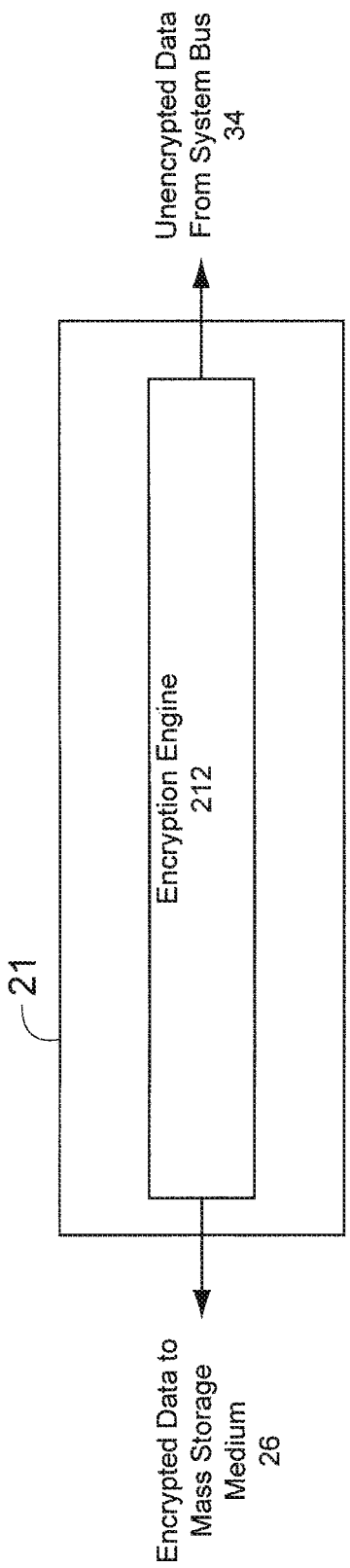
FIG. 31 illustrates an encryption engine implemented on a re-configurable logic device.
Figure 32:
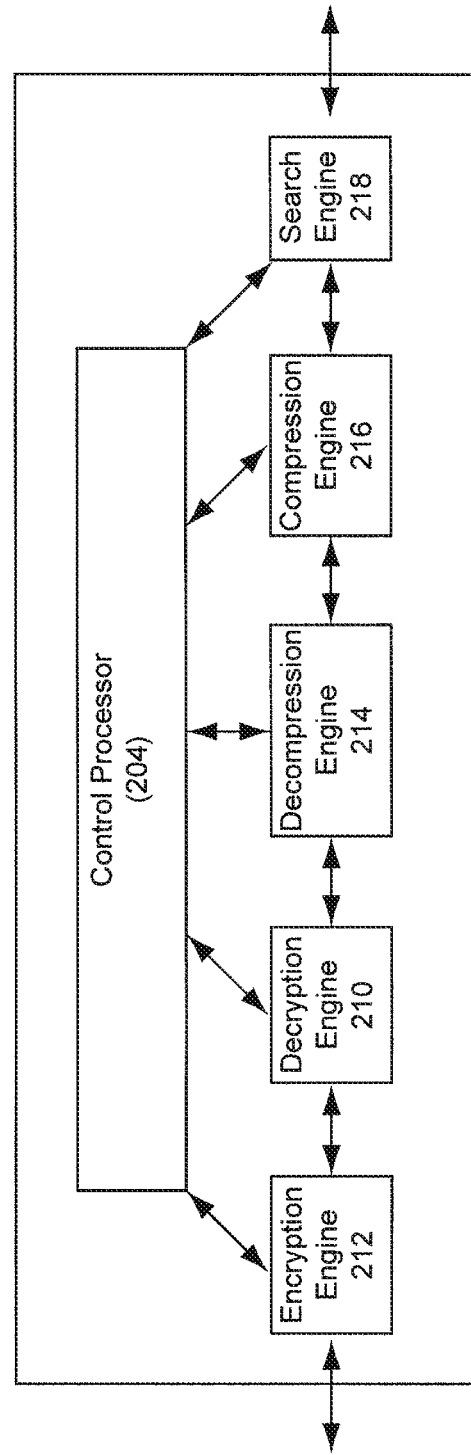
FIG. 32 illustrates another exemplary embodiment for a multi-stage processing pipeline implemented on a re-configurable logic device.

FIG. 31 depicts an example wherein a PLD is used as an encryption engine for data either flowing from the system bus 34 to the mass storage medium 26 or data flowing from the mass storage medium 26 to the system bus 34. FIG. 32 depicts yet another exemplary pipeline wherein the pipeline 200 is comprised of multiple processing engines (each engine comprising one or more stages), each of which can be either activated by the control processor 204 such that the engine performs its recited task on the data it receives or deactivated by the control processor 204 such that is acts as a "pass through" for the data it receives. Activation/deactivation of the different engines will in turn depend on the functionality desired for the pipeline. For example, if it is desired to perform a search operation on encrypted and compressed data stored in the mass storage medium 26, the decryption engine 210, decompression engine 214, and search engine 218 can each be activated while the encryption engine 212 and compression engine 216 can each be deactivated. Similarly, if it is desired to store unencrypted data in the mass storage medium in a compressed and encrypted format, the compression engine 216 and the encryption engine 212 can be activated while the decryption engine 210, the decompression engine 214, and the search engine 218 are each deactivated. As would be understood by those of ordinary skill in the art upon reading the teachings herein, other activation/deactivation combinations can be used depending on the desired functionality for the pipeline 200.

Advanced encryption/decryption algorithms require a complex set of calculations. Depending on the particular algorithm employed, performing encryption/decryption at disk speed requires that one employ advanced techniques to keep up with the streaming data arriving at the encryption/decryption engine. The PLD-based architecture of the present invention supports the implementation of not only relatively simple encryption/decryption algorithms, but also complex ones. Virtually any known encryption/decryption technique can be used in the practice of the present invention, including but not limited to DES, Triple DES, AES, etc. See Chodowiec et al., "Fast Implementations of Secret-Key Block Ciphers Using Mixed Inter- and Outer-Round Pipelining", Proceedings of International Symposium on FPGAs, pp. 94-102 (February 2001); FIPS 46-2, "Data Encryption Standard", revised version issued as FIPS 46-3, National Institute of Standards and Technology (1999); ANSI x9.52-1998, "Triple Data Encryption Algorithm Modes of Operation", American National Standards Institute (1998); FIPS 197, "Advanced Encryption Standard", National Institute of Standards and Technology (2001), the entire disclosures of all of which are incorporated herein by reference.

Figure 33:
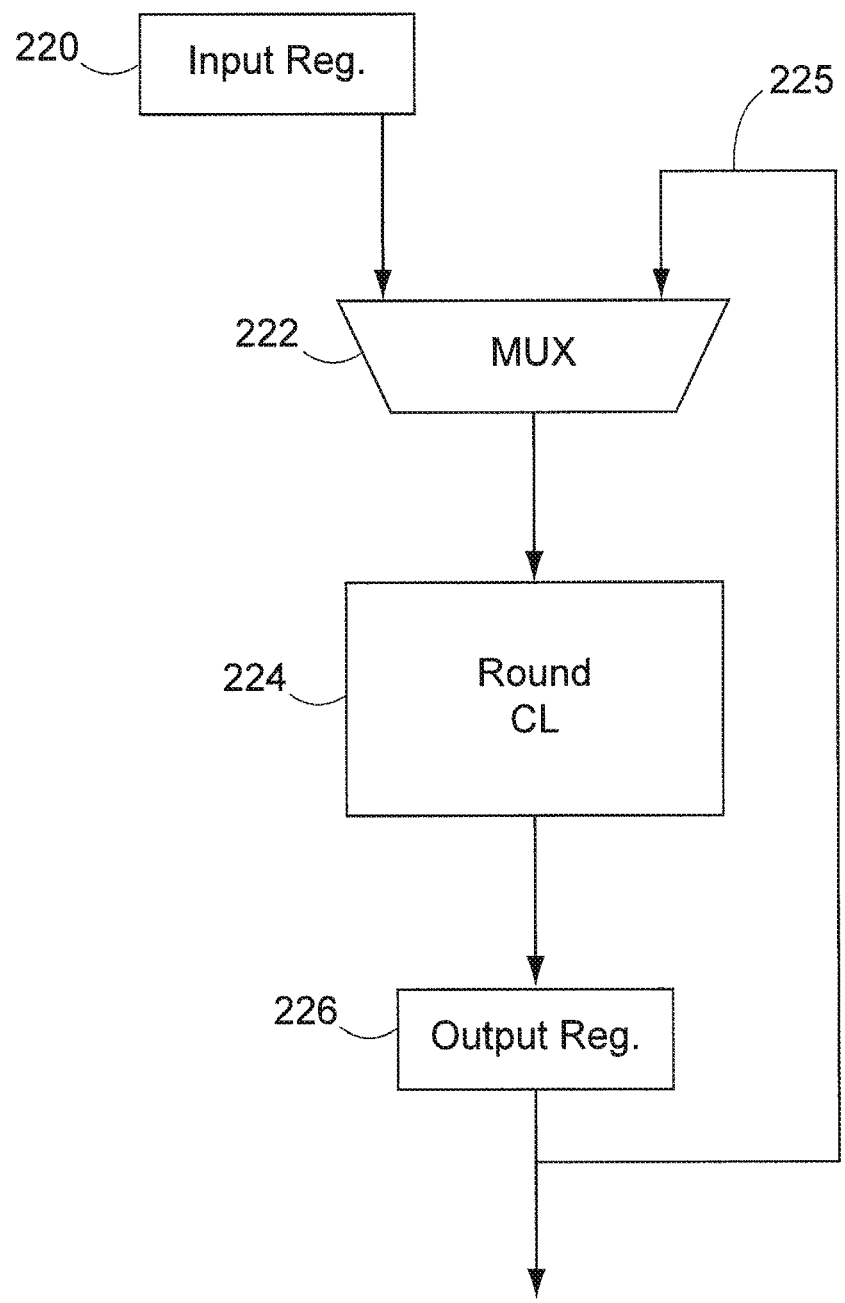
FIGS. 33-35 illustrate various encryption engines that can be implemented on re-configurable logic.

FIG. 33 illustrates an example of single stage encryption that can be implemented with the present invention. The data flow direction is top to bottom. A block of text (typically 64 or 128 bits) is loaded into input register 220 (by either control processor 204 or CPU 32). Combinational logic (CL) 224 computes the cipher round, with the results of the round being stored in output register 226. During intermediate rounds, the contents of output register 226 are fed back through feedback path 225 into the CL 224 through MUX 222 to compute subsequent rounds. Upon completion of the final round, the data in the output register is the encrypted block and is ready to be stored in the mass storage medium. This configuration can also be used as a single stage decryption engine as well, wherein the CL that computes the cipher is decryption logic rather than encryption logic.

Figure 34:
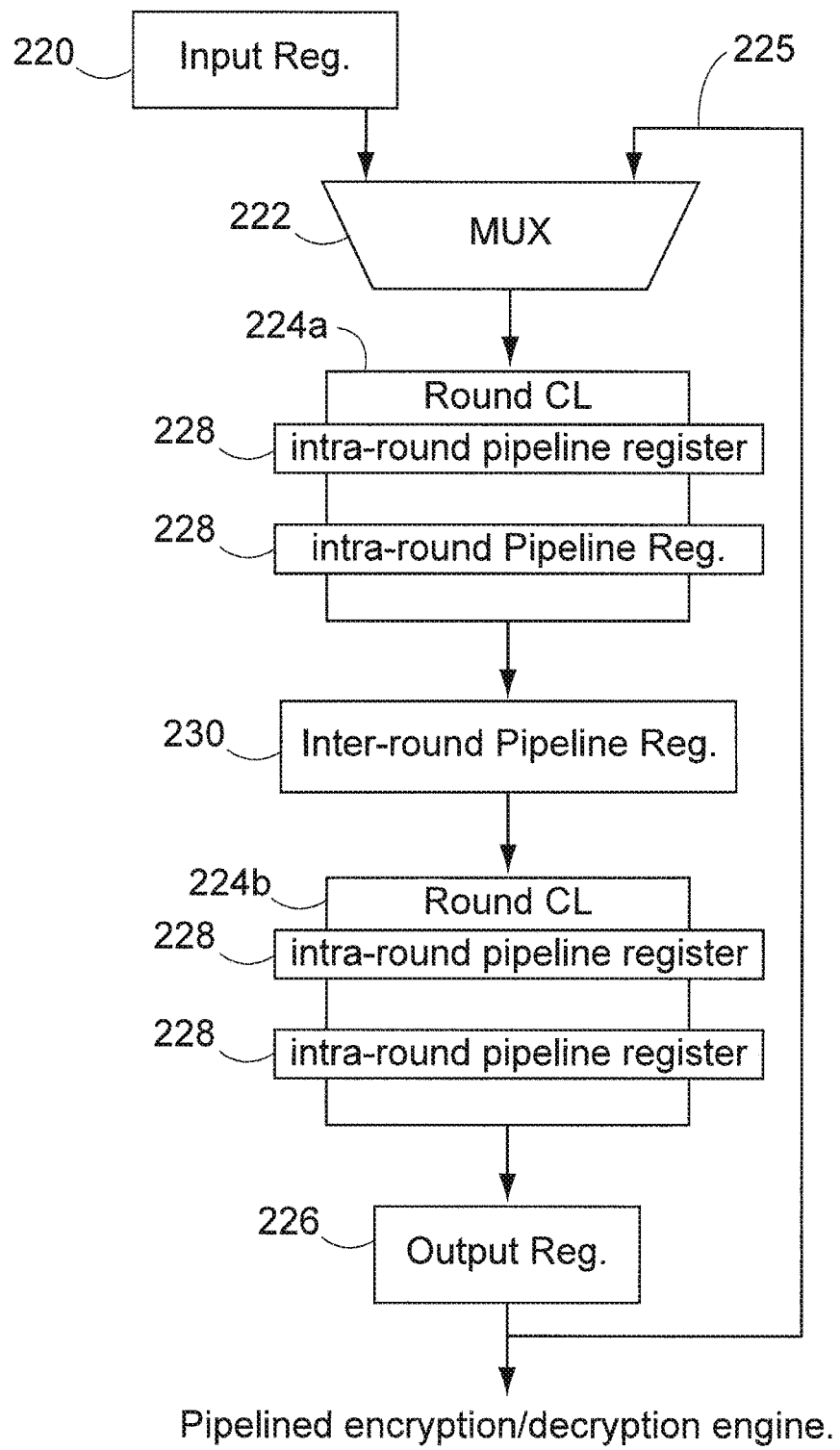

The throughput of the encryption engine shown in FIG. 33 can be improved through the use of pipelining techniques. FIG. 34 depicts an example of a pipelined encryption engine wherein there is pipelining within the combinational logic of the round itself. Each CL 224 includes multiple intra-round pipeline registers 228. The number of intra-round pipeline registers 228 used can be variable and need not be limited to two per CL. Further, the loops represented by the feedback path 225 can be unrolled with multiple copies of the round CL 224*a*, 224*b*, . . . , each with an inter-round pipeline register 230 therebetween. As with the number of intra-round registers 228 for each CL 224, the degree of unrolling (i.e., number of round CLs 224) is also flexible. Relative to the encryption engine of FIG. 33, it should be noted that the engine of FIG. 34 will consume more resources on the PLD 20, but will provide a higher data throughput.

Figure 35:
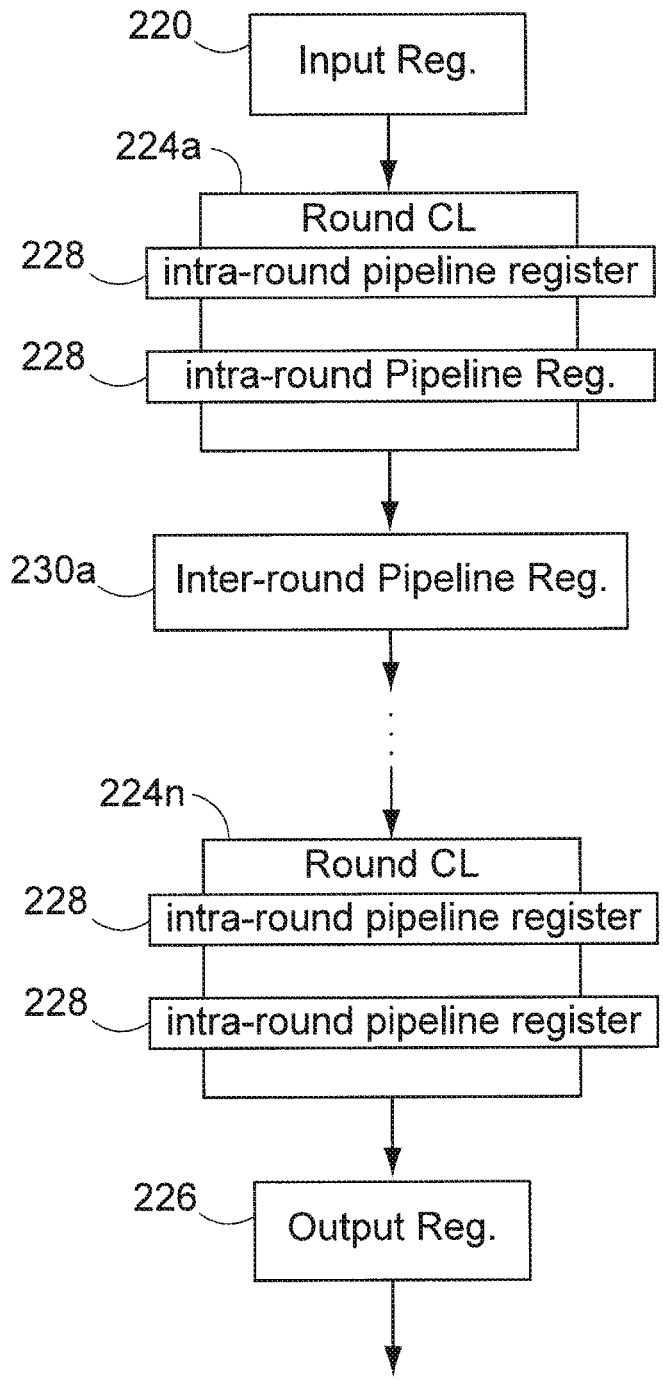

FIG. 35 illustrates an example of an encryption engine wherein the rounds are completely unrolled. The feedback paths 225 of FIGS. 33 and 34 are no longer necessary, and data can continuously flow from the input register 220 through the pipeline of CLs 224 (each including multiple intra-round pipeline registers 228 and separated by inter-round pipeline registers 230) to the output register 226. Relative to the encryption engines of FIGS. 33 and 34, this configuration provides the highest data throughput, but also requires the greatest amount of resources in the re-configurable logic.

Figure 36:
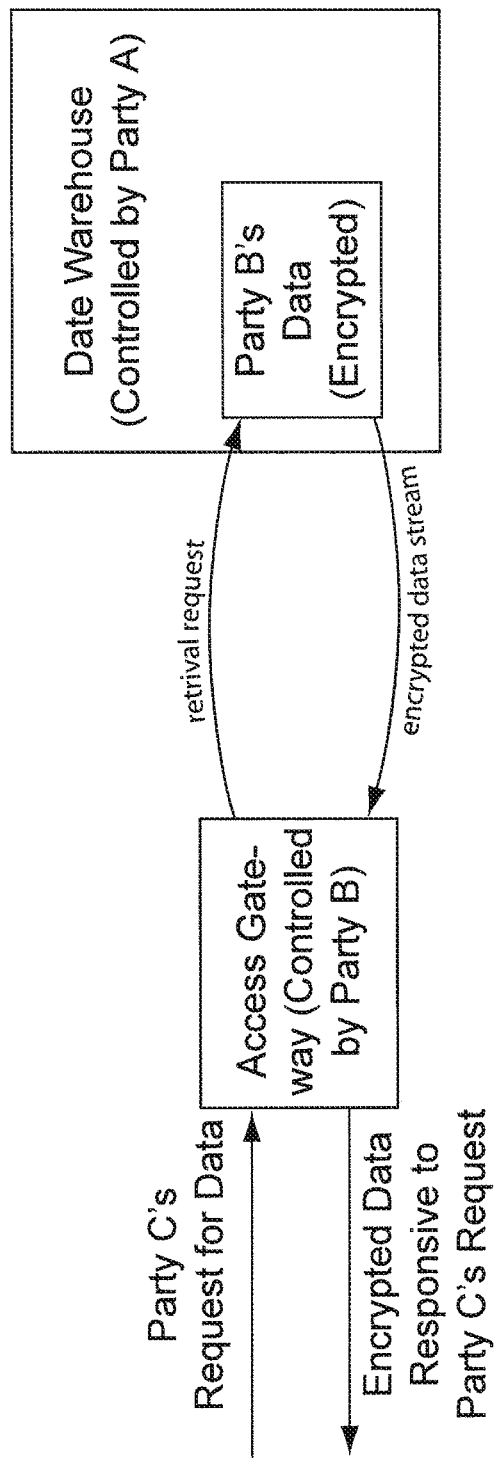
FIG. 36 illustrates a three party data warehousing scenario.

In many situations, data is retained in a data warehouse, as shown in FIG. 36. The person or entity who owns the data warehouse (the actual hardware and related database technology on which data resides) is often not the same person or entity who owns the actual data stored therein. For example, if Party A (a data warehouser) owns a data warehouse and offers data warehousing service to Party B (a data owner who is to use Party A's data warehouse to physically store data), then the data owner has a legitimate concern about the third parties who may have access to the data stored in the data warehouser's warehouse. That is, the data warehouser controls physical access to the data, but it is the data owner who wants to control who may physically access the data through an access gateway, as shown in FIG. 36. In such cases, it is conventional for the data owner's data to be stored in the data warehouse in an encrypted format, and the data owner retains control over the distribution of any decryption algorithm(s) and/or key(s) for the stored data. That way, the risk of unauthorized third parties gaining access to the unencrypted format of the data owner's data is reduced. In such an arrangement, the data warehouser is not provided with access to an unencrypted version of the data owner's stored data.

If the data owner wishes to communicate all or a portion of its stored encrypted data from the data warehouse to Party C via a network such as the Internet, that data can be protected during delivery over the network via another form of encryption (e.g., different algorithm(s) and/or different decryption key(s)). The data owner can then provide Party C with the appropriate algorithm(s) and/or key(s) to decrypt the data. In this manner, the data owner and the authorized third party are the only two parties who have access to the decrypted (plain text) data. However, the authorized third party will not be able to decrypt the data owner's data that is still stored in the data warehouse because that data will possess a different mode of encryption than the data received.

Figure 37:
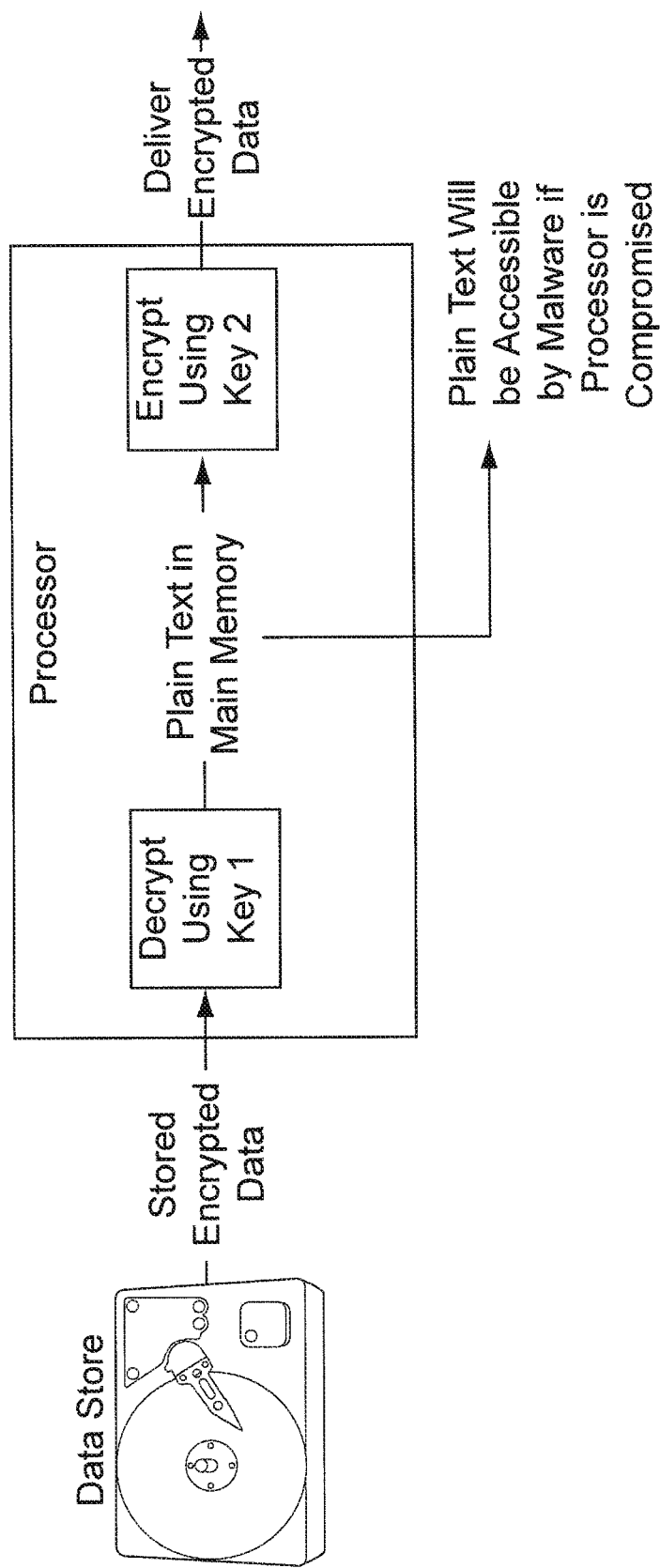
FIG. 37 illustrates a non-secure data warehousing decryption scenario.

Conventionally, the computations required to perform encryption/decryption in data warehousing scenarios are performed in software on computers owned and under the direct control of the data warehouser. In such a situation, as shown in FIG. 37, the plain text that is the output of the decryption operation is stored in the main memory of the processor used to perform the encryption/decryption operations. If this software (or other software running on the processor) has been compromised by a virus or other malware, the data owner may lose control over the plain text data to an unknown party. Thus, with conventional approaches, one or both of the data warehouser and an unknown malware-related party has access to the processor main memory, and therefore access to the plain text form of the data owner's data.

Figure 38:
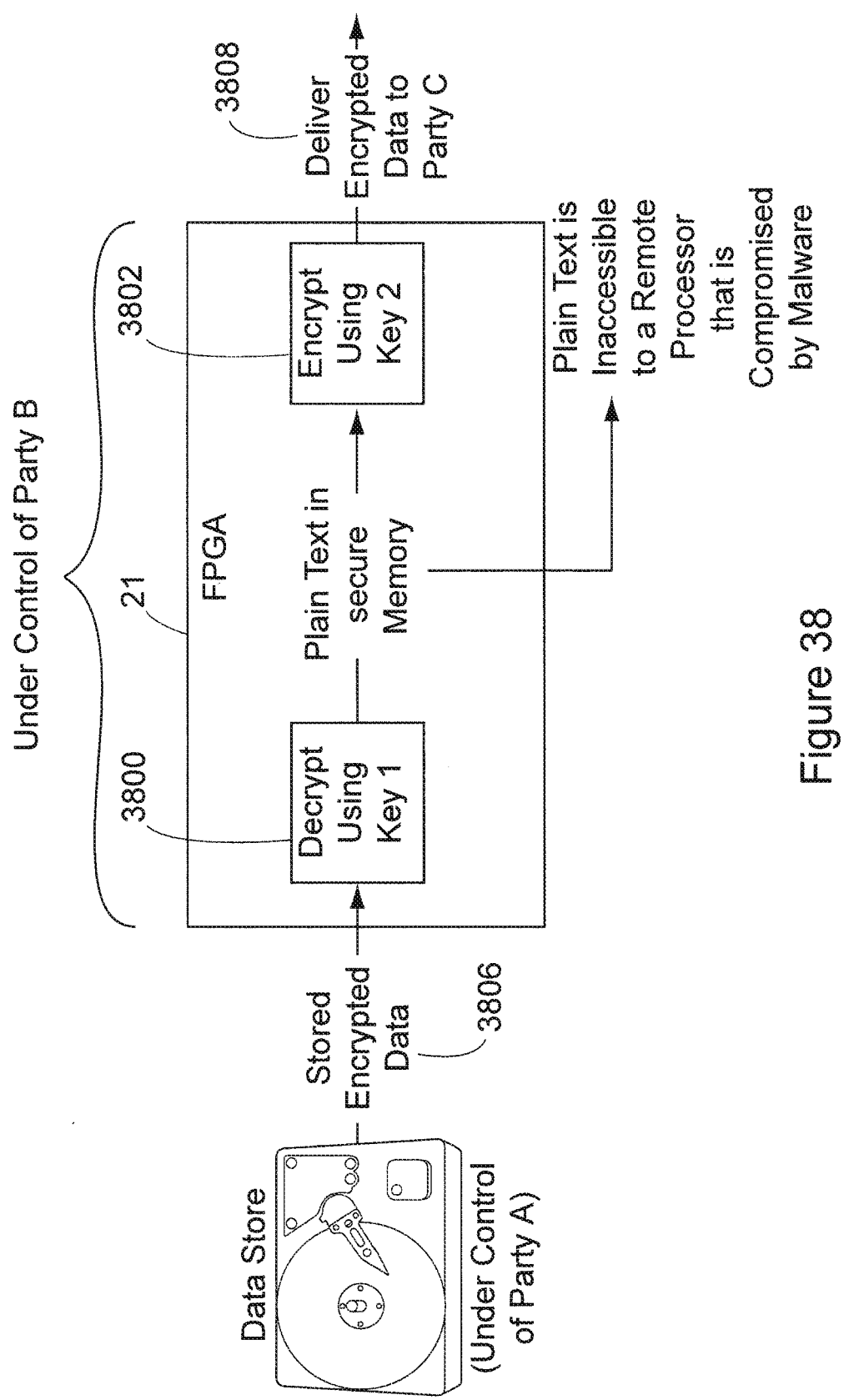
FIGS. 38-39(b) illustrate various exemplary embodiments for secure data delivery in a data warehousing scenario.

To improve upon this security shortcoming, the present invention can be used to implement encryption and decryption on re-configurable logic device 21 (preferably within a PLD 20) over which only the data owner has control, as shown in FIG. 38. In FIG. 38, a decryption engine 3800 using Key 1 and an encryption engine 3802 using Key 2 are implemented on a PLD 20. The re-configurable logic device 21 remains under control of the data owner and preferably (although it need not be the case) communicates with the data store of the data warehouser over a network such as the Internet to receive a stream 3806 of the data owner's encrypted data (wherein the stored data was previously encrypted using Key 1). The decryption engine 3800 thus operates to decrypt the data stream 3806 using Key 1. The output 3804 of the decryption engine 3800 is the data owner's data in decrypted (or plain text) format. This data remains in the secure memory of the PLD 20 or the secure on-board memory. Because this secure memory is invisible and inaccessible to software which may have malware thereon, the risk of losing control over the plain text data to "hackers" is virtually eliminated. Thereafter, the plain text data 3804 is provided to encryption engine 3802, which encrypts data 3806 using Key 2. The output of the encryption engine 3802 is newly encrypted data 3808 that can be delivered to an authorized third party data requester. Secure delivery of data 3808 over a network such as the Internet can be thus maintained. For the authorized third party data requester to interpret data 3808, the data owner can provide that third party with Key 2.

FIGS. 39(*a*) and (*b*) illustrate embodiments for this feature of the present invention. FIG. 39(*a*) illustrates a circuit board 3900 that could be installed in a computer server. PCI-X connector 3916 serves to interface the board 3900 with the server's system bus 34 (not shown). A PLD 20 such as an FPGA is implemented on board 3900. Within the FPGA, three functions are preferably implemented: a firmware socket 3908 that provides connection with the external environment, a decryption engine 3904, and an encryption engine 3902. The FPGA preferably also communicates with on-board memory 3906, which is connected only to the FPGA. A preferred memory device for on-board memory 3906 is an SRAM or a DRAM. The address space and existence of memory 3906 is visible only to the FPGA. The FPGA is also preferably connected to a disk controller 3912 (employing SCSI, Fiber Channel, or the like) via a private PCI-X bus 3910. Disk connector 3914 preferably interfaces the disk controller 3912 with mass storage medium 26 (not shown) which can serve as the data warehouse. Disk controller 3912 and disk connector 3914 are off-the-shelf components, well known in the art. Examples of manufacturers include Adaptec and LSI.

To support normal read/write access to the mass storage medium 26, the FPGA is preferably configured as a PCI-X to PCI-X bridge that links the PCI-X connector 3916 with the internal PCI-X bus 3910. These bridging operations are performed within firmware socket 3908, the functionality of which is known in the art. Communication pathways other than PCI-X may be used, including but not limited to PCI-Express, PCI, Infiniband, and IP.

To support the encryption/decryption functionality, data streaming into the board 3900 from the mass storage medium 26 is fed into the decryption engine 3904. The plain text output of the decryption engine 3904 can be stored in on-board memory 3906 (FIG. 39(a), stored in memory internal to the FPGA (FIG. 39(b), or some combination of the two. Thereafter, the encryption engine 3902 encrypts the plain text data that is stored in memory 3906, internal FPGA memory, or some combination of the two, using a different key than that used to decrypt the stored data. The choice of whether to use on-board memory 3906 or internal FPGA memory will depend upon a variety of considerations, including but not limited to the available FPGA resources, the volume of data to be decrypted/encrypted, the type of decryption/encryption employed, and the desired throughput performance characteristics.

During the time that the plain text is resident in the on-board memory 3906 or in the internal FPGA memory, this plain text data is not accessible to a processor accessing motherboard bus 34 because there is no direct connection between memory 3906 or internal FPGA memory and the PCI-X connector 3916. Accordingly, memory 3906 and the internal FPGA memory are not in the address space of such a processor, meaning, by derivation, that memory 3906 and the internal FPGA memory are not accessible by any malware that may be present on that processor.

Figure 39A:
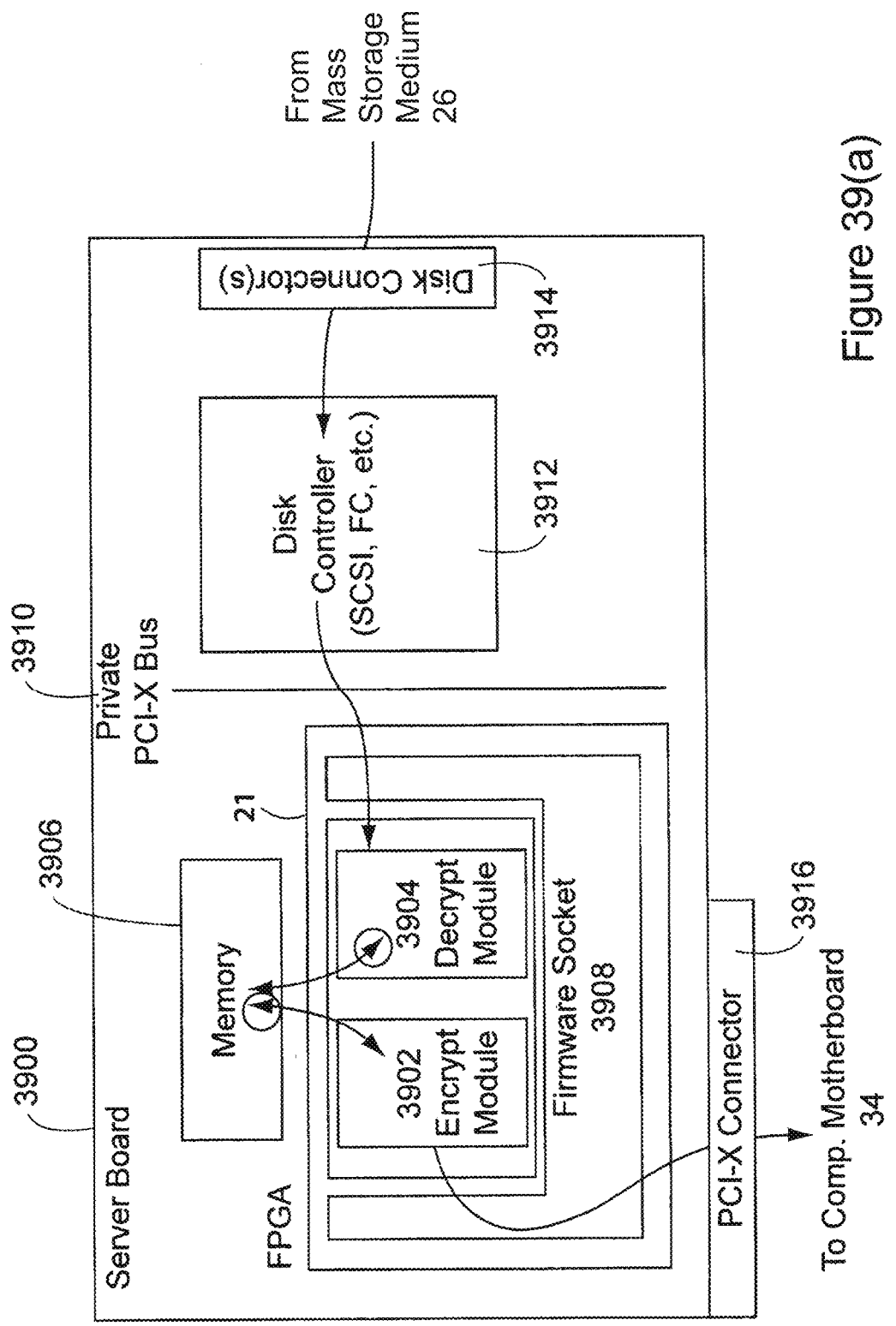
Figure 39B:
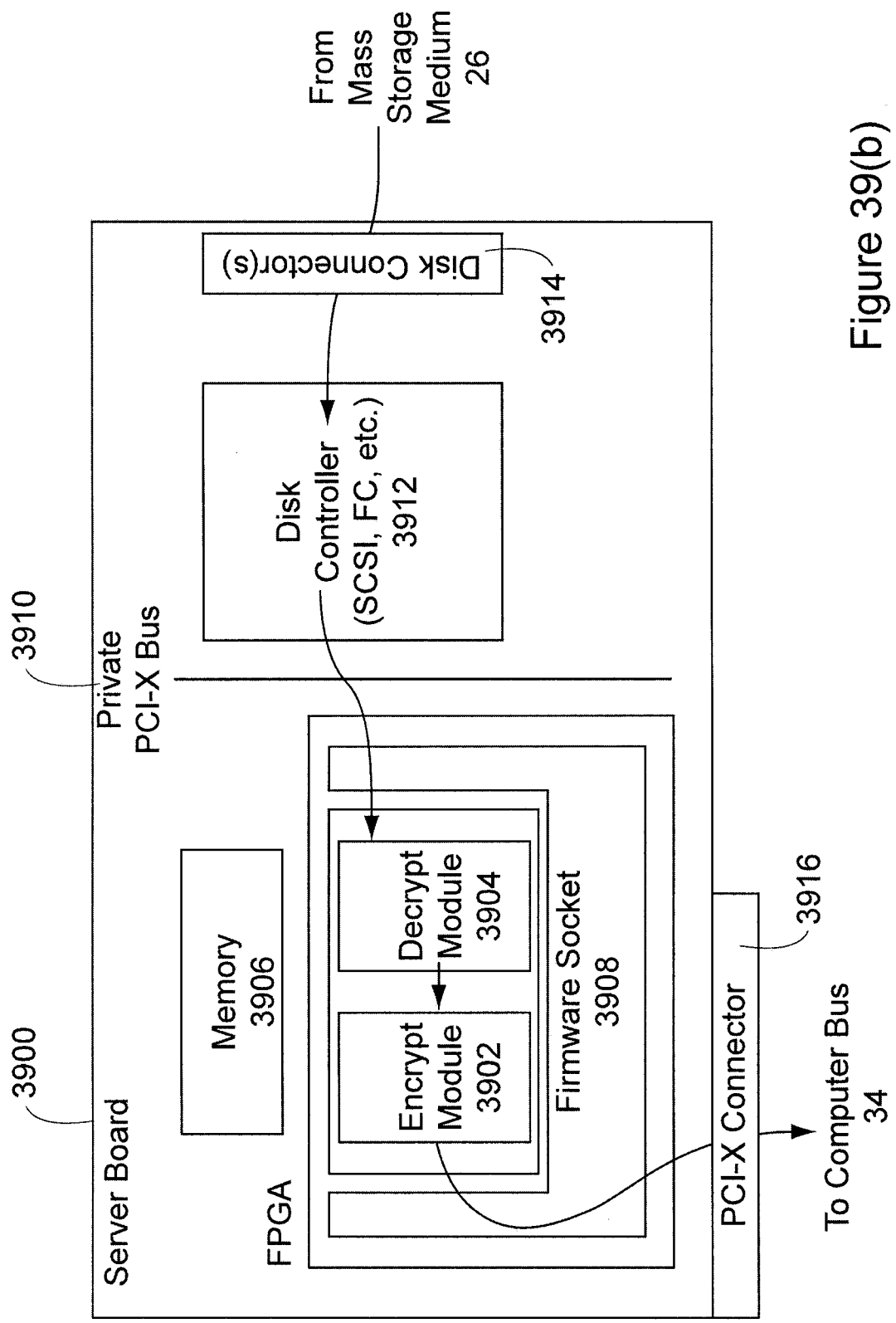

Moreover, it should be noted that the embodiments of FIGS. 39(a) and (b) may also optionally include a search engine (not shown) within the FPGA located between the decryption engine 3904 and encryption engine 3902, thereby allowing the data owner to deliver targeted subsets of the stored data to the authorized third party data requester that fit within the boundaries of the third party's data request.

As discussed above, compression and decompression are also valuable operations that can be performed in a PLD in accordance with the techniques of the present invention. It is common to compress data prior to storage in a mass storage medium 26 (thereby conserving storage space), and then decompress that data when reading it from the mass storage medium for use by a processor. These conventional compression and decompression operations are typically performed in software. A compression technique that is prevalently used is the well-known Lempel-Ziv (LZ) compression. See Ziv et al., "A Universal Algorithm for Sequential Data Compression", IEEE Trans. Inform. Theory, IT-23 (3): 337-343 (1977); Ziv et al., "Compression of Individual Sequence via Variable Rate Coding", IEEE Trans. Inform. Theory, IT-24: 530-536 (1978), the entire disclosures of both of which are incorporated by reference herein. Furthermore, the PLD-based architecture of the present invention supports the deployment of not only LZ compression but also other compression techniques. See Jung et al., "Efficient VLSI for Lempel-Ziv Compression in Wireless Data Communication Networks", IEEE Trans. on VLSI Systems, 6(3): 475-483 (September 1998); Ranganathan et al., "High-speed VLSI design for Lempel-Ziv-based data compression", IEEE Trans. Circuits Syst., 40: 96-106 (February 1993); Pirsch et al, "VLSI Architectures for Video Compression—A Survey", Proceedings of the IEEE, 83(2): 220-246 (February 1995), the entire disclosures of all of which are incorporated herein by reference. Examples of compression techniques other than LZ compression that can be deployed with the present invention include, but are not limited to, various lossless compression types such as Huffman encoding, dictionary techniques, and arithmetic compression, and various known lossy compression techniques.

Figure 40:
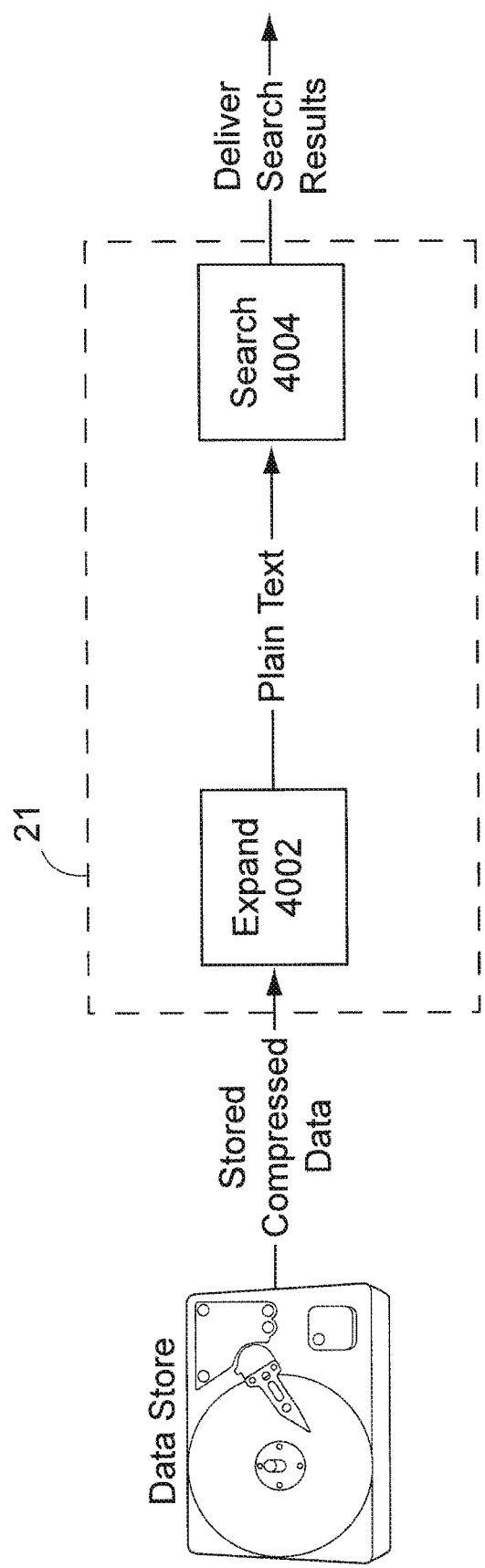
FIGS. 40-42 illustrate various exemplary embodiments for implementing compression and/or decompression on a re-configurable logic device.
Figure 41:
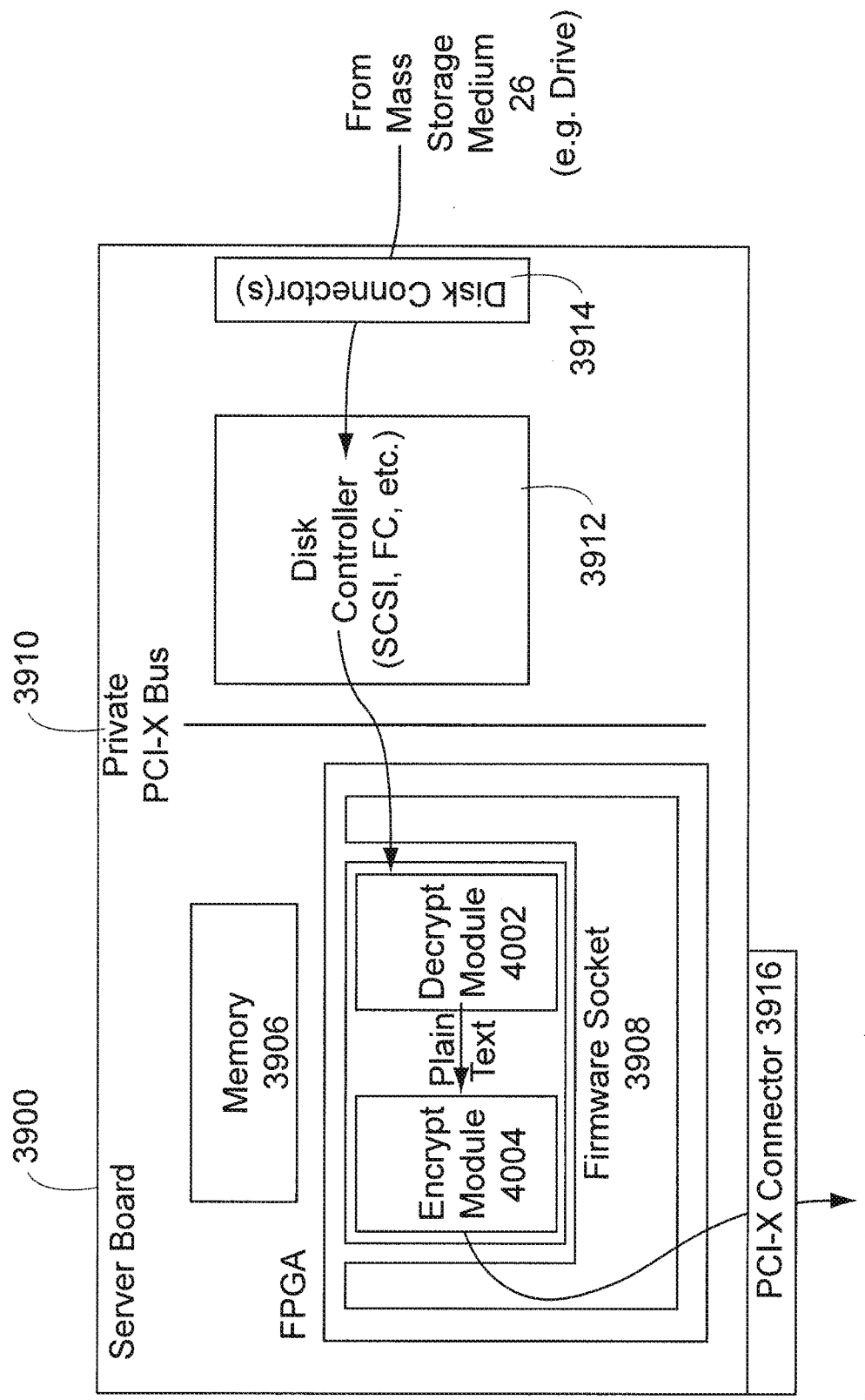
Figure 42:
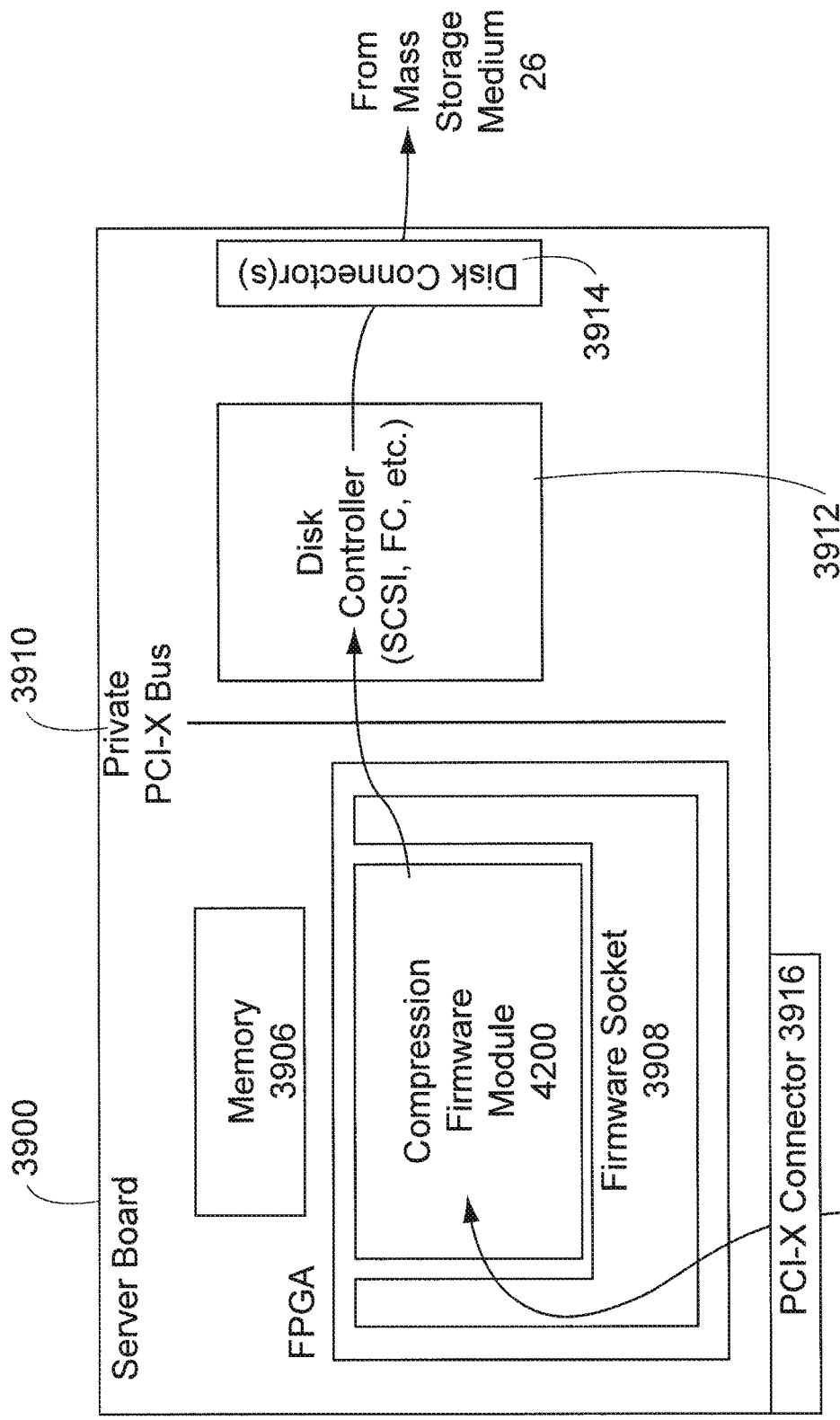

To improve the speed at which compressed data can be searched, it will be valuable to also import the decompression operation onto the PLD 20 that performs the searching, thereby providing the decompression with the same speed advantages as the PLD-based search operation. FIG. 40 illustrates this aspect of the present invention wherein a stream 4000 of compressed data is passed from the mass storage medium 26 to a re-configurable logic device 21 on which a decompression (expansion) engine 4002 and a search engine 4004 are implemented within a PLD 20. FIG. 41 illustrates a preferred embodiment for this aspect of the invention. In FIG. 41, the FPGA 20 of board 3900 depicted in FIGS. 39(a) and (b) implements the decompression engine 4002 and the search engine 4004. As described in connection with FIGS. 39(a) and (b), the integrity of the plain text form of the stored data (the decompressed data exiting the decompression engine 4002) is preserved because it is stored only in on-board memory 3906, internal FPGA memory, or some combination of the two. FIG. 42 illustrates a preferred implementation for a compression operation, wherein the FPGA 20 of board 3900 has a compression engine 4200 implemented thereon, thereby allowing data coming from system bus 34 to be stored in a compressed manner on mass storage medium 26. As should be understood, the FPGA 20 of board 3900 can also be loaded with the decompression engine 4002, search engine 4004, and compression engine 4200. In such a deployment, depending on the functionality desired of board 3900, either the compression engine 4200 can be deactivated (thereby resulting in a combined decompression/search functionality) or the decompression engine 4002 and search engine 4004 can both be deactivated (thereby resulting in a compression functionality).

Figure 43:
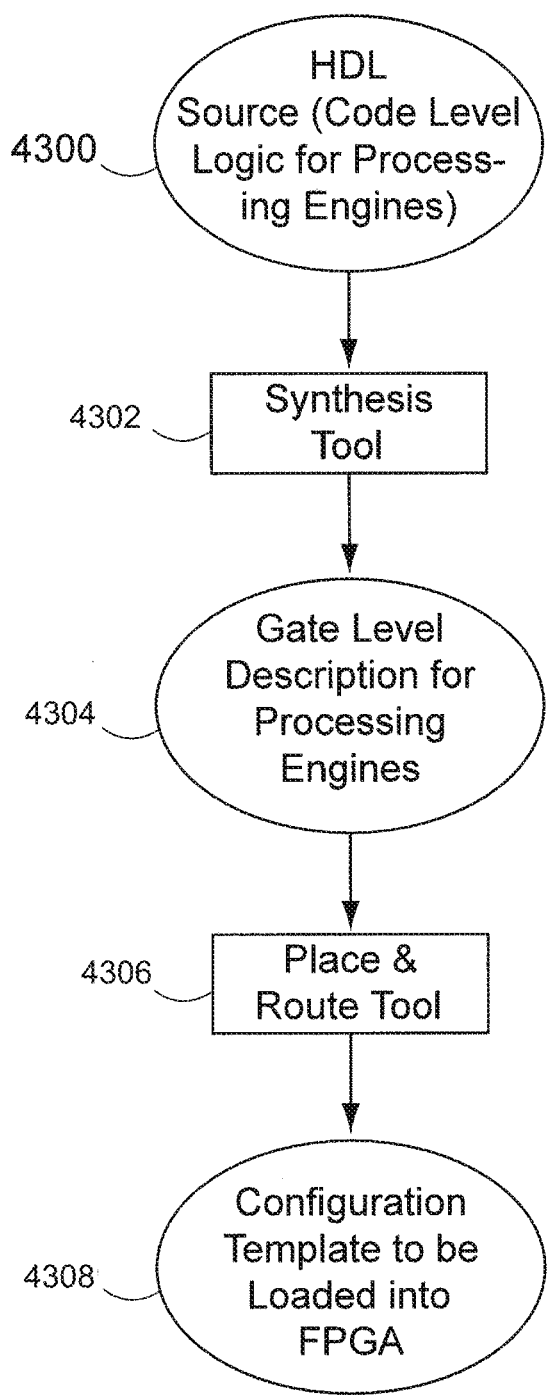
FIG. 43 depicts a process flow for creating a template to be loaded onto a re-configurable logic device.

To configure FPGA 20 with the functionality of the present invention, the flowchart of FIG. 43 is preferably followed. First, code level logic 4300 for the desired processing engines that defines both the operation of the engines and their interaction with each other is created. This code, preferably HDL source code, can be created using standard programming languages and techniques. As examples of an HDL, VHDL or Verilog can be used. Thereafter, at step 4302, a synthesis tool is used to convert the HDL source code 4300 into a gate level description 4304 for the processing engines. A preferred synthesis tool is the well-known Synplicity Pro software provided by Synplicity, and a preferred gate level description 4304 is an EDIF netlist. However, it should be noted that other synthesis tools and gate level descriptions can be used. Next, at step 4306, a place and route tool is used to convert the EDIF netlist 4304 into the template 4308 that is to be loaded into the FPGA 20. A preferred place and route tool is the Xilinx ISE toolset that includes functionality for mapping, timing analysis, and output generation, as is known in the art. However, other place and route tools can be used in the practice of the present invention. The template 4308 is a bit configuration file that can be loaded into the FPGA 20 through the FPGA's Joint Test Access Group (JTAG) multipin interface, as is known in the art.

As mentioned above, templates 4308 for different processing functionalities desired for the system can be pre-generated and stored for selective implementation on the FPGA. For example, templates for different types of compression/decompression, different types of encryption/decryption, different types of search operations, different types of data reduction operations, or different combinations of the foregoing can be pre-generated and stored by a computer system for subsequent loading into the FPGA 20 when that functionality is needed.

Further still, performance characteristics such as throughout and consumed chip resources can be pre-determined and associated with each processing operation. Using these associated parameters, an algorithm can be used to intelligently select which template is optimal for a particular desired functionality.

For example, such an algorithm could provide guidance as to which of the encryption engines of FIGS. 33-35 is best suited for a given application. The table below presents parameters that can be used to model performance in accordance with the encryption/decryption operations of the invention.

TABLE 1

Variable definitions.

| Variable | Definition |
|---|---|
| B | size of a block (number of bits encrypted/decrypted at a time) |
| R | number of rounds in overall operation (encryption/decryption) |
| L | loop unrolling level, number of rounds concurrently executing in loop-level pipelining (loop-level pipelining depth) |
| p | pipelining depth within each round |
| $f_{CLK}(p,L)$ | achievable clock rate for given pipelining configuration |
| $T_{CLK}(p,L)$ | period of clock = $1/f_{CLK}(p,L)$ |
| I | number of iterations required for each block = [R/L] |
| $A_R(p)$ | chip resources required for a round with internal pipelining depth p (including inter-round pipelining register) |
| $A_0$ | chip resources required for fixed components (e.g., input register, mux., etc.) |

The values for each of these parameters are readily known or can be readily measured, as known in the art. If R=IL for an integer I, the iterations for the encryption/decryption have been evenly unrolled. If this is not the case, later pipeline stages must have a pass-through capability, as the final result would be computed inside the pipeline rather than at the end.

The throughput of a pipelined cipher engine is given by the following expression:

$$\text{Throughput} = \frac{B f_{CLK}(p, L)}{I}$$

The chip resources for an FPGA are typically measured in CLBs or slices, as is well-known. With re-configurable logic other than FPGAs, the resources might be measured in other units (e.g., chip area). In either event, the resources required will be linear in the number of rounds supported in parallel. Hence, the chip resources required for the engine is as follows:

$$\text{Resources} = A_0 + L A_R(p)$$

The values for the parameters Throughput and Resources can be determined in advance for each stored processing operation (or function $f_i$) that may be implemented in a stage of a pipeline. Accordingly, a table can be created that relates each processing operation or function with its corresponding values for Throughput and Resources.

Accordingly, the specific template (which defines one or more different processing operations) to be deployed on a PLD can be tailored to the particular query or command issued. An algorithm that balances Throughput and Resources in a manner desired by a practitioner of the present invention can be created to decide which candidate template is best-suited for an application. Thus, a control processor 32 can compute the overall throughput and resources for a set of functions as follows. The throughput for a set of functions is the minimum throughput for each of the functions:

$$\text{Throughput} = \text{Min}(\text{Throughput}_{F1}, \text{Throughput}_{F2}, \ldots, \text{Throughput}_{Fn})$$

The resources required to deploy a set of functions is the sum of the resources required for each of the functions:

$$\text{Resources} = \text{Resources}_{F1} + \text{Resources}_{F2} + \ldots + \text{Resources}_{Fn}$$

Given several options for each function, the control processor can then solve an optimization problem (or if desired a "near optimization" problem). The optimization can be to deploy the set of options for each function that maximizes the overall throughput under the constraint that the required resources be less than or equal to the available resources on the re-configurable logic, or the optimization can be to deploy the set of options for each function that minimizes the required resources under the constraint the that overall throughput not fall below some specified minimum threshold. Techniques for solving such optimization problems or near optimization problems are well known in the art. Examples of such techniques include, but are not limited to complete enumeration, bounded search, genetic algorithms, greedy algorithms, simulated annealing, etc.

The use of the inventive system to process data streaming from a mass storage medium such as a disk drive system is a powerful technique for processing stored data at high speeds. Very large databases, however, typically span many disk cylinders. Accordingly, delays may be encountered when database files are written on tracks that have been placed on non-contiguous disk cylinders. These delays are associated with having to move the disk read/write head from its current position over a data cylinder to a new data cylinder where the file to be read from the disk continues. These delays increase as the distance that the head must travel increases. Therefore, for reading data that spans multiple data cylinders on the disk, the flow of the data stream from the disk will be interrupted as the head moves from cylinder to cylinder. With today's disk drives, these delays may be in the millisecond range. Thus, these head movement delays (known in the art as "seek" times) represent a potential performance bottleneck.

With standard contemporary disk systems, tracks 4400 are laid out on the disk or sets of disk platters as cylinders 4402 that are concentric around central origin 4406, as shown in FIGS. 44(*a*) and (*b*). FIG. 44(*a*) illustrates a rotatable planar magnetic medium 4450 that serves as a storage device such as a computer hard disk, wherein data is placed on the magnetic medium 4450 in discrete, circular tracks 4400. In magnetic recordings, each track 4400$_i$, wherein i may be a, b, c, . . . , is positioned at its own radius $R_i$ relative to the central origin 4406. Each track is radially separated from the next inner track and the next outer track by a track-to-track spacing T. The value of T is preferably uniform for each track-to-track radial distance. However, this need not be the case. For a head 4404 to read or write data from track $4400_i$, the head 4404 must be positioned such that it resides over a point on the disk that is $R_i$ from the origin 4406. As the disk rotates, the track will pass under the head to allow for a read or write operation.

Figure 44A:
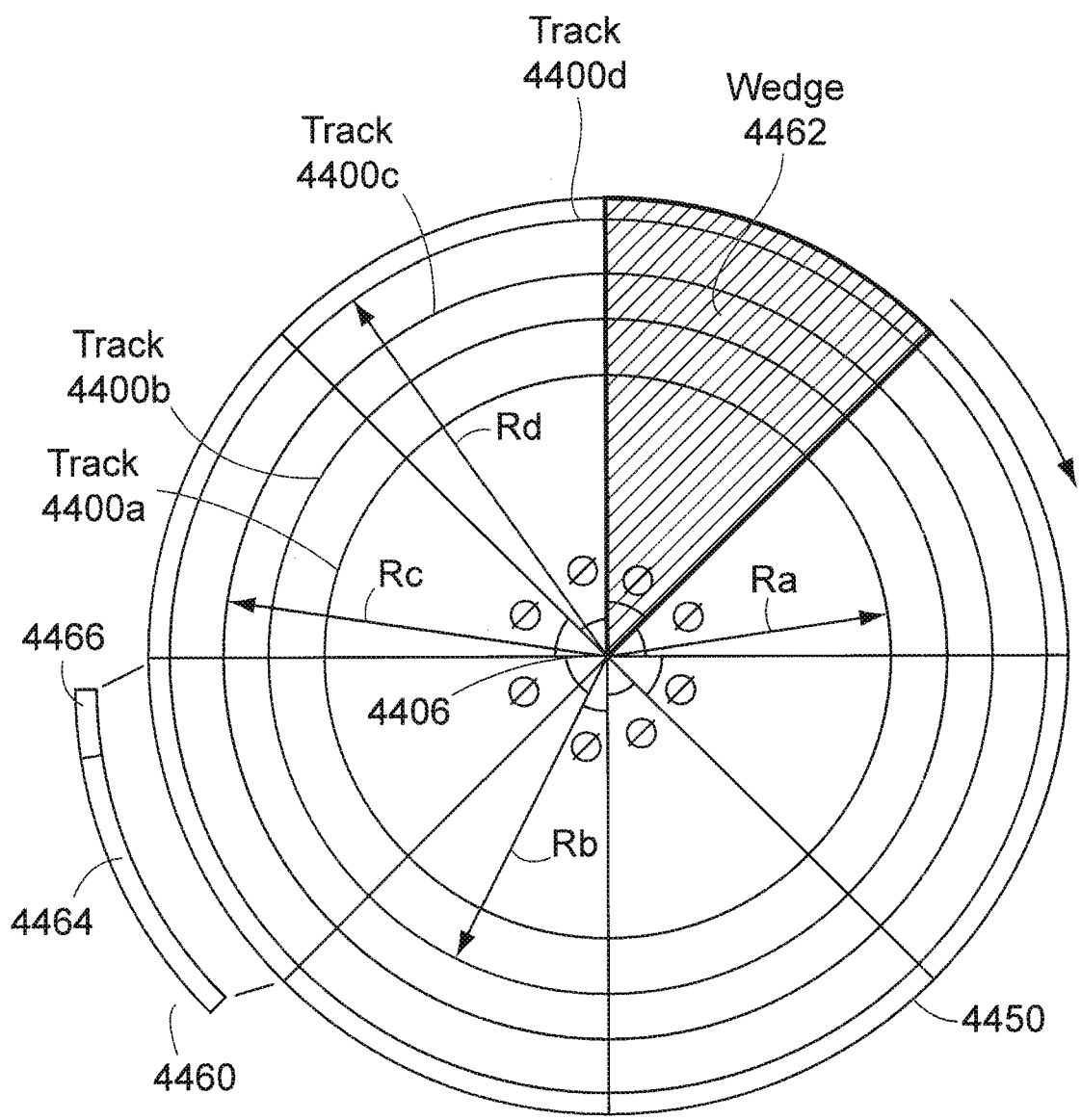
FIGS. 44(a) and (b) illustrate a conventional hard disk using circular tracks and a disk drive system for use therewith.

Disk drives typically utilize a direct overwrite approach, so accurate radial placement of the head 4404 over the medium 4450 is critical for sustained error free use. In general, each circular track $4400_i$ is divided into about 150 roughly equal contiguous arcs. FIG. 44(a) depicts an example wherein each track $4400_i$ is divided into 8 uniform contiguous arcs 4460, each arc 4460 spanning an angle of $\theta=2\pi/8$. The arcs of different tracks 4400 that span the same angle $\theta$ comprise a disk sector (or wedge) 4462, as known in the art.

These arcs 4460 contain several data sets 4464 (logical blocks and physical sectors) that can be altered (rewritten). Additionally, these arcs 4460 contain unalterable (fixed) magnetically written markings 4466 (such as ABCD servo bursts) that are used as a guide to place the head 4404 over the data regions so that the signal strength from the magnetic recording is maximized.

Figure 44B:
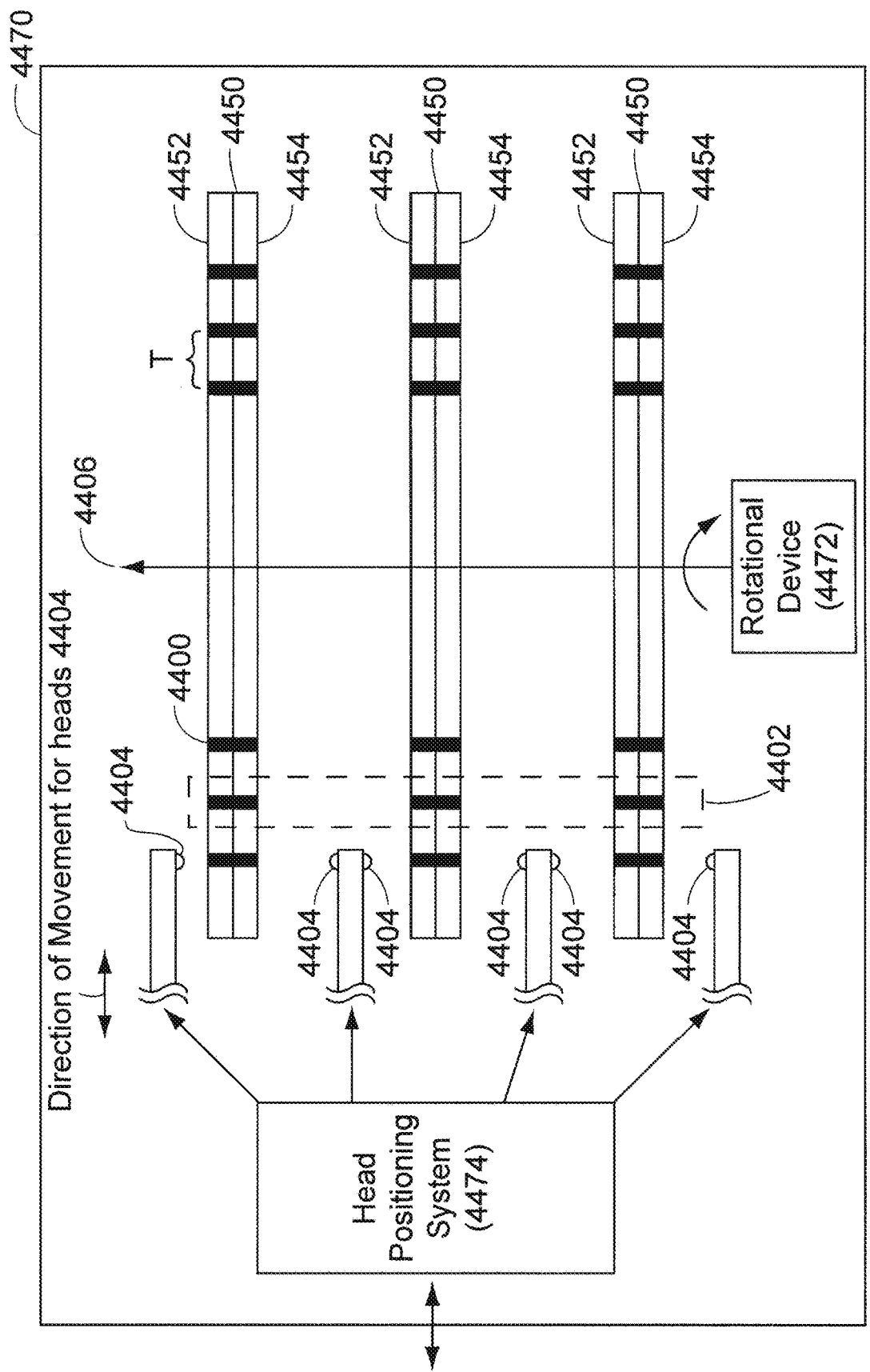

FIG. 44(b) is a block diagram view of a disk drive system 4470 with a cross-sectional view of several disks 4450 residing in the drive system. As shown in FIG. 44(b), many drives systems 4470 utilize both sides of a disk 4450, and may include several disks 4450 (or platters) that are concentrically placed on a rotational device 4472 such as a spindle motor. In such an arrangement, each disk surface (top surface 4452 and bottom surface 4454) is accessed by a different head 4404. The collection of circular tracks 4400 accessed by the separate heads 4404 at a single radius $R_i$ is referred to as a "data cylinder" 4402. A band of adjacent data cylinders is called a zone.

Having separate cylinders 4402 requires the movement of the disk head 4404 when going between cylinders 4402. To move between cylinders 4402, the positioning system 4474 must appropriately move heads 4404 along line 4476, typically in increments of T. As one moves from inner cylinders to outer cylinders, the circumference of the written track increases. For example, with reference to FIG. 44(a), the circumference of innermost track $4400_a$ is $2\pi R_a$, and the circumference of outermost track $4400_d$ is $2\pi R_d$. Given that $R_d$ is greater than $R_a$, it likewise follows that the circumference of track $4400_d$ is greater than that of track $4400_a$. Given these circumferential differences, different zones may be defined to allow for different linear bit densities along the track, thereby yielding more data sectors around the cylinder 4402 for larger radii than those yielded by using roughly constant linear data densities.

To write data spanning one or more tracks 4400, the head 4404 must be repositioned by the positioning system 4474 to another radius by at least the center-to-center distance of adjacent tracks 4400. This motion requires mechanical settling time (repositioning of the head 4404) and resynchronization time of the head 4404 to the cylinder 4402 (in time, downtrack). When moving the head a relatively long distance such as T, this settling time is significant. Together, these times may take, on average, half the revolution of the cylinder 4402, which is typically several milliseconds when moving from cylinder to cylinder. As mentioned above, this time duration is often referred to as the "seek" time, and it can be a major performance bottleneck. Due to this bottleneck, data write/read bursts are generally limited to single tracks or cylinders.

According to a novel and unique feature of the preferred embodiment, a technique is used to reposition the head 4404 to accommodate tracks laid out as discontiguous arcs. In a preferred embodiment, these discontiguous arcs are discontiguous circular arcs arranged in a generally helical tracking pattern on the disk 4450, and the head positioning system uses servo patterns, such as ABCD servo bursts, already present in conventional systems to appropriately position the head. This technique can provide for written bursts in excess of a track and up to an entire zone, wherein a single zone may encompass the entire disk. While other servo patterns are possible, and are not excluded from the scope of this feature of the invention, an example will be given using the conventional ABCD system for servo patterns.

Figure 45:
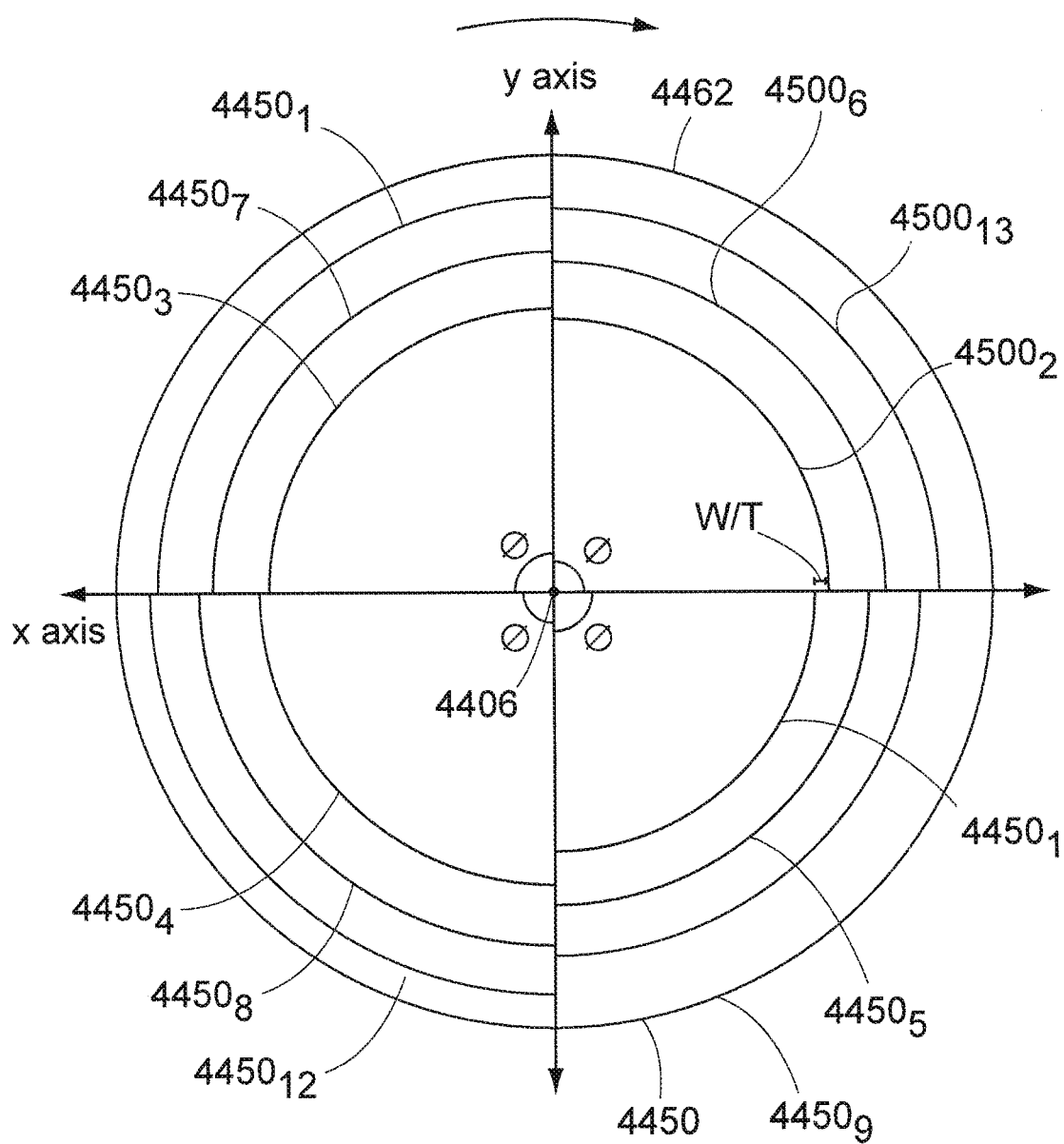
FIG. 45 illustrates a novel planar magnetic medium having discrete circular arcs arranged in a helical pattern.

In contrast to conventional head motion where the goal of the servo system is to position the head 4404 on a single radius to provide a circular track 4400, this novel and unique positioning method, as shown in FIG. 45, aims to position the head 4404 over a discrete arc 4500 in proportion to the angular position of the head 4404 around the disk 4450, thereby accommodating a helical topology of the discontiguous arcs' magnetic pattern on the disk 4450.

With reference to FIG. 45, consider a single revolution of a disk 4450 uniformly divided into W wedges (or sectors) 4462, wherein each wedge 4462 spans an angle of $2\pi/W$. W is the total number of wedges 4462 that pass the head 4404 in a single revolution of the disk. In FIG. 45, the head (not shown) can be positioned at any point along the x-axis to the left of origin 4406. Each wedge 4462 can be assigned a wedge number w, wherein w can be any integer 1 through W. As the disk 4450 spins, the radial displacement of the head 4404 will be incremented an amount in proportion to the wedge number, w, by the linear ratio (w/W)*T, where T is the conventional track-to-track (or cylinder-to-cylinder) distance or some other distance.

As shown in FIG. 45, data will be written on the surface of disk 4450 in a piece-wise fashion, preferably a piece-wise helical fashion defined by a plurality of discontiguous circular arcs 4500. For each revolution of the disk in a preferred embodiment, the head 4404 will be positioned to encounter W discontiguous circular arcs 4500, each circular arc 4500 spanning an angle of $2\pi/W$. In the example of FIG. 45, W is equal to 4. When it is stated that each arc 4500 is circular, what is meant is that each arc $4500_i$ possesses a substantially constant curvature. In a preferred embodiment wherein W is constant for all radii, each discontiguous arc $4500_i$ will possess a circumference of $2\pi R^i/W$. The radius $R_i$ for each arc $4500_i$ is preferably T/W greater than that of arc $4500_{i-1}$ and is preferably T/W less than that of arc $4500_{i+1}$. Thus, as noted below, for each complete revolution of the disk 4450 in the preferred embodiment, the head 4404 will effectively move a distance equal to the conventional adjacent track-to-track distance T. As can be seen in FIG. 45, the plurality of discrete circular arcs 4500 define a generally helical or spiral pattern on the disk 4450.

It should be noted that each radius $R_i$ can have its own W value. In such cases, the discontiguous arcs 4500 may have different circumferences and may span multiple angles from the origin.

Each discontiguous arc 4500 will include an ABCD servo pattern thereon like that shown in FIG. 44(a) for a contiguous arc to ensure proper movement of the head 4404 from one arc 4500 to the next. Conventional servo systems have sufficient bandwidth to step heads 4404 by these small amounts of T/W.

As part of this process, consider an example where the read/write head 4404 is initially placed at position $d_0$ relative to central origin 4406 for the disk of FIG. 45. This initial position can be $R_1$, the radial distance of the innermost arc 4500$_1$. As the disk spins, for each revolution r, the radial displacement D of the head 4404 will be positioned relative to $d_0$ by an amount proportional to the wedge number w as follows:

$$D = \frac{rwT}{W} + d_0$$

wherein T is the conventional track-to-track (or cylinder-to-cylinder) distance. In one full revolution, the head 4404 will have radially moved exactly one full track-to-track distance T. When r reaches 2, the head 4404 will have radially moved exactly 2T.

Figure 46:
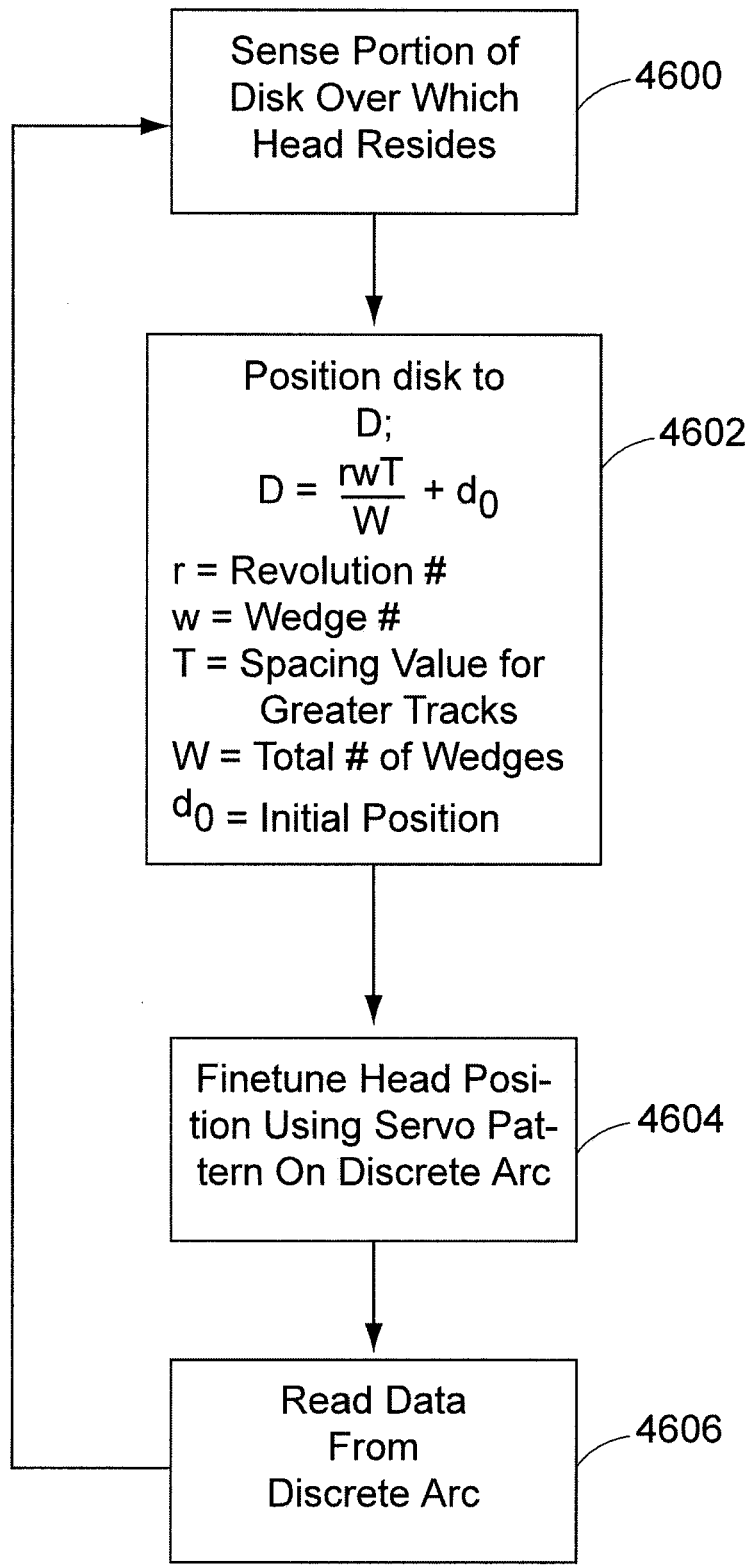
FIG. 46 illustrates a head positioning flow for reading data from the magnetic medium of FIG. 45.

FIG. 46 illustrates the process by which a disk drive system 4470 operates to read data from a disk 4450 in accordance with this feature of the preferred embodiment. At step 4600, the system senses the portion of the disk over which the head resides. Preferably, this step is achieved at least in part by sensing a servo pattern and reading a sector ID written on the disk, as is known in the art. Thereafter, at step 4602, depending on the wedge number w of the disk wedge 4502 that this portion corresponds to, the head is repositioned to D as each new disk wedge 4502 is encountered by the head. Next, at step 4604, the head position is fine-tuned using the servo pattern on the arc 4500. Once the head is properly positioned, the data is read from the disk at step 4606. The process then returns to step 4600 as the disk continues to spin.

This feature of the invention allows for the seamless and continuous operation of the head in read or write mode over an entire zone, thus permitting the reading or writing of an entire disk without incurring the delays associated with normal seek times. Thus, when used in combination with the searching and processing techniques described above, a searching/processing system can operate more efficiently, without being stalled by seek time delays. However, it is worth noting that this feature of the invention need not be used in combination with the searching/processing techniques described above. That is, this technique of using a helical pattern to read and write data to and from magnetic data storage disks can be used independently of the above-described searching and processing features.

Another performance bottleneck occurs when a disk upon which data is stored becomes fragmented. In general file systems, the files are divided into number of fixed size segments (blocks) and these segments are stored on the disk. If the file is very long, the segments might be stored at various locations on the disk. As noted above, to access such a file the disk head has to move from cylinder to cylinder slowing down the file access. It would be better if the entire file is stored as a single object, in a single cylinder or immediately adjacent cylinders. However, this might not always be possible because of the fragmentation of the disk over time. The defragmentation of the disk usually involves moving all the files to one end of the disk so that the new files can be allocated contiguously on the other free end. Typically, such a defragmentation takes a long time. Many attempts have been made in the prior art to solve this problem. One well-known technique is known as the binary buddy system. With the binary buddy system, every request size for disk space is rounded to the next power of 2. Thus, for a 2000 byte file, an allocation request of 2048 ($2^{11}$) is made. This process leads to internal fragmentation.

In an effort to minimize these problems, disclosed herein is a technique where a file is divided into one or more segments, wherein each segment is a power of 2. Thus, each file that is not sized as an even power of 2 is represented as the sum of a series of power of 2 segments.

In an embodiment wherein a minimum segment size is not set, this technique for segmenting a file into blocks of memory comprises: (1) if the file size is an even power of 2, requesting a block of storage space on the storage medium equal to the file size, (2) if the file size is not an even power of 2, requesting a plurality of blocks of storage space on the storage medium, each block having a size that is equal to a power of 2, and (3) if the request is accepted, storing the data file in a storage medium such as on a disk or in memory as one or more data file segments in accordance with the request. In a preferred version of this technique, the file size F can be thought of in binary terms as F equals $F_k \ldots F_2 F_1$. When the file size is not an even power of 2, requesting blocks in storage comprises requesting a total number n of blocks $B_1, \ldots, B_n$ equal to a total number of bits in F equal to 1, each block $B_i$ corresponding to a different bit $F_i$ in F equal to 1 and having a size of $2^i$. FIG. 47(a) illustrates an example of this process for a file size F of 2500 bytes. As shown in FIG. 47(a), the preferred sum of powers of 2 technique, wherein a minimum segment size is not used, results in segment sizes of 2048 bytes ($2^{12}$), 256 bytes ($2^9$), 128 bytes ($2^8$), 64 bytes ($2^2$) and 4 bytes ($2^2$).

To avoid generating overly small segments, it is preferred that a minimum segment size $2^m$ be used. For example, the minimum segment size can be 512 bytes ($2^9$) (thus m is 2). With this technique, when a minimum segment size is used, dividing a file into a sum of powers of 2 size will result in the smallest segment being at least equal to the minimum segment size. Accordingly, (1) if the file size is an even power of 2 and greater than or equal to $2^m$, then a block of storage space is requested such that the block is equal to the file size, (2) if the file size is less than $2^m$, then a block of storage space is requested such that the block is equal to $2^m$, and (3) if the file size is not an even power of 2 and greater than $2^m$, then a plurality of blocks of storage space on the storage medium are requested, each block having a size that is equal to a power of 2 and equal to or greater than $2^m$.

FIG. 47(b) illustrates a preferred implementation of this minimum segment feature, wherein the file size S is 2500 bytes. With this technique, it can be seen that the segment sizes will be 2048 bytes ($2^{12}$), 512 bytes ($2^{10}$). In the preferred implementation of FIG. 47(b), because at least one bit $F_i$ in $F_{m-1}$ through $F_1$ is equal to 1, then F becomes rounded up to a new value R (which can be represented in binary as $R_q \ldots R_2 R_1$). The value of R is chosen as the minimum value greater than F for which the bits $R_{m-1}$ through $R_1$ are all equal to zero. If the file size F was a different value such that all of the bits $F_{m-1}$ through $F_1$ are equal to zero, then the choice of blocks would proceed as with FIG. 47(a). However, if at least one of the bits $F_{m-1}$ through $F_1$ is equal to one, then the procedure of FIG. 47(b) using R is preferably followed.

As would be understood by those of ordinary skill in the art upon reviewing the teachings herein, program logic to implement such a sum of powers of 2 file system, with either a minimum segment size or without, can be readily developed.

Figure 48:
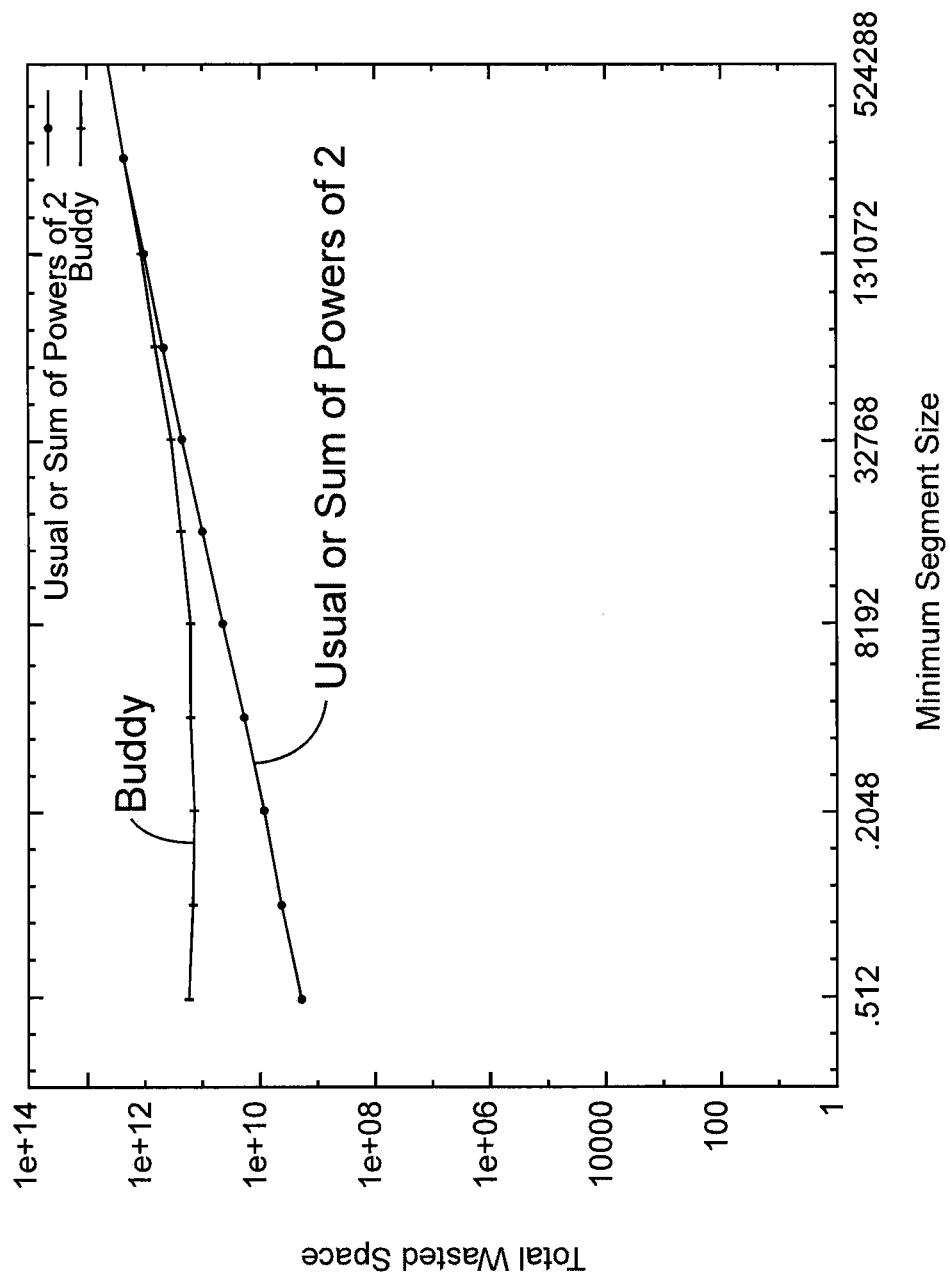
FIGS. 48-50 plot various performance characteristics for a sum of powers of 2 file system.

With a sum of powers of 2 file system, the internal fragmentation is equal to conventional (usual) file systems, which divide a file into segments of equal size, with the same minimum segment size. FIG. 48 shows the wasted space due to internal fragmentation in a buddy file system versus a usual (conventional) system and a sum of powers of 2 file system. When the minimum segment size is small, the wasted space is substantial in the case of the buddy system, but it becomes comparable to other systems as the minimum segment size increases. As the number of small files dominate in many file systems, the buddy system is often times not a suitable option.

Figure 49:
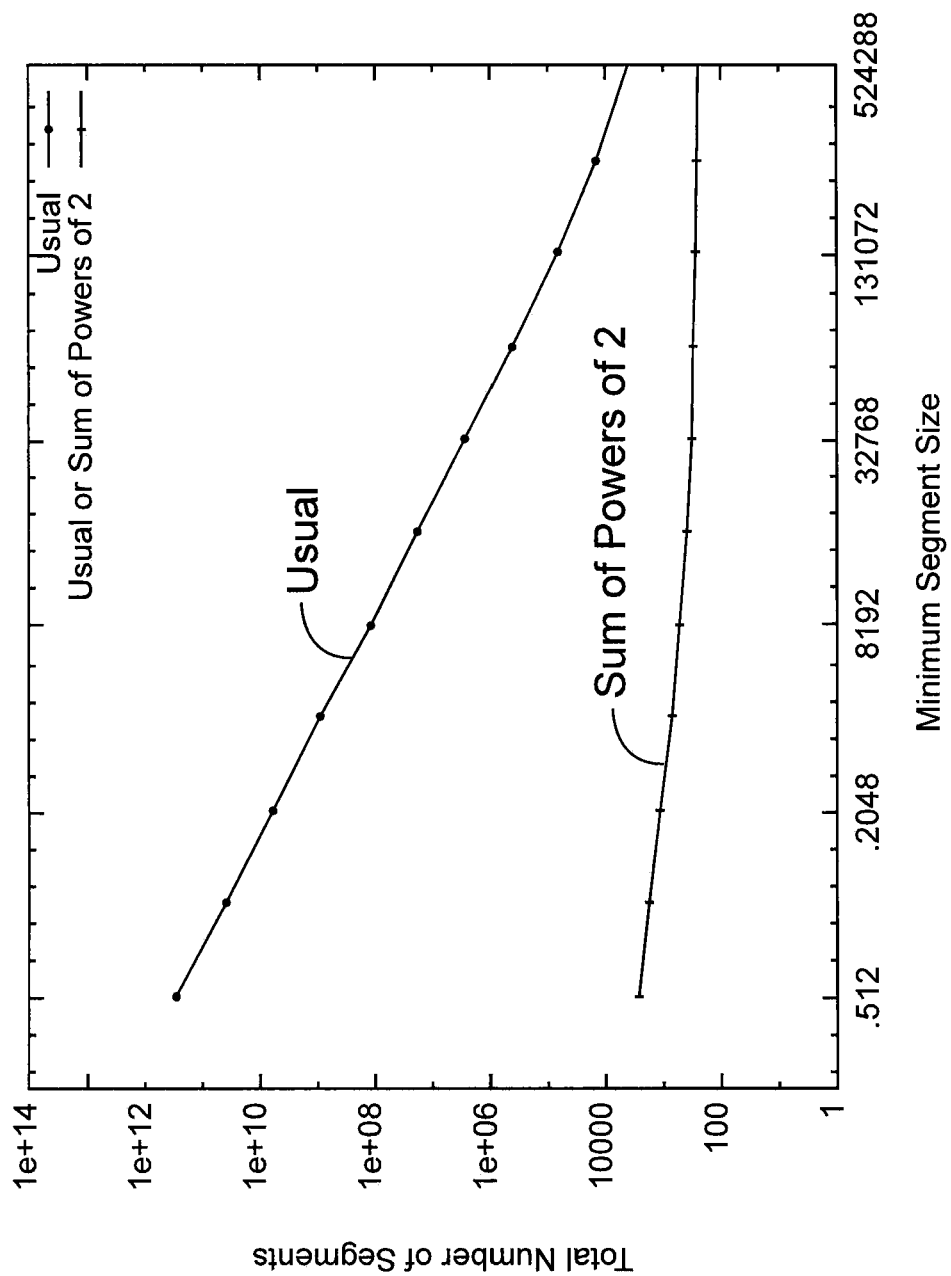
Figure 50:
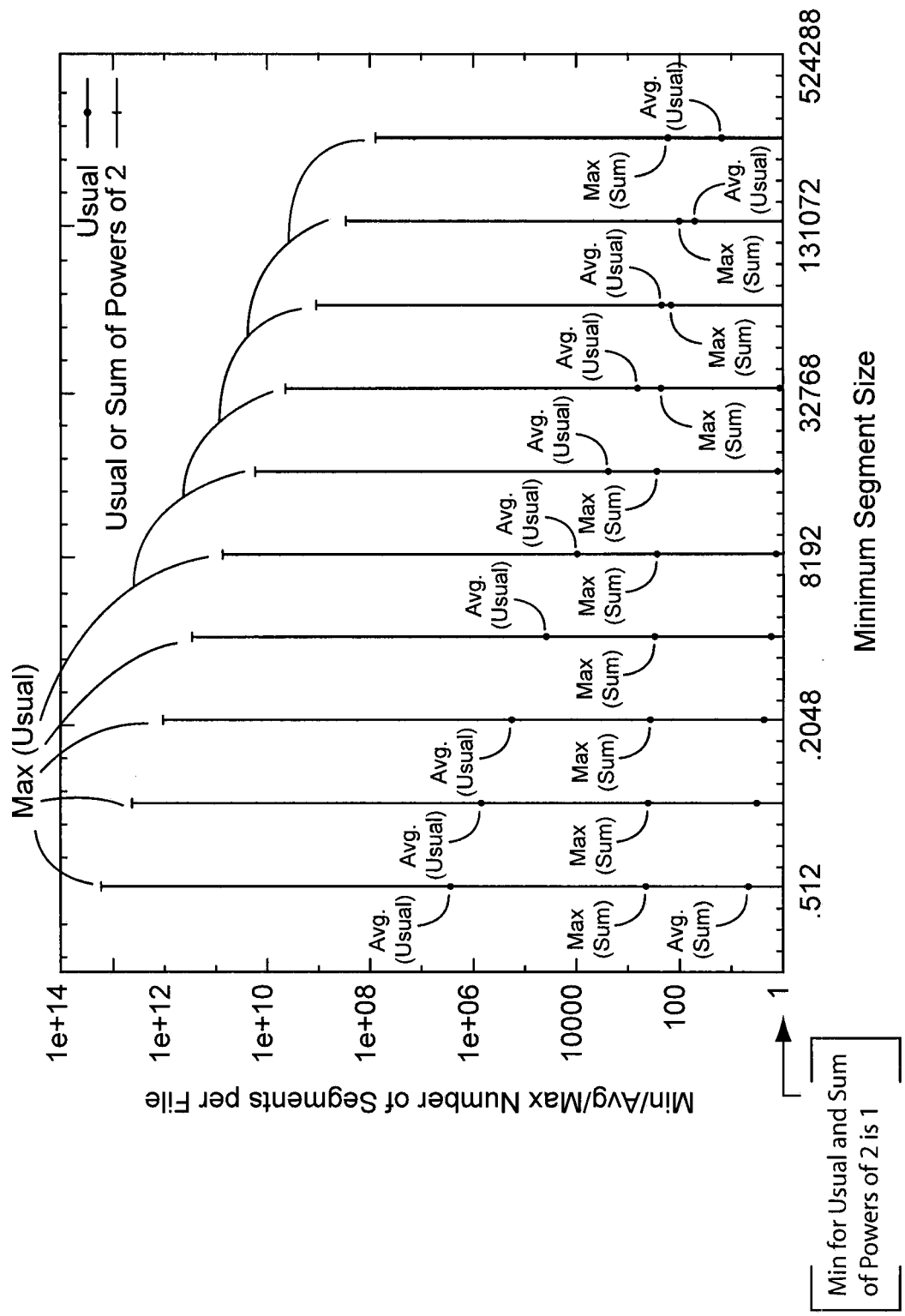

FIG. 49 compares the total number of segments, for an entire file, according to a usual file system and the sum of powers of 2 file system. When the minimum segment size is small, the sum of powers of 2 system produces significantly fewer segments than the usual mechanism. FIG. 50 shows the minimum, average and maximum number of segments per file according to both file systems. Here again, the sum of powers of 2 file system dominates and creates a low number of segments. In other words, the sum of powers of 2 file system leads to more contiguous files.

As such, the sum of powers of 2 file system is a good trade off between the buddy system (where there is a lot of internal fragmentation) and the usual file system (where there is less internal fragmentation but potentially poor contiguity).

As a further refinement, it is preferred that a defragmentation algorithm be used with the sum of powers of 2 file system to more greatly ensure contiguous space on the disk for an allocation request. If a contiguous allocation cannot be satisfied, the defragmentation algorithm tries to free space so as to satisfy the allocation request. This defragmentation algorithm does not defragment the entire disk. Instead, it incrementally defragments a portion of the disk to enable the new allocation request to be satisfied in an incremental manner. A preferred defragmentation algorithm for use with the sum of powers of 2 file system is disclosed on pages 26-30 of the paper Cholleti, Sharath, "Storage Allocation in Bounded Time", MS Thesis, Dept. of Computer Science and Engineering, Washington University, St. Louis, Mo. (December 2002), available as Washington University technical report WUCSE-2003-2, the entire disclosure of which is incorporated herein by reference.

Pseudo code for the preferred partial defragmentation algorithm, referred to herein as a "heap manager partial defragmentation algorithm" is reproduced below:

```
1.  Initialization( )
      for I = 0 to H-1
        heapManager[i] = 0;/*empty heap*/
2.  Allocate(S)
      if there is a free block of size S
        allocate the block of size S with the lowest address, A
        UpdateHeapManager(S, A, "allocation")
      else search for a free block of size bigger than S in increasing
        order of size
        if found, select the block with the lowest address
          split the block recursively until there is a block
            of size S
          select the block of size S with the lowest address,
        A
          UpdateHeapManager(S, A, "allocation")
        else
          A = FindMinimallyOccupiedBlock(S) /*finds block to
            relocate*/
          Relocate(S, A) /*relocates the sub blocks from
            block A*/
          allocate the block with address A
          UpdateHeapManager(S, A, "allocation")
3.  FindMinimallyOccupiedBlock(S)
      find i such that heapManager[i] is minimum for i = 2H/S −1 to
        H/S
      return address A = i << log₂S
4.  Relocate(S, A)
      subBlocks = FindSubBlocks(S, A);
      for each SB ∈ subBlocks
        Deallocate(SB), ∀SB ∈ subBlocks
5.  Deallocate(extId)
      find address A of bock extId and size S;
      free the block;
      UpdateHeapManager(S, A, "deallocation");
6.  UpdateHeapManager(S, A, type)
      int maxLevel = log₂H;
      int level = log₂S;
      if type = "allocation"
        int addr = A >> level;
        if S > MinBlockSize
          heapManager[addr] = S /*block is fully occupied*/
        /*blocks above the allocation level*/
        addr = A >> level;
        for (i = level+1; i <= maxLevel;i++)
          addr = addr >> 1;
          heapManager[addr] = heapManager[addr] + S;
      if type = "deallocation"
        int addr = A >> level;
        /*current block*/
        if S > MinBlockSize
          heapManager[addr] = 0
        /*blocks above the deallocation level*/
        addr = A >> level;
        for (i = level+1; i <= maxLevel;i++)
          addr = addr >> 1; //continuing from above addr
          heapManager[addr] = heapManager[addr] - S;
```

Various changes and modifications to the present invention would be apparent to those skilled in the art but yet which would not depart from the spirit of the invention. The preferred embodiment describes an implementation of the invention but this description is intended to be merely illustrative. Several alternatives have been also been above. For example, all of the operations exemplified by the analog processing have their equivalent counterparts in the digital domain. Thus, approximate matching and correlation types of processing can be done on the standard digital representation of the analog bit patterns. This can also be achieved in a continuous fashion using tailored digital logic, microprocessors and digital signal processors, or alternative combinations. It is therefore the inventors' intention that the present invention be limited solely by the scope of the claims appended hereto, and their legal equivalents.

What is claimed is:

1. A system comprising:
   a field programmable gate array (FPGA), the FPGA comprising configurable hardware logic;
   a network interface; and
   hardware description code that is compilable into a plurality of bit configuration files for loading onto the FPGA, wherein each bit configuration file defines a pipelined processing operation for a hardware template;
   wherein the FPGA is accessible over a network via the network interface for commanding the FPGA to load a bit configuration file from among the bit configuration files onto the FPGA to configure hardware logic on the FPGA to perform the pipelined processing operation defined by the loaded bit configuration file; and
   wherein the FPGA is configured to (1) receive streaming data and (2) process the streaming data through the configured hardware logic to perform the pipelined processing operation defined by the loaded bit configuration file on the streaming data.

2. The system of claim 1 further comprising:
a processor; and
a bus that links the processor with the FPGA; and
wherein the FPGA is accessible over the network interface via the processor and the bus.

3. The system of claim 2 wherein the FPGA is configured to offload a plurality of processing tasks from the processor, and wherein the network interface, processor, FPGA, and bus are part of a computer server.

4. The system of claim 1 wherein the hardware description code is synthesizable into gate level description code, and wherein the gate level description code is convertible into the bit configuration files.

5. The system of claim 1 wherein the hardware description code includes hardware description code that is compilable into a bit configuration file that defines a compression pipeline hardware template.

6. The system of claim 1 wherein the hardware description code includes hardware description code that is compilable into a bit configuration file that defines a decompression pipeline hardware template.

7. The system of claim 1 wherein the hardware description code includes hardware description code that is compilable into a bit configuration file that defines an encryption pipeline hardware template.

8. The system of claim 1 wherein the hardware description code includes hardware description code that is compilable into a bit configuration file that defines a decryption pipeline hardware template.

9. The system of claim 1 wherein the hardware description code includes hardware description code that is compilable into a bit configuration file that defines a search pipeline hardware template.

10. The system of claim 1 wherein the hardware description code includes hardware description code that is compilable into a bit configuration file that defines an image processing pipeline hardware template, wherein the image processing pipeline hardware template comprises a matching engine that computes a similarity between streaming image data and an image key.

11. The system of claim 1 wherein the hardware description code includes hardware description code that is compilable into a bit configuration file that defines a data reduction hardware template.

12. The system of claim 1 wherein the hardware description code includes hardware description code that is compilable into a bit configuration file that defines a processing pipeline hardware template for determining a similarity between DNA sequences.

13. The system of claim 1 wherein the hardware description code includes hardware description code that is compilable into a plurality of bit configuration files that define a plurality of different hardware templates, wherein the different hardware templates comprise at least two members of the group consisting of (1) a compression pipeline hardware template, (2) a decompression pipeline hardware template, (3) an encryption pipeline hardware template, (4) a decryption pipeline hardware template, (5) a search pipeline hardware template, (6) an image processing pipeline hardware template, wherein the image processing pipeline hardware template comprises a matching engine that computes a similarity between streaming image data and an image key, (7) a data reduction hardware template, and (8) a processing pipeline hardware template for determining a similarity between DNA sequences.

14. The system of claim 1 wherein the FPGA is also accessible over the network interface for commanding the FPGA to (1) load a different bit configuration file from among the bit configuration files onto the FPGA to thereby differently configure hardware logic on the FPGA to perform the pipelined processing operation defined by the loaded different bit configuration file, (2) receive additional streaming data via the network interface, and (3) process the additional streaming data through the differently configured hardware logic to perform the pipelined processing operation defined by the loaded different bit configuration file on the additional streaming data.

15. The system of claim 1 further comprising a memory, the memory configured to store the hardware description code, and wherein the memory is remote from the FPGA via the network.

16. The system of claim 1 further comprising a memory, the memory configured to store the bit configuration files, wherein the memory is linked to the FPGA and co-resident on a board with the FPGA.

17. The system of claim 1 wherein the FPGA is further configured to receive the streaming data via the network interface.

18. The system of claim 1 further comprising (1) a storage medium from which the FPGA receives the streaming data and (2) a processor;
wherein the storage medium comprises a mass storage medium in form of a disk, the disk having a plurality of discontiguous arcs for data storage thereon, wherein a plurality of data files are stored in the mass storage medium, each data file being stored as a sequence of segments, each segment having a size that is a power of 2; and
wherein the processor is configured to (1) write the data files to the mass storage medium as the sequence of segments and (2) manage a flow of a plurality of the data files to the FPGA for processing as the streaming data.

19. A system comprising:
a field programmable gate array (FPGA), the FPGA comprising configurable hardware logic;
a network interface; and
gate level description code that is convertible into a plurality of bit configuration files for loading onto the FPGA, wherein each bit configuration file defines a pipelined processing operation for a hardware template;
wherein the FPGA is accessible over a network via the network interface for commanding the FPGA to load a bit configuration file from among the bit configuration files onto the FPGA to configure hardware logic on the FPGA to perform the pipelined processing operation defined by the loaded bit configuration file; and
wherein the FPGA is configured to (1) receive streaming data and (2) process the streaming data through the configured hardware logic to perform the pipelined processing operation defined by the loaded bit configuration file on the streaming data.

20. A system comprising:
a field programmable gate array (FPGA), the FPGA comprising configurable hardware logic;
a network interface; and
a plurality of bit configuration files for loading onto the FPGA, wherein each bit configuration file defines a pipelined processing operation for a hardware template;

wherein the FPGA is accessible over a network via the network interface for commanding the FPGA to load a bit configuration file from among the bit configuration files onto the FPGA to configure hardware logic on the FPGA to perform the pipelined processing operation defined by the loaded bit configuration file; and wherein the FPGA is configured to (1) receive streaming data and (2) process the streaming data through the configured hardware logic to perform the pipelined processing operation defined by the loaded bit configuration file on the streaming data.

* * * * *